United States Patent
De Luis et al.

(10) Patent No.: US 12,469,953 B2
(45) Date of Patent: Nov. 11, 2025

(54) ANTENNA FOR WEARABLE ELECTRONIC DEVICES

(71) Applicant: Meta Platforms Technologies, LLC, Menlo Park, CA (US)

(72) Inventors: Javier Rodriguez De Luis, Kirkland, WA (US); Liang Han, Sunnyvale, CA (US); Ce Zhang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 146 days.

(21) Appl. No.: 18/164,795

(22) Filed: Feb. 6, 2023

(65) Prior Publication Data
US 2024/0097311 A1    Mar. 21, 2024

Related U.S. Application Data

(60) Provisional application No. 63/339,131, filed on May 6, 2022.

(51) Int. Cl.
*H01Q 1/27* (2006.01)
*G02B 27/01* (2006.01)
*H01Q 1/22* (2006.01)
*H01Q 21/28* (2006.01)

(52) U.S. Cl.
CPC ....... *H01Q 1/2266* (2013.01); *G02B 27/0176* (2013.01); *H01Q 1/273* (2013.01); *H01Q 21/28* (2013.01); *G02B 2027/0178* (2013.01)

(58) Field of Classification Search
CPC .......... H01Q 1/273; H01Q 1/243; H01Q 1/22; G02B 27/017; G02B 2027/0178
See application file for complete search history.

(56) References Cited

U.S. PATENT DOCUMENTS 9,024,830 B2 *  5/2015  Okajima .................. H01Q 9/42
                                                     351/158
2013/0194141 A1   8/2013  Okajima et al.
(Continued)

FOREIGN PATENT DOCUMENTS

CA    2970910 A1   7/2016
WO    2022046428 A1   3/2022

OTHER PUBLICATIONS

International Preliminary Report on Patentability for International Application No. PCT/US2023/021282, mailed Nov. 21, 2024, 9 pages.

(Continued)

*Primary Examiner* — Hasan Islam
(74) *Attorney, Agent, or Firm* — Morgan, Lewis & Bockius LLP

(57) ABSTRACT

The disclosed system may include a support structure having a top portion and a first bottom portion. The system may also include at least one wireless communication device positioned on the top portion of the support structure. The system may further include at least one antenna positioned in the first bottom portion of the support structure. The antenna in the first bottom portion of the support structure may be electrically connected to the wireless communication device positioned on the top portion of the support structure. Various other wearable devices, apparatuses, and methods of manufacturing are also disclosed.

20 Claims, 36 Drawing Sheets

(56) References Cited

U.S. PATENT DOCUMENTS

| | | | | |
|---|---|---|---|---|
| 2014/0240474 A1* | 8/2014 | Kondo | ................... | H04B 1/385 |
| | | | | 348/56 |
| 2023/0099937 A1* | 3/2023 | Jadidian | ................ | H01Q 1/364 |
| | | | | 343/718 |
| 2023/0121025 A1* | 4/2023 | Choe | ........................ | H01Q 1/27 |
| | | | | 361/749 |
| 2023/0375833 A1* | 11/2023 | Kawaguchi | ........... | G06F 1/1698 |

OTHER PUBLICATIONS

International Search Report and Written Opinion for International Application No. PCT/US2023/021282, mailed Jul. 28, 2023, 11 pages.

\* cited by examiner

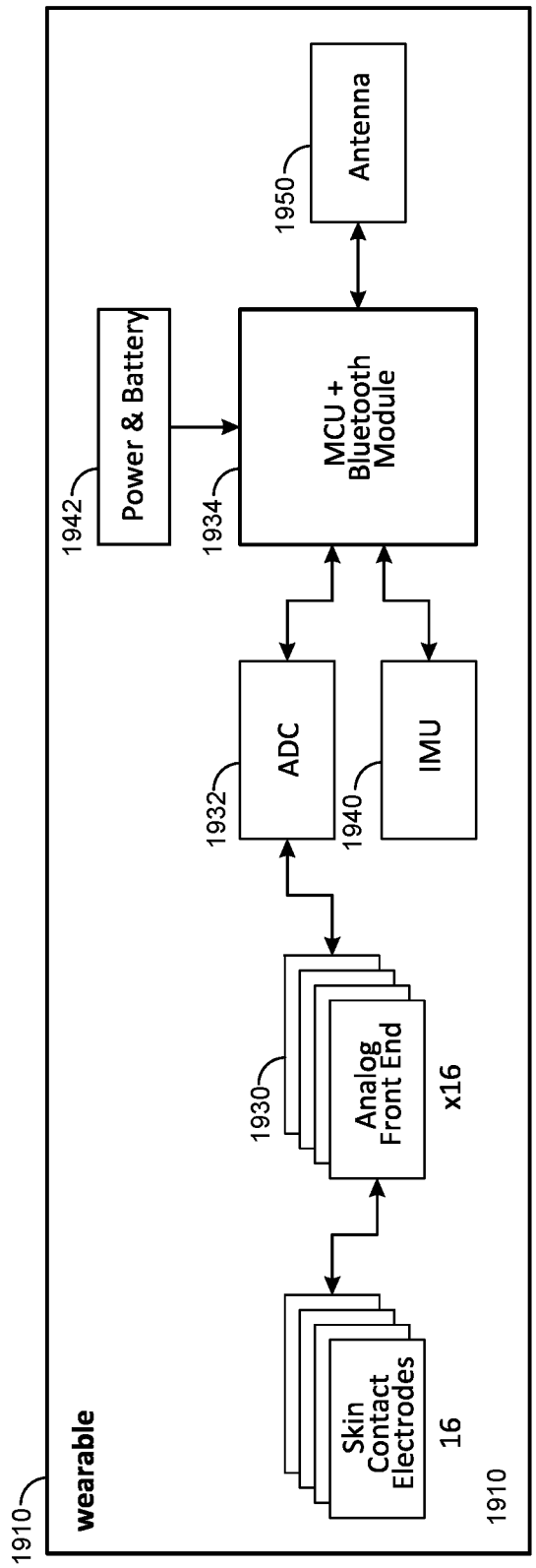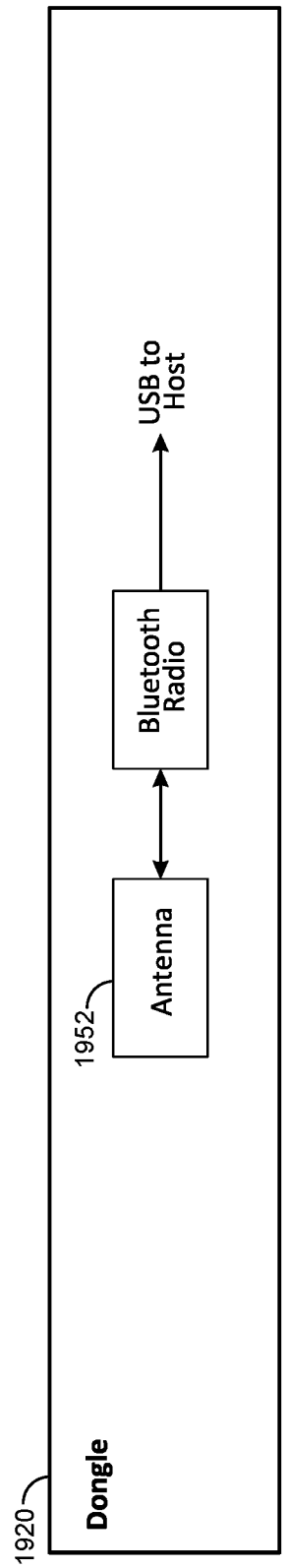
FIG. 19A
FIG. 19B

ANTENNA FOR WEARABLE ELECTRONIC DEVICES

CROSS-REFERENCE TO RELATED APPLICATIONS

This application claims priority to and the benefit of U.S. Provisional Patent Application No. 63/339,131, filed on May 6, 2022, which application is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 19A and 19B are illustrations of an exemplary schematic diagram with internal components of a wearable system.

Figure 1A:
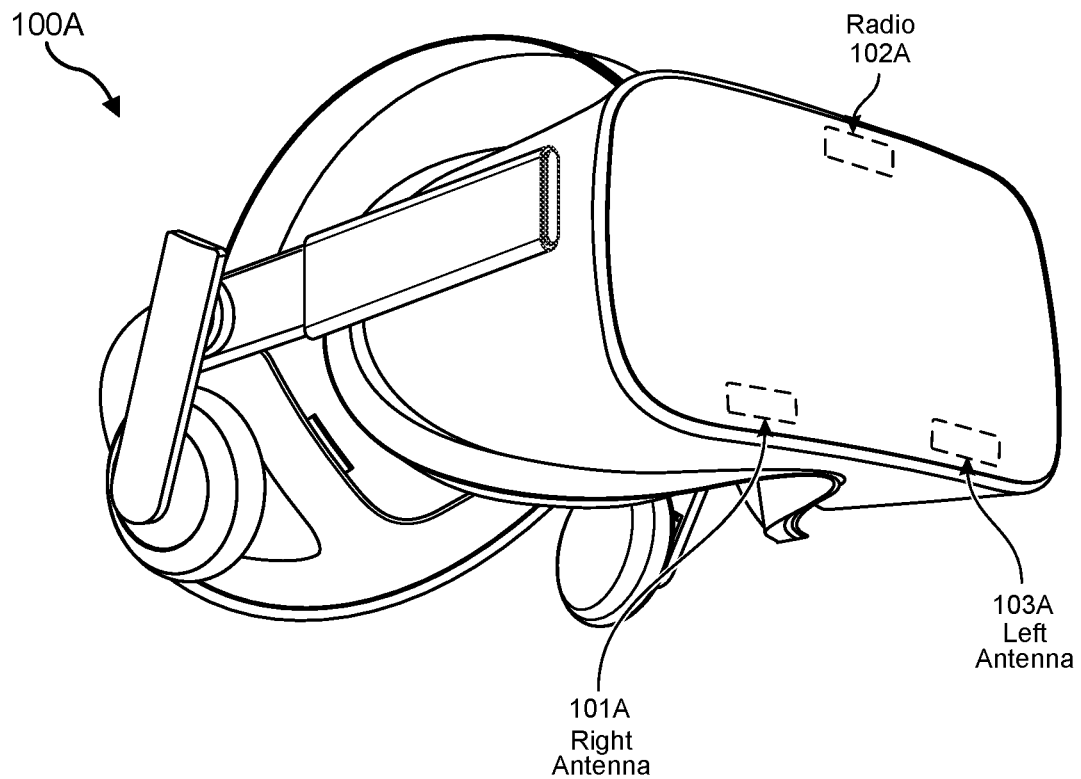
FIGS. 1A-1J illustrate various exemplary embodiments of eyewear systems that may include the antennas or antenna systems described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to the manufacture, design, assembly, and implementation of antennas for wearable electronic devices. Wearable electronic devices typically have a very limited amount of space for electrical and mechanical components. Often, these components may be positioned in non-optimal locations, including locations that are prone to "desense" or a loss in signal quality. For instance, wearable electronic devices placed on a wearer's head may lose radio frequency (RF) energy that is absorbed by the user's head. Other body parts may similarly attenuate or degrade wireless signal quality. This may lead to reduced antenna efficiency if antennas or other components are placed immediately next to the user's head or other body parts. For instance, in a pair of virtual reality goggles, if one or more antennas are placed immediately next to a user's ears or a user's temples, that user's head may absorb large amounts of incoming or outgoing signals.

Still further, many wearable electronic devices may implement multiple antennas to improve data throughput. For instance, dual antennas may be used in tandem in a multiple input multiple output (MIMO) manner to transfer data in a more reliable way or with higher throughput. In such cases, however, if the dual antennas are placed too close to each other, the antennas may suffer from poor isolation relative to each other, leading to worse MIMO performance. Besides degraded MIMO performance, this lack of isolation may also reduce antenna efficiency, thereby increasing the amount of power needed to operate the antennas. This, in turn, may reduce battery life in the wearable device and may increase the amount of heat generated by the wearable device. This increase in operating power may also increase the amount of RF energy that is being absorbed by the user and specifically by the user's head, which is limited by regulatory exposure levels.

As will be explained in greater detail below, embodiments of the present disclosure may strategically position antennas in locations that are physically separated from other electronic and mechanical components, and may also be positioned away from the user's body. In some embodiments, antennas may be placed on a lower rim portion of a wearable electronic device. For instance, in a head-mounted virtual reality display or on augmented reality glasses, one or more antennas may be placed on a lower rim near the user's cheeks. At least in some embodiments, this lower rim area may be substantially free of cameras, chipsets, sensors, speakers, or other components. Moreover, the antennas may be pushed forward on the lower rim away from the user's cheeks. In some cases, an overmold (e.g., made of plastic) may be formed over the antennas so that the antennas do not touch the user's skin or are not exposed to direct user contact.

In the embodiments described below, substantially any type of antenna architecture may be used. For example, antennas placed on the bottom rims of artificial reality glasses, or on the bottom of virtual reality head-mounted devices (HMDs) or on the bottom of other types of eyewear may include loop antennas, monopole antennas, dipole antennas, slot antennas, or other types of antennas. These antennas may be connected to a system ground which, at least in some cases, may be a metal frame or support structure to which the various wearable device components are attached. In some cases, the antennas may be clipped to some portion of the metal frame, while in other cases, the antennas may be integrated into the frame. Moreover, the antennas may be connected to various radios (e.g., WiFi radios), processors, controllers, or other chipsets within the wearable electronic device. In cases where multiple antennas are used, the electrical connections to the radios or controllers may be equal or substantially equal in length. This may help ensure that each antenna operates with the same or a similar level of efficiency. This may be beneficial when operating in MIMO mode, where signals from each antenna are used in conjunction to increase transmission or reception efficiency. Each of these embodiments will be described in greater detail below with regard to FIGS. 1-19B.

Features from any of the embodiments described herein may be used in combination with one another in accordance with the general principles described herein. These and other embodiments, features, and advantages will be more fully understood upon reading the following detailed description in conjunction with the accompanying drawings and claims.

FIGS. 1A-1J illustrate various embodiments of wearable electronic devices that may implement the antenna structures described herein. As noted above, placement of antennas, including WiFi antennas, Bluetooth antennas, global positioning system (GPS) antennas, cellular antennas, near field communication (NFC) antennas or other types of antennas, near a user's ears or temples (e.g., on the device's temple arms) may lead to higher-than-desired RF absorption rates in the user's head. Since this area is also typically packed with other noisy electronic components, the risk for receiver desensitization is also higher. Placing the antennas in the top portion of the wearable device may also be problematic. As used herein, the "top portion" of the wearable electronic device may refer to a brow bar portion that is positioned near a user's nose bridge and extends along their eyebrows and lower forehead. This top portion may include multiple different electronic components including cameras, controllers, depth sensors, infrared sensors, inertial motion units (IMUS), radios, or other components. As such, antennas may not fit in these locations, or if placed in such positions, may be so close to other components that those components cause interference. This may lead to antenna desense, heat dissipation issues, and potential interference with other components.

The embodiments described herein may be configured to position antennas, radios, or antenna/radio combinations in locations that have few or no other components, positions that are at least partially removed from the user's head, and positions that are separated from each other, thereby providing the two (or more) antennas with the isolation necessary to effectively operate in a MIMO mode. The virtual reality headset 100A of FIG. 1A, for example, illustrates an embodiment of a right antenna 101A and a left antenna 103A, each positioned in a lower portion of the VR headset 100A. The "lower portion," as the term is used herein, may refer to the bottom half of the device when being worn by a user over the user's eyes. The lower portion thus includes a bottom rim portion that rests below the user's eyes and curves up, over, and down the user's nose.

The VR headset 100A may also include a radio 102A positioned in the top portion of the VR headset 100A. The right antenna 101A and the left antenna 103A may each be electrically connected to the radio 102A via metal traces or wires. While the radio is shown as being positioned in the middle of the upper portion of the VR headset 100A (i.e., between the user's eyes), it will be recognized that the radio 102A may be positioned in substantially any location along the upper portion of the VR headset. Moreover, it will be understood that the term "radio," as used herein, may include multiple parts of an antenna feed structure including amplifiers, tuners, impedance matching circuits, transmitters, receivers, filters, or other electronic components used in the transmission or reception of wireless signals. In some cases, the radio 102A may be one of many radios within the VR headset 100A that may be positioned on the top portion or the bottom portion of the headset. Still further, at least in some cases, the radio 102A may be positioned next to a processor or controller. The processor or controller may be configured to send signals to the radio(s) for transmission or may interpret or process signals received from the radio 102A.

Figure 1B:
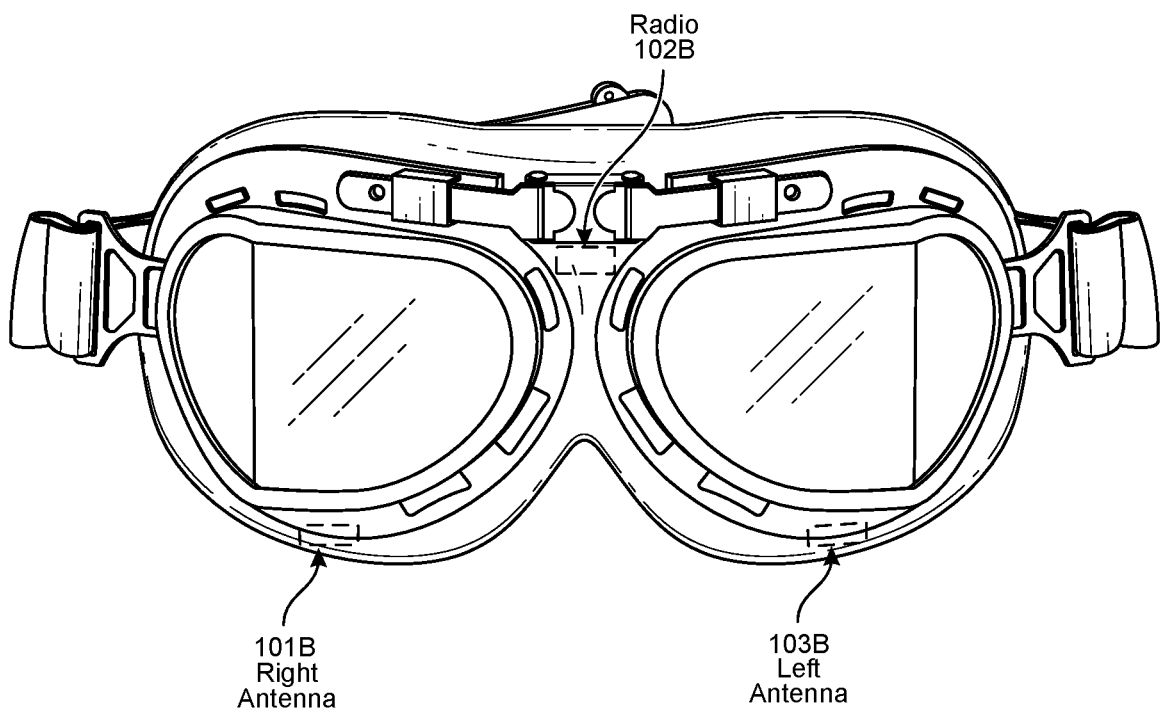

FIG. 1B illustrates an embodiment of a pair of aviation goggles 100B that includes a right antenna 101B, a left antenna 103B, and at least one radio 102B to which the right and left antennas 101B/103B are electrically connected. As with the VR head-mounted device 100A of FIG. 1A, the right antenna 101B and the left antenna 103B may be positioned on the bottom rim portions of the aviation goggles 100B. This bottom rim portion may be away from other electronic components including cameras, depth sensors, processors, IMUs, or other components. This positioning on the bottom rim of the goggles may provide each of the antennas 101B/103B with sufficient isolation to properly operate in a MIMO mode or, when necessary, in an isolated mode in which one of the antennas is operating by itself (e.g., in cases where one of the antennas is inoperative or is occluded by a user's hand). In some embodiments, the right antenna 1018 and the left antenna 103B may each have separate electrical connections via traces or wires to one or more radios (e.g., 102B). Indeed, it will be understood that in the embodiments herein, each side of the wearable device may have a single antenna or may have multiple antennas and each of these antennas may be connected to the same radio or to different radios. Moreover, while the radio 102B is shown as being positioned in the center of the aviation goggles 1008, the radio 102B or other radios may be positioned on the bottom rim, in the eye bridge, in the head strap, or in substantially any other location within the wearable electronic device.

Figure 1C:
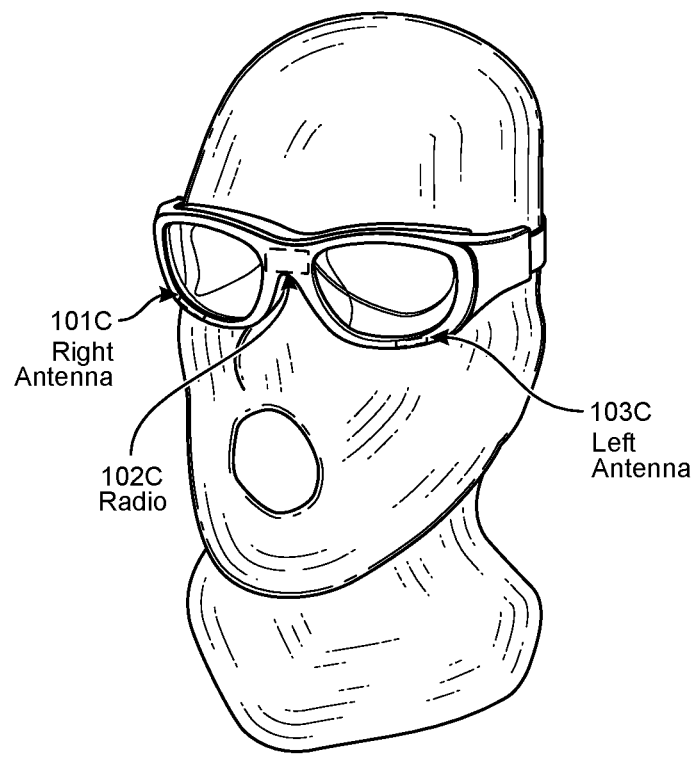

FIG. 1C illustrates a ski mask 100C that includes a right antenna 101C, a left antenna 103C, and at least one radio 102C. In the embodiment illustrated in FIG. 1C, the right and left antennas (101C/103C) of the ski mask 100C may be positioned in the respective right and left bottom halves of the ski mask. In some cases, the right and left antennas 101C/103C may be embedded in at least a portion of the ski mask's frame. The wires or traces connecting the right and left antennas 101C/103C to the radio(s) may be routed along the external edges of the ski mask 100C. In this manner, the wires running along the external edges may not be visible to the user and may not impede the user's vision.

Figure 1D:
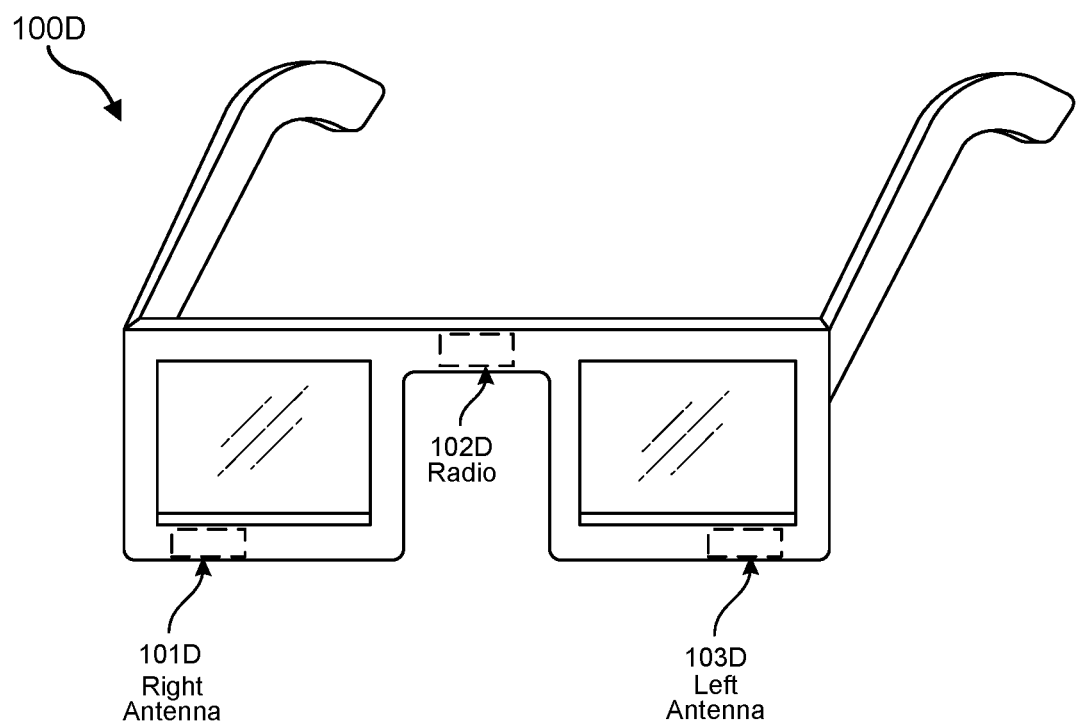

FIG. 1D illustrates a pair of artificial reality glasses 100D that may include a right antenna 101D and a left antenna 103D, along with one or more radios 102D. In some embodiments, the one or more radios 102D may be positioned on a mainboard (e.g., a PCB) that is at least partially disposed on the nose bridge of the artificial reality glasses 100D. The right and left antennas 101D/103D may be positioned on the bottom rim portion of the artificial reality glasses 100D, away from other electrical or mechanical components. Moreover, at least in some cases, the right and left antennas 101D/103D may be moved forward along the z-axis away from the user's face and may be positioned on the outer edge of the bottom rim (as further shown in FIGS. 4A-4D). This position may be further away from the user's cheek to produce less RF radiation to be absorbed by the wearer's head.

Still further, the right and left antennas 101D/103D may be moved to the right or to the left along the x-axis within the bottom rim portion of the artificial reality glasses 100D. Thus, at least in some cases, the right and left antennas 101D/103D may be moved toward the internal portion of the glasses (e.g., toward the user's nose), such that the antennas are at least partially placed on the internal curvature of the bottom rim portion of the artificial reality glasses 100D (as further shown in FIGS. 9A-9D). Moreover, in other cases, the right and left antennas 101D/103D may moved toward the external portion of the glasses (e.g., toward the outer edges of the wearer's eyes), such that the antennas are at least partially placed on the external curvature of the bottom rim portion of the artificial reality glasses 100D (as further shown in FIGS. 10A-10D).

Figure 1E:
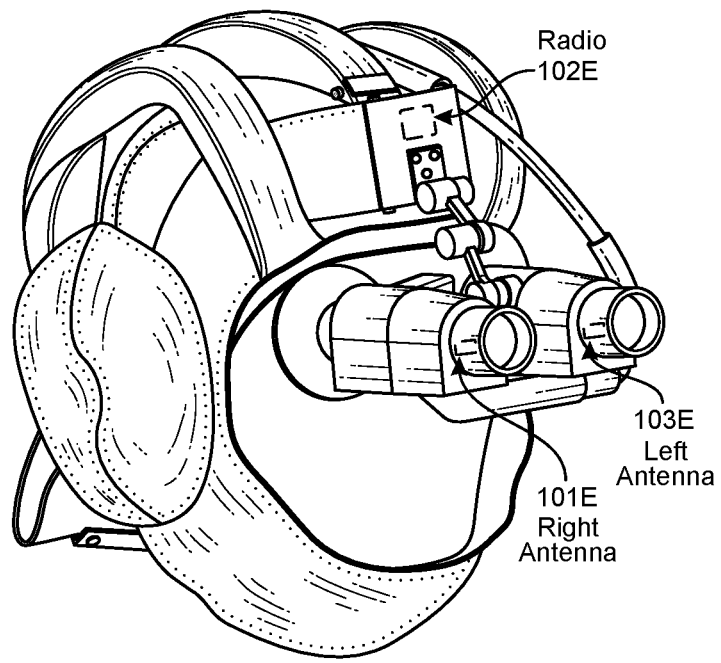
Figure 1F:
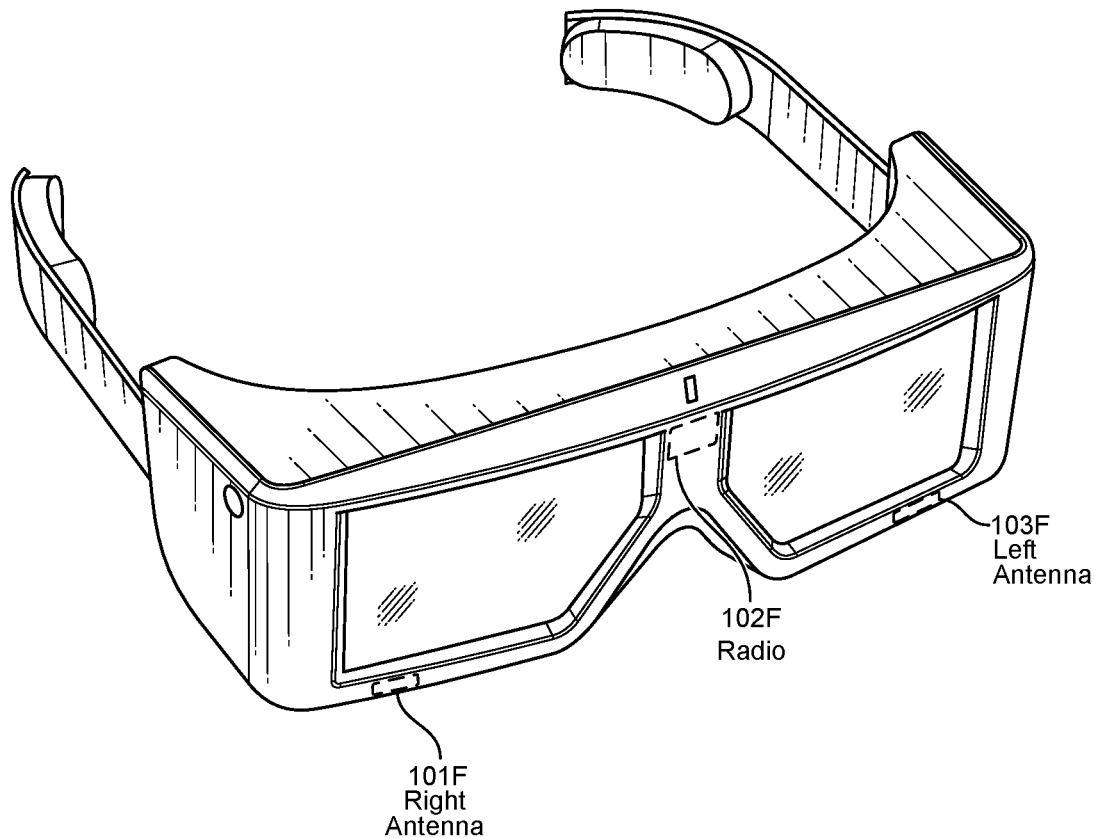
Figure 1G:
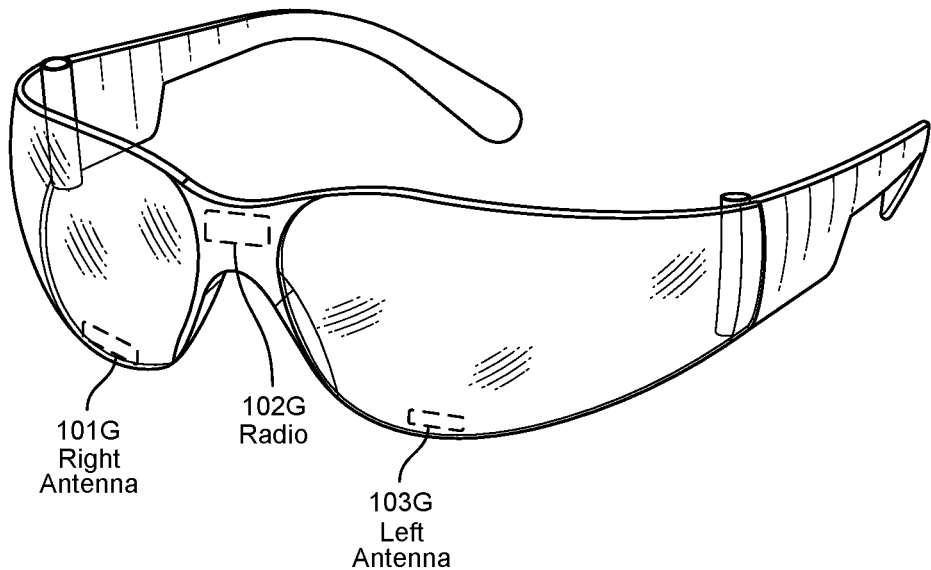
Figure 1H:
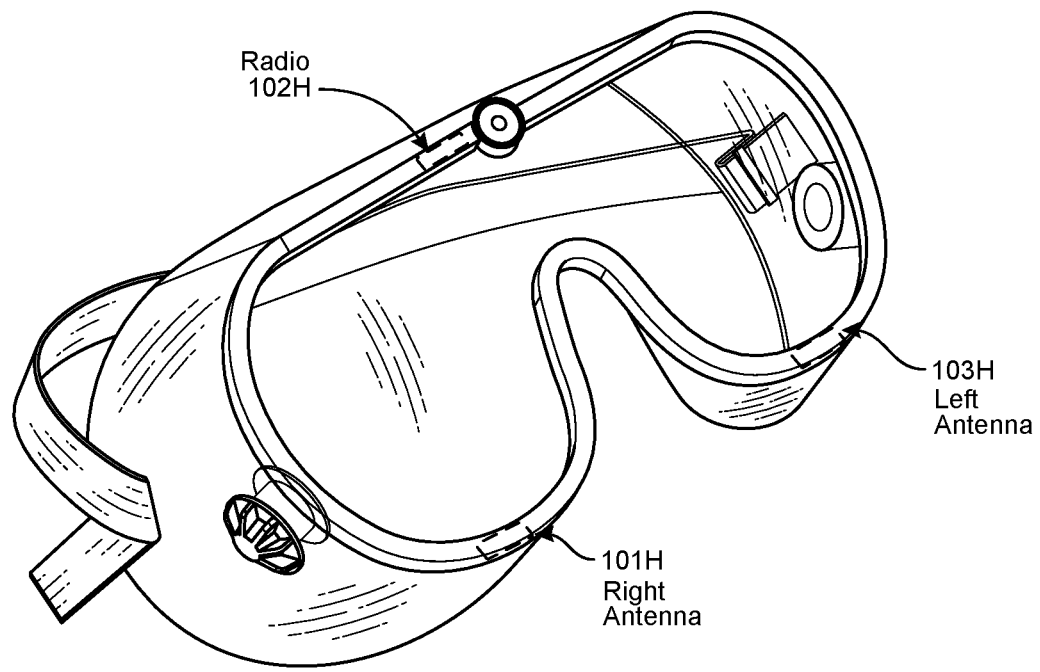
Figure 1I:
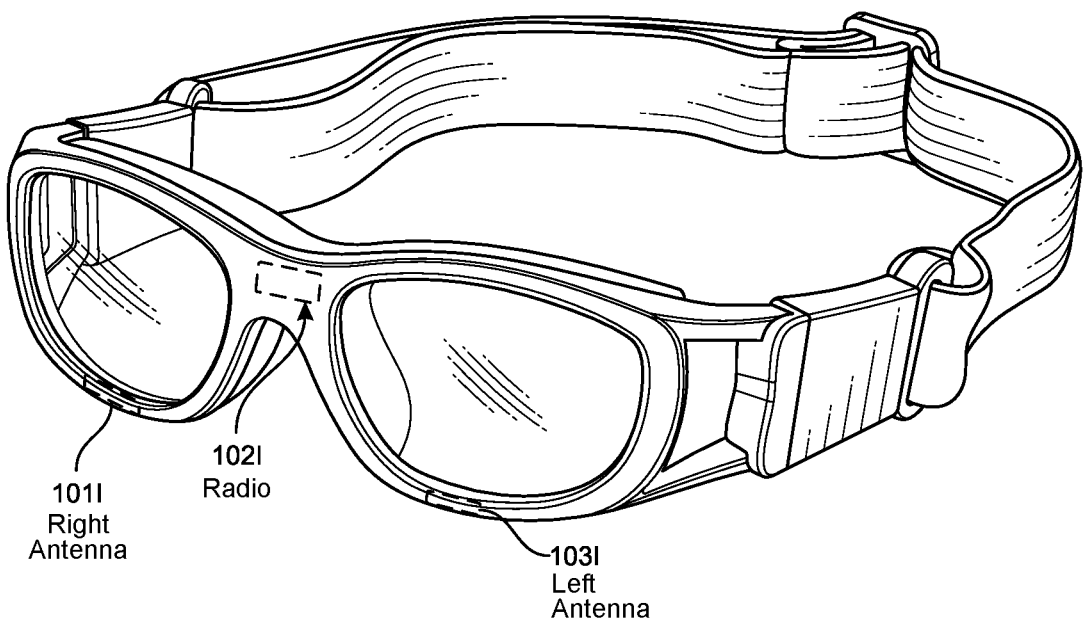
Figure 1J:
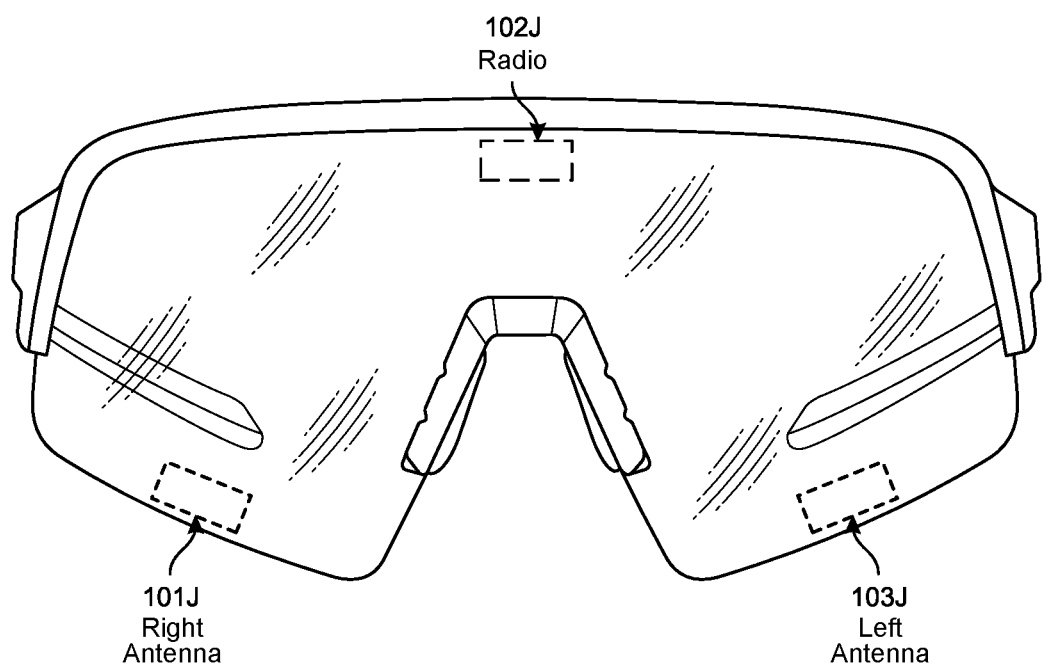

FIGS. 1E-1J illustrate various other embodiments of wearable devices 100E-100J into which antennas may be integrated. For instance, FIG. 1E illustrates a pair of night vision goggles 100E that may include a right antenna 101E, a left antenna 103E, and one or more radios 102E. As with the examples above, the right and left antennas 101E/103E may be positioned on the bottom rim portion of the night vision goggles 100E. Such may also be the case with the 3D goggles 100F of FIG. 1F, the safety goggles 100G of FIG. 1G, the protective goggles 100H of FIG. 1H, the sport goggles 100I of FIG. 1I, and the sporting eyewear 100J of FIG. 1J. Each of these wearable devices may have right antennas 101E-101J, left antennas 103E-103J, and one or more radios 102E-102J. The antennas may be placed in the lower rim portions of the wearable devices, away from other potentially interfering electrical components, and away from the wearer's temples or ears or other portions of the wearer's head that are likely to absorb larger amounts of RF radiation. In each of these wearable devices 100E-100J, the wires or traces connecting the antennas to the radio(s) may extend along the inner portion of the wearable devices, or may extend along the outer portion of the wearable devices, as depicted in the embodiments of FIGS. 6A-6D.

FIGS. 2A-2J illustrate embodiments of the same wearable devices shown in FIGS. 1A-1J, but without an exterior casing or exterior shell. Accordingly, internal electronic and mechanical components can be seen. For example, FIG. 2A includes an embodiment of a virtual reality head-mounted display 200A that has multiple different internal components. These components may be electronic components, mechanical components, structural components, or other types of components. For instance, the virtual reality head-mounted display 200A may include speakers placed near the user's ears. The virtual reality head-mounted display 200A may also include cameras, processors, radios, IMUs, microphones, or other components. The number of components, the size of these components, and the placement of these components may change in the various FIGS. 2B-2J. However, it will be understood that each of these wearable devices 200A-200J may include different types of components placed in different locations.

Figure 2A:
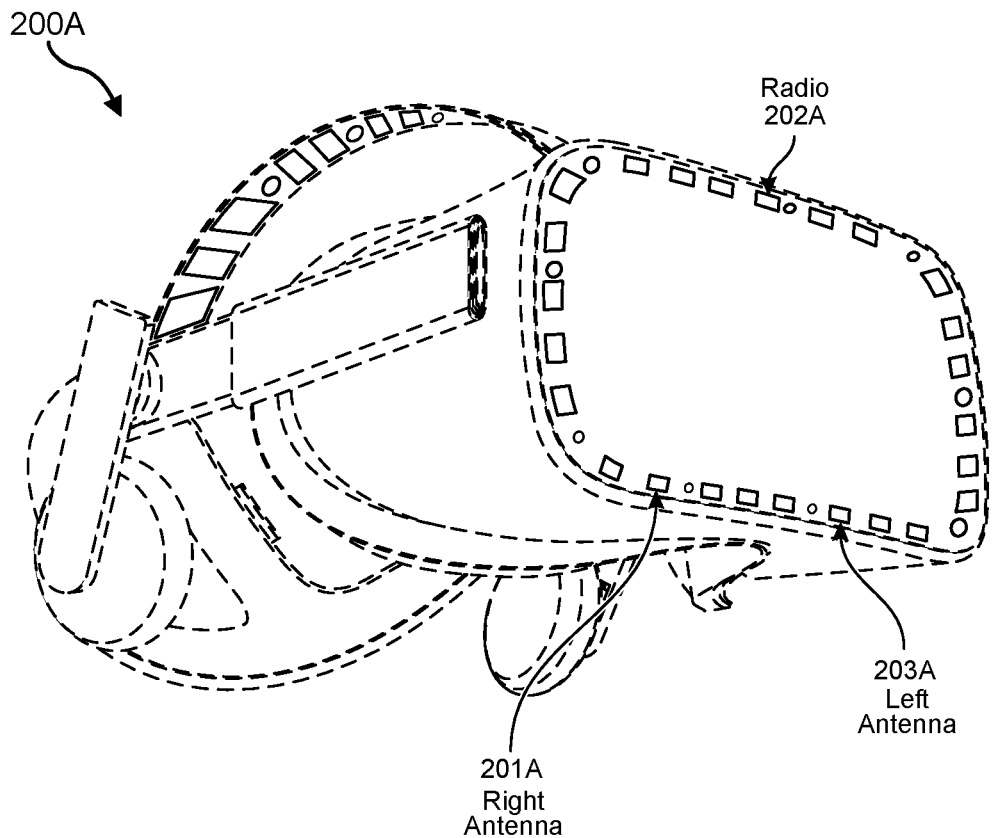
FIGS. 2A-2J illustrate various exemplary embodiments of internal components of eyewear systems that may include the antennas or antenna systems described herein.
Figure 2B:
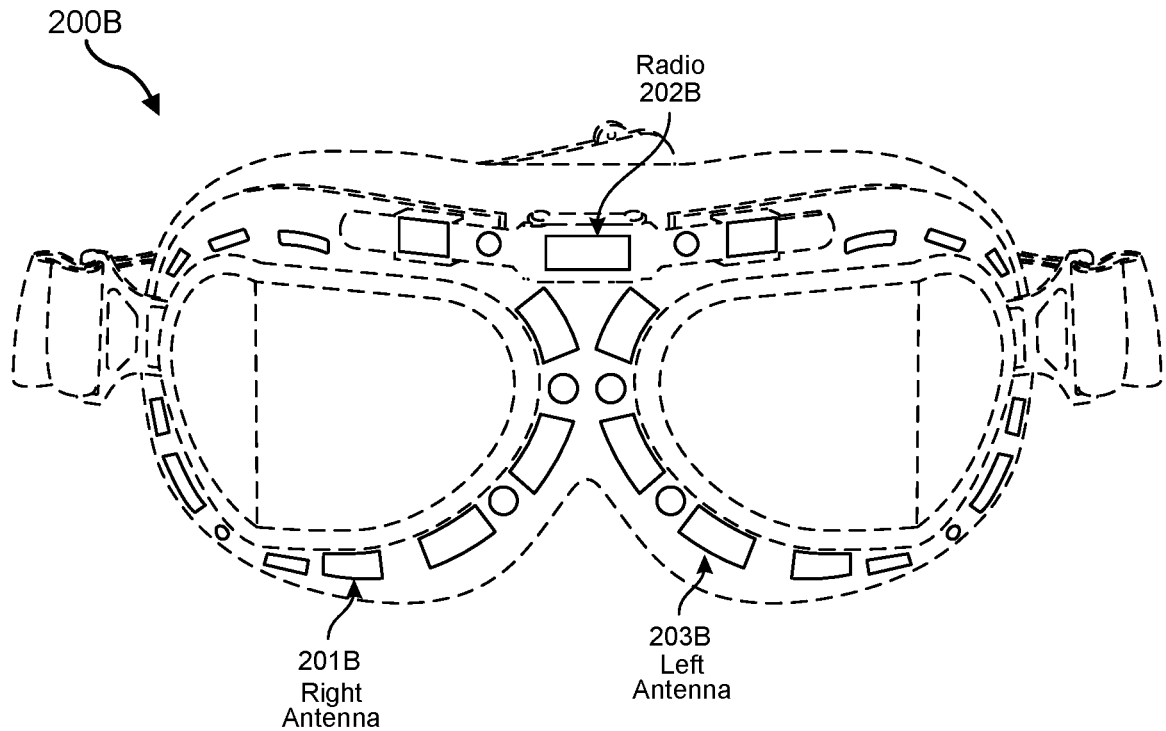
Figure 2C:
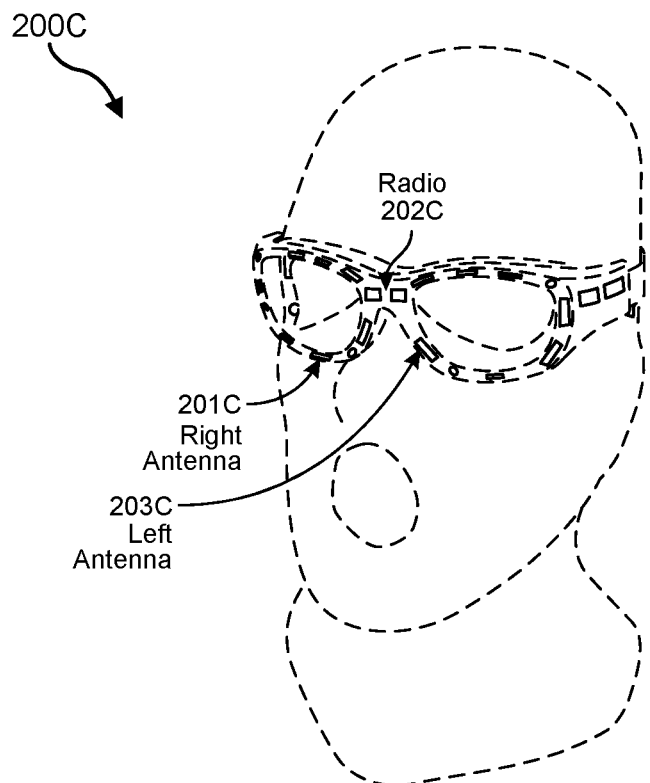

In some embodiments, as shown in FIG. 2A, the virtual reality head-mounted display 200A may include a right antenna 201A and a left antenna 203A. The right antenna 201A (or right antennas 201B-201J) may be connected to the radio 202A (e.g., a WiFi radio) via a wire or trace. Similarly, the left antenna 203A (or left antennas 203B-203J) may be connected to the radio 202A (or respective radios 202B-202J) via a separate wire or trace. In this embodiment, the traces may be routed around the exterior of the wearable device so as not to impede the wearer's view. However, in some cases, one or more of the traces may be routed through an internal portion of the wearable device (e.g., in artificial reality glasses 200D of FIG. 2D).

By placing the right and left antennas in the bottom portion of the wearable devices, the embodiments herein may avoid or reduce interference from other electronic or mechanical components, may place the antennas further away from the user's head, leading to higher antenna efficiency and may increase antenna throughput as these embodiments may provide high isolation between the antennas due to the physical distance between the antennas. Still further, the placement of the antennas on the bottom portion of the wearable devices may additionally increase efficiency by providing a similar level of operational performance from each antenna, as each antenna may lie a short and symmetrical distance from the radio 202A. Moreover, the wearable device 200A may implement an overmold piece that lies directly against the wearer's cheek. This overmold piece may lie between the antenna and the user's cheek. The overmold piece may be made of plastic or other RF transparent material, and may ensure that the antenna has a buffer between the antenna and the user's skin. This will be explained further below with regard to FIGS. 3A-3D.

The other wearable devices of FIGS. 2B-2J (i.e., wearable devices 200B-200J) may each include speakers, cameras, processors, radios (e.g., 202B-202J), IMUs, microphones, or other internal components. These wearable devices may also include hinges, clips, frames or other structural elements, or other components not shown. In like manner, each of these wearable devices 200B-200J may include a right antenna 201B-201J and a left antenna 203B-203J, each of which may be electrically connected to the radio(s) 202B-202J via wires or traces. In each of these cases, the wires or traces may be routed in a manner that provides a similar-length trace for each antenna.

Moreover, in each of these embodiments, substantially any type of antenna architecture may be implemented including monopole antennas, dipole antennas, loop antennas, slot antennas, or other types of antennas. Still further, while often described herein as having two antennas, each wearable device 200A-200J may include substantially any number of antennas and substantially any number of radios. In some embodiments, for example, both WiFi and Bluetooth antennas may be placed in the bottom rim portion of the wearable device, or WiFi, Bluetooth and cellular antennas, or other combinations of antennas. In such cases, the antennas may be sufficiently spaced from each other along the bottom rim portion to avoid or at least reduce interference caused by the other antennas or by the traces leading to the respective WiFi, Bluetooth, cellular, or other radios.

FIGS. 3A-3D illustrate embodiments of an antenna architecture 300A-300D that may include various components. Although laid out in a specific manner in FIGS. 3A-3D, it will be recognized that the metal trace material for the antenna (e.g., 310A-310D) may be arranged in other configurations and may include more or less trace material. In some cases, the metal trace material 310A-310D may be arranged in a loop for a loop antenna. In other cases, the metal trace material 310A-310D may be arranged in a monopole or dipole fashion for monopole or dipole antennas, or may be arranged in a slot for a slot antenna. Moreover, the overmold portion 308A-308D may include more or less material and may be arranged in different shapes and different locations. The grounding clip 303A-303D, the cable 302A-302D, the molded piece 306A-306D, and other components may also be moved into different locations in different embodiments.

Figure 3A:
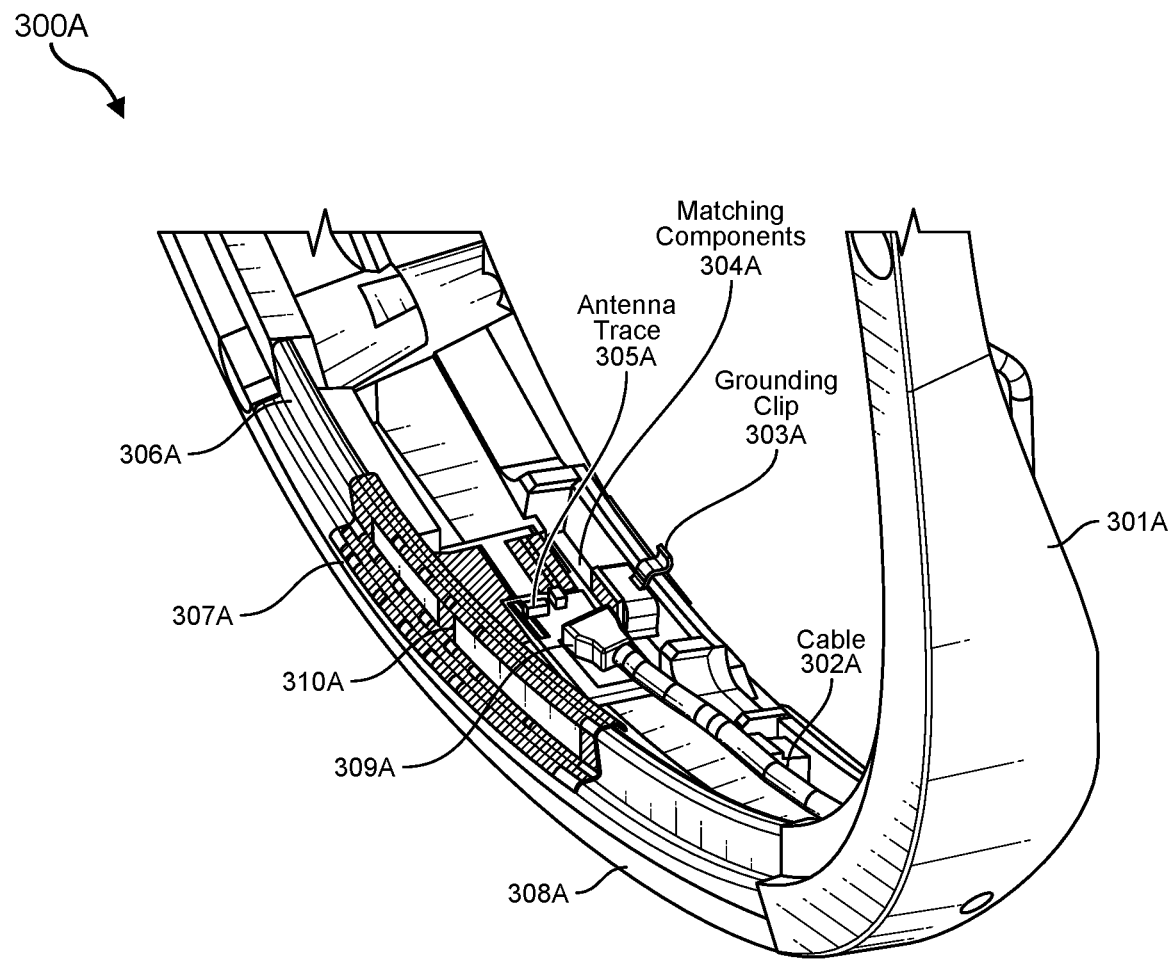
FIGS. 3A-3D illustrate various exemplary embodiments of antenna architectures on different wearable devices.

For instance, different types of wearable devices (e.g., 100A-100J of FIGS. 1A-1J) may have different sizes, shapes, components, and other limiting factors. Accordingly, the components of the antenna architecture 300A-300D may be altered to accommodate those limitations. The virtual reality headset 300A of FIG. 3A, for example, may include a frame portion 301A. The visible section illustrated in FIG. 3A shows a bottom half of a virtual reality HMD's right side. The virtual reality HMD may include an antenna architecture that has an antenna 310A whose metal trace may begin at point 305A. Matching components 304A and other antenna feed components may be connected to the antenna trace 305A. A grounding clip 303A, a grounding pin, or other grounding mechanism may be implemented to ground the antenna 310A to the frame 301A.

The signals received by or transferred to the antenna 310A may be communicated through the wire or cable 302A. This cable 302A may electrically connect to the antenna 310A via a clip or pin 302A-302D and may carry signals to one or more radios (e.g., positioned in the nose bridge of the wearable device). The VR headset 300A may also include a molded portion 306A that may be injection molded or otherwise shaped to provide support for the metal traces of the antenna 310A. For example, the molded portion 306A may provide support for a loop shape or a dipole shape, etc. The molded portion 306A may be connected to an overmold portion 308A via a bond 307A. This bond 307A may be created using glue, fasteners (e.g., screws), clips, or some other type of bond. The overmold portion 308A may provide a layer of separation between the antenna 310A and the user's head. For instance, as shown in FIG. 3A, the overmold portion 308A may rest on a user's cheek, thereby raising the antenna up off of the user's skin. The overmold may be manufactured using an RF transparent material so as not to interfere with the transmission or reception of the antenna 310A.

Figure 3B:
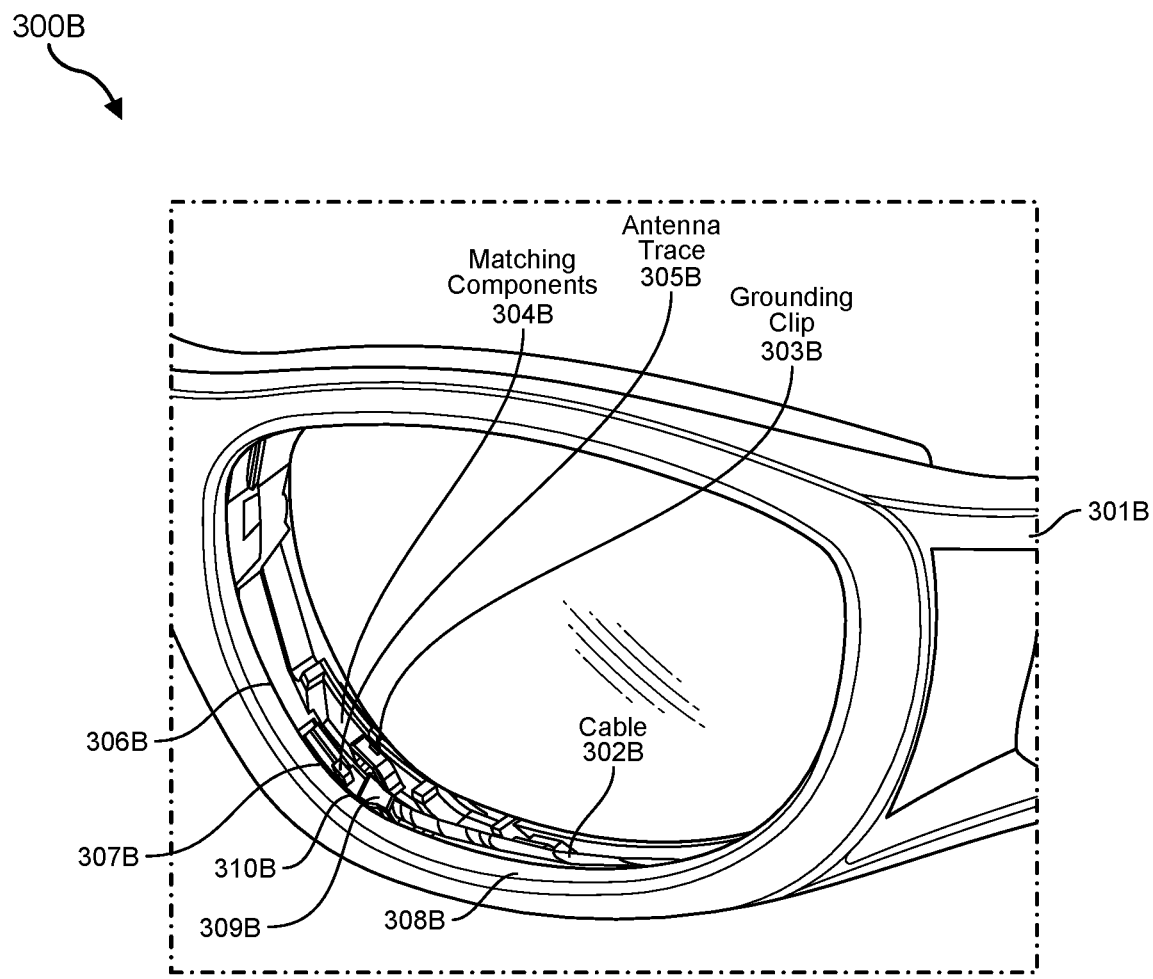
Figure 3C:
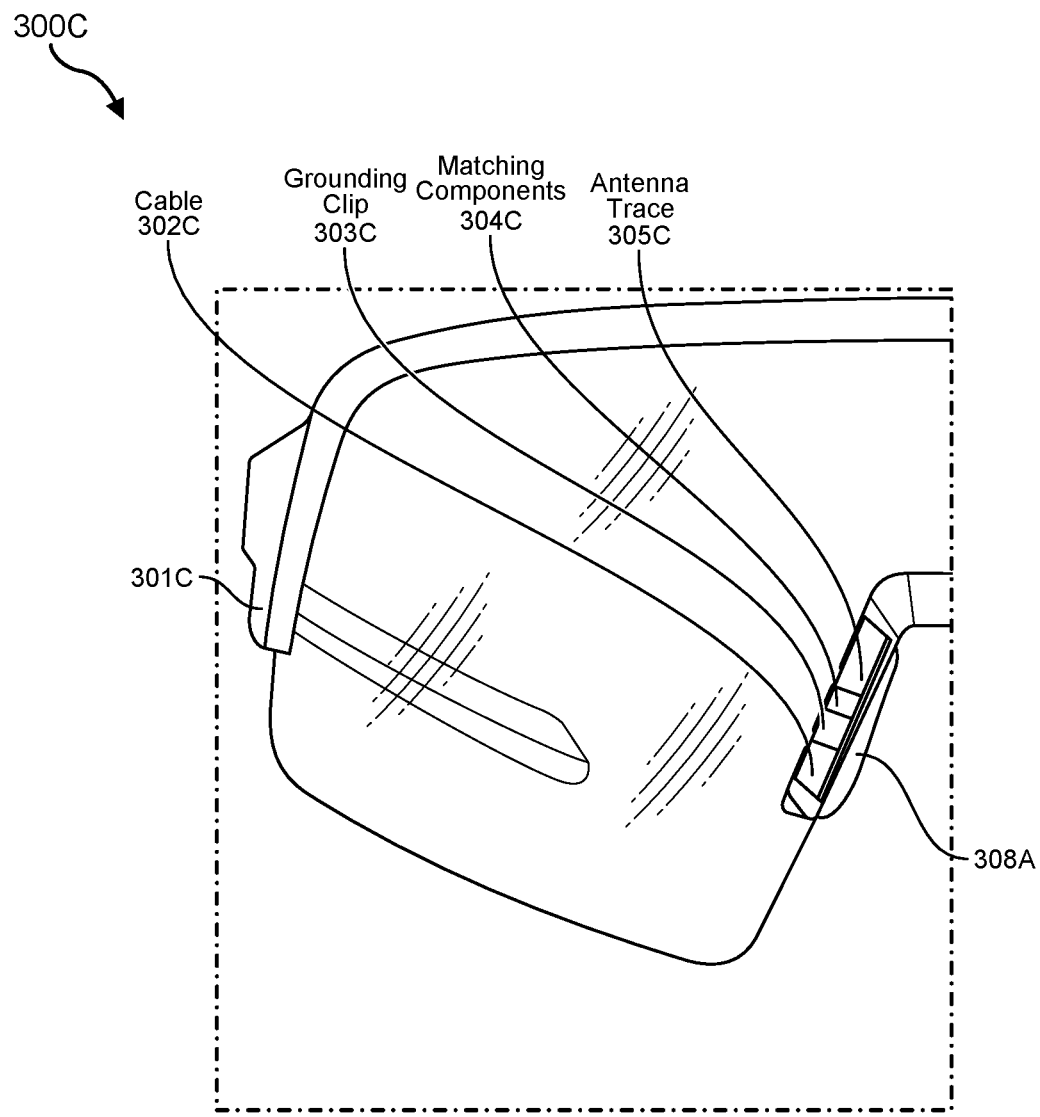
Figure 3D:
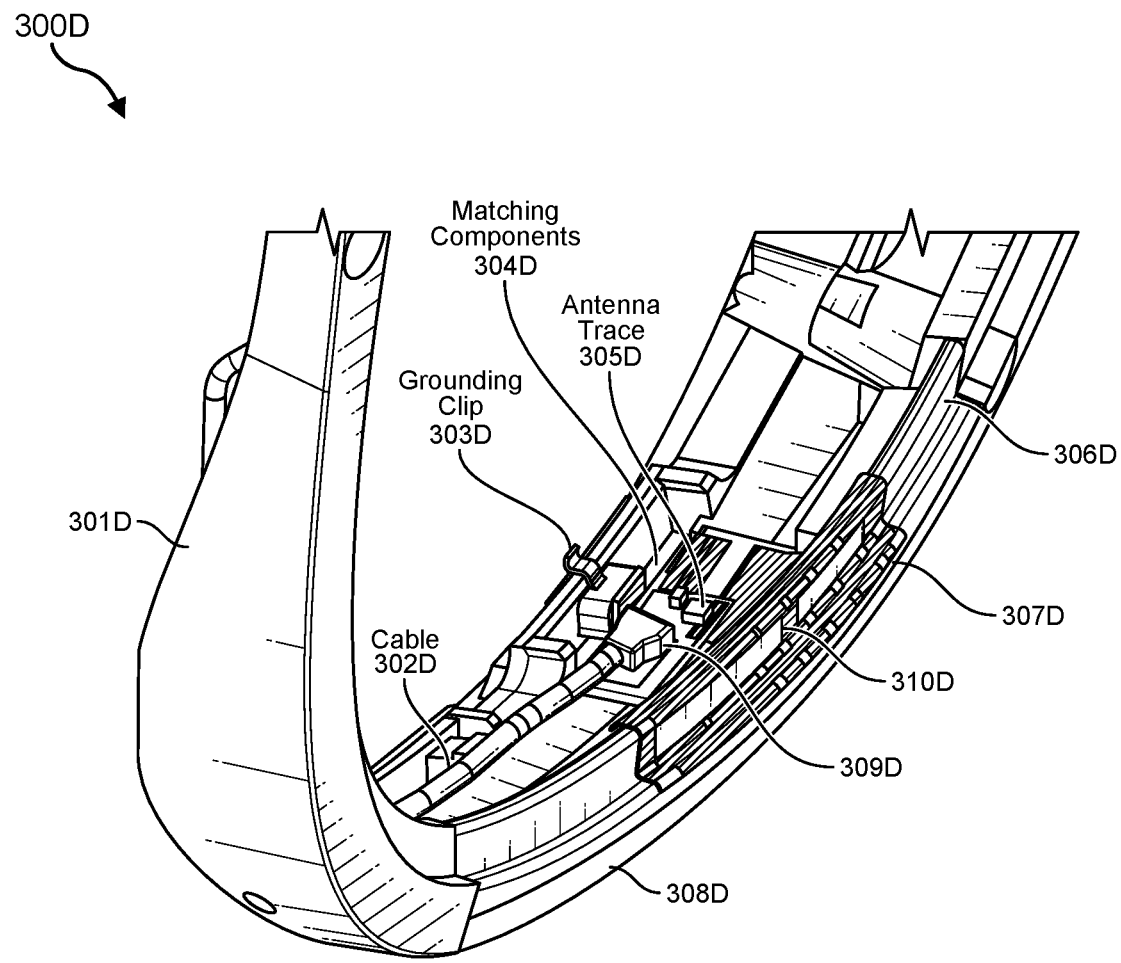

The sport goggles 300B of FIG. 3B, the sporting eyewear 300C of FIG. 3C, and the artificial reality glasses 300D of FIG. 3D may each include similar components including a frame 301B-301D and an antenna 310B-310D having a beginning point at 305B-305D. The antenna 310B-310D may be formed over a molded portion 306B-306D, which itself is bonded (e.g., via bond 307B-307D) to an overmold portion 308B-308D. These wearable devices may also include grounding clips 303B-303D that are attached to at least a portion of the frame 301B-301D or other grounded structure, as well as antenna impedance matching components 304B-304D and cables 302B-302D that transfer signals to and from the antenna 310B-310D. As will be shown further below, the antenna 310B-310D may be moved to different positions within the bottom rim portion of the wearable devices.

In this general position in the bottom rim portion of the wearable device, the antennas may be positioned away from other device components and may be isolated from each other by being placed on the right or the left side of the wearable devices. This isolation may increase the efficiency of each antenna and may further increase the data throughput of the device. Moreover, at least in some cases, the antenna(s) of the left side may be mirror images of those on the right side shown in FIGS. 3A-3D. Because the antennas are mirror images, the cables 302A-302D may run along interior portions of the wearable devices and may run for similar (or the same) lengths. This similarity in cable length may ensure that each antenna has a similar (high) level of performance. If, for some reason, performance begins to drop for one of the antennas (e.g., due to occlusion by one of the user's hands or fingers), the one or more other antennas on the device may be used instead for at least some period of time.

FIGS. 4A-4D illustrate a bottom perspective view of different types of eyewear that may be used as wearable electronic devices. Indeed, any of the eyewear devices described herein may include artificial reality or virtual reality components that present artificial or virtual images to a user's eyes. The virtual reality headset 400A of FIG. 4A, for example, may include display components that present images to a user's eyes (e.g., user 405A). The virtual reality headset 400A may communicate with external computer systems or other electronic devices via one or more antennas including left antenna 402A. The left antenna 402A may be placed in a bottom rim portion 407A of the virtual reality headset 400A. At least in some embodiments, the top portion 406A of the virtual reality headset 400A may include other electronic and/or mechanical components, as generally shown in FIG. 2A. These components may be affixed to the frame 401A of the virtual reality headset 400A. The left antenna 402A may include antenna feed components including a grounding clip 403A that grounds the antenna 402A to a metal portion 404A that may be part of a metal frame or subframe. In this embodiment, the left antenna 402A is depicted as being positioned toward the front face of the virtual reality headset 400A. This may place a distance between the cheek of the user 405A and the antenna 402A. This distance may increase the operating efficiency of the antenna.

Figure 4A:
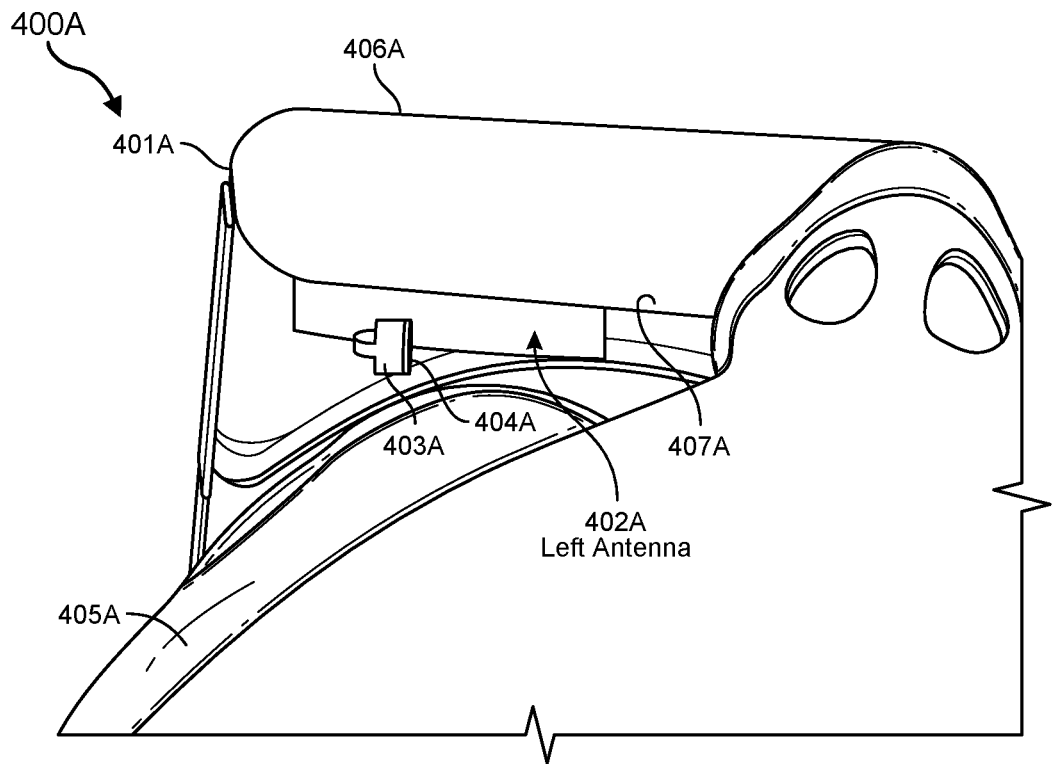
FIGS. 4A-4D illustrate alternative views of different exemplary embodiments of antenna architectures on different wearable devices.
Figure 4B:
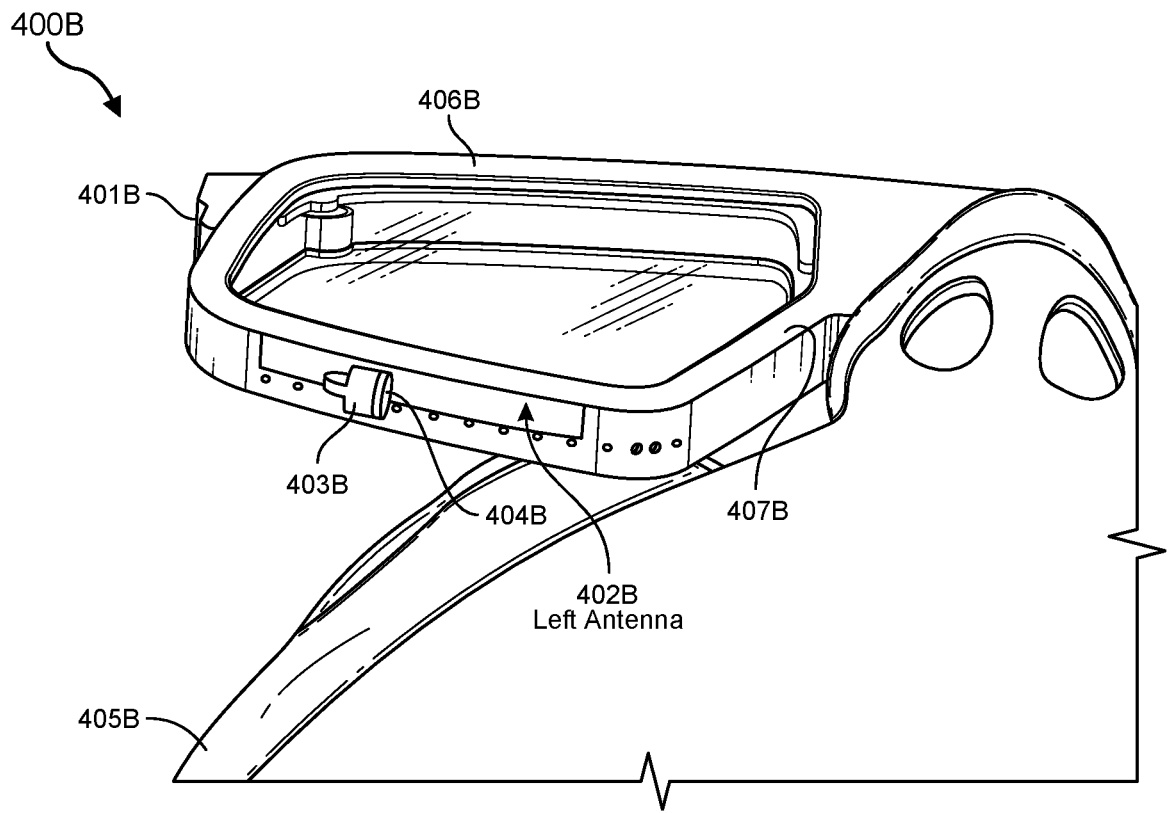
Figure 4C:
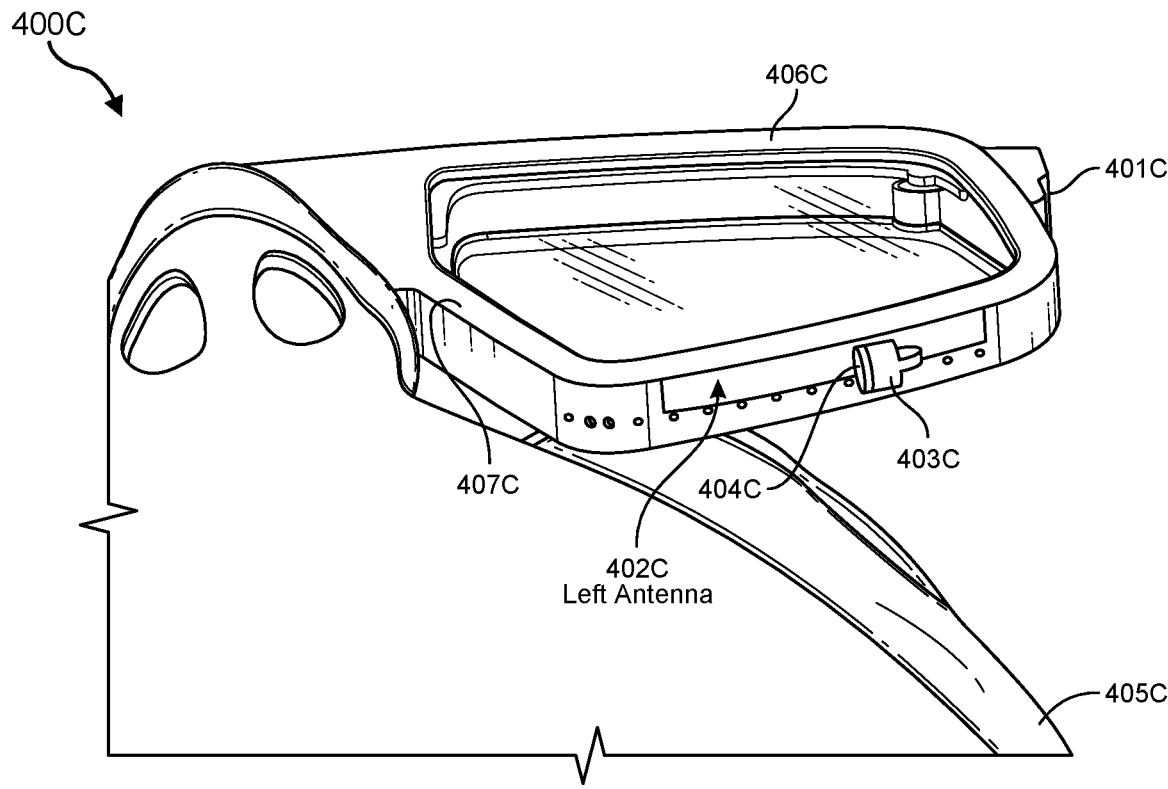
Figure 4D:
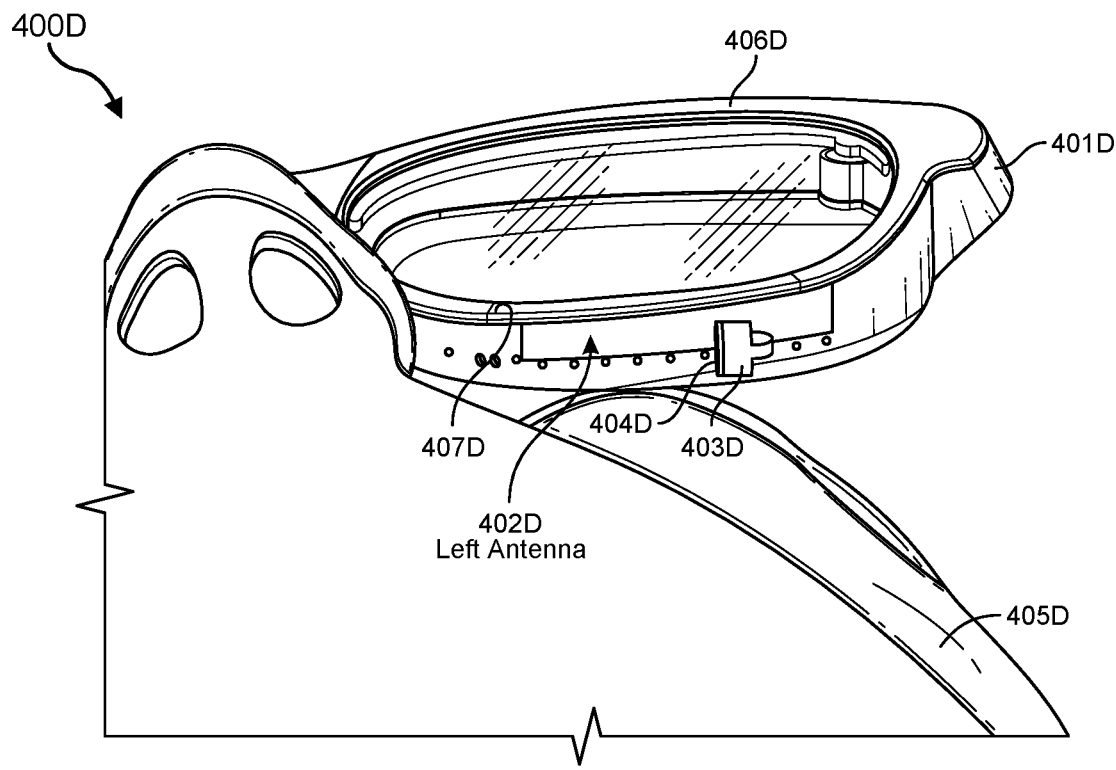
Figure 5A:
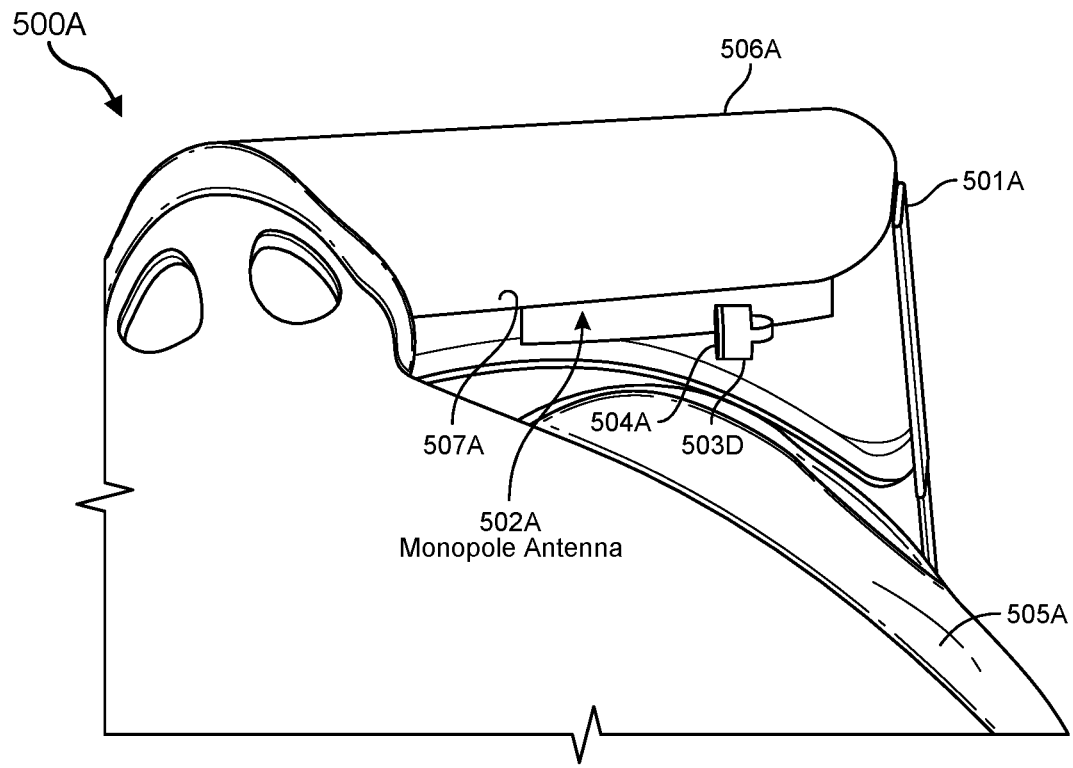
FIGS. 5A-5D illustrate different antenna architectures on a specific wearable electronic device.
Figure 5B:
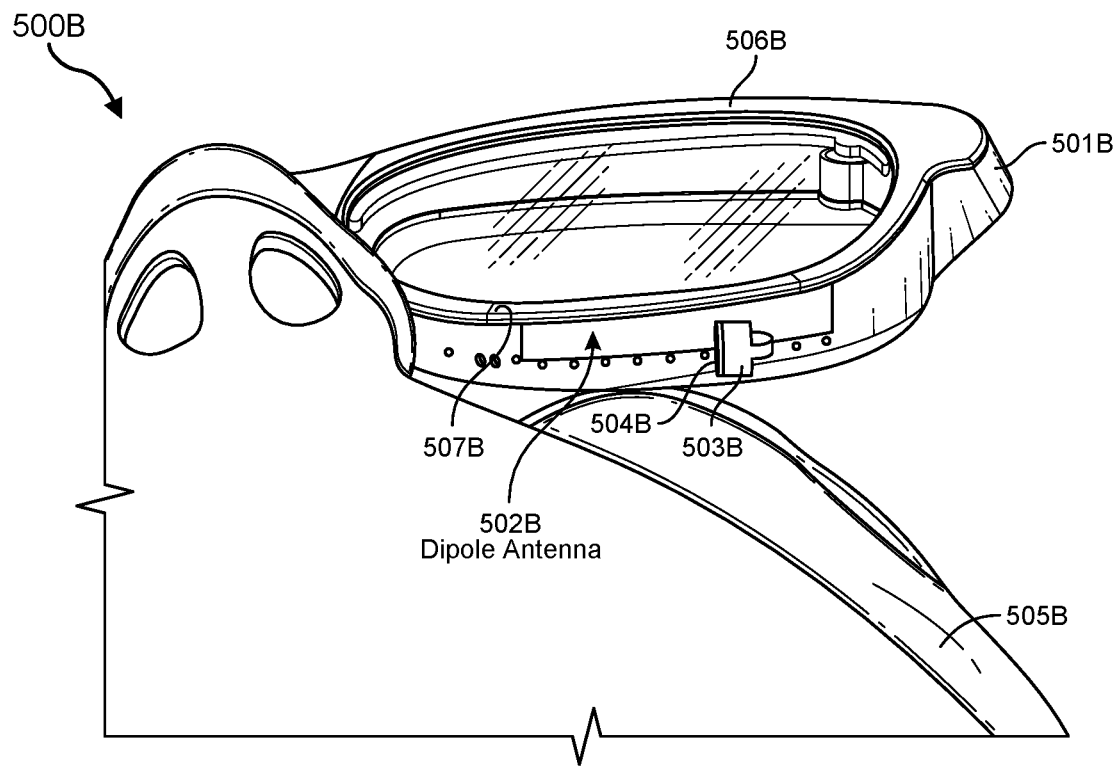
Figure 5C:
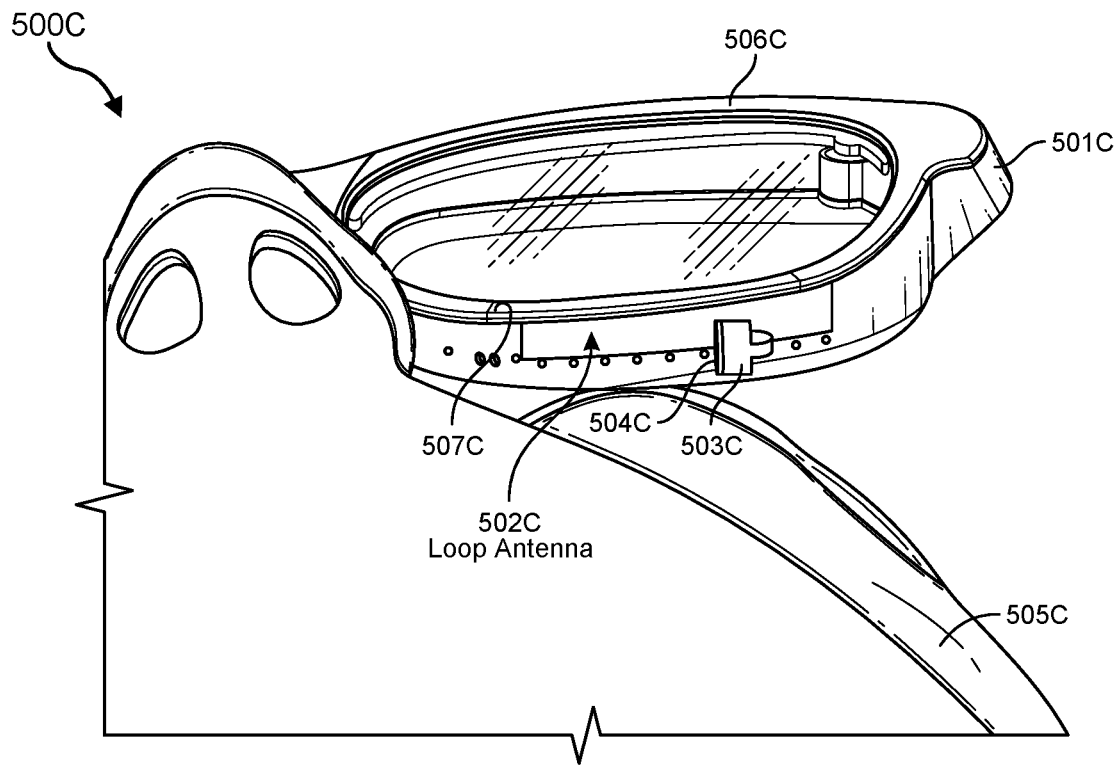
Figure 5D:
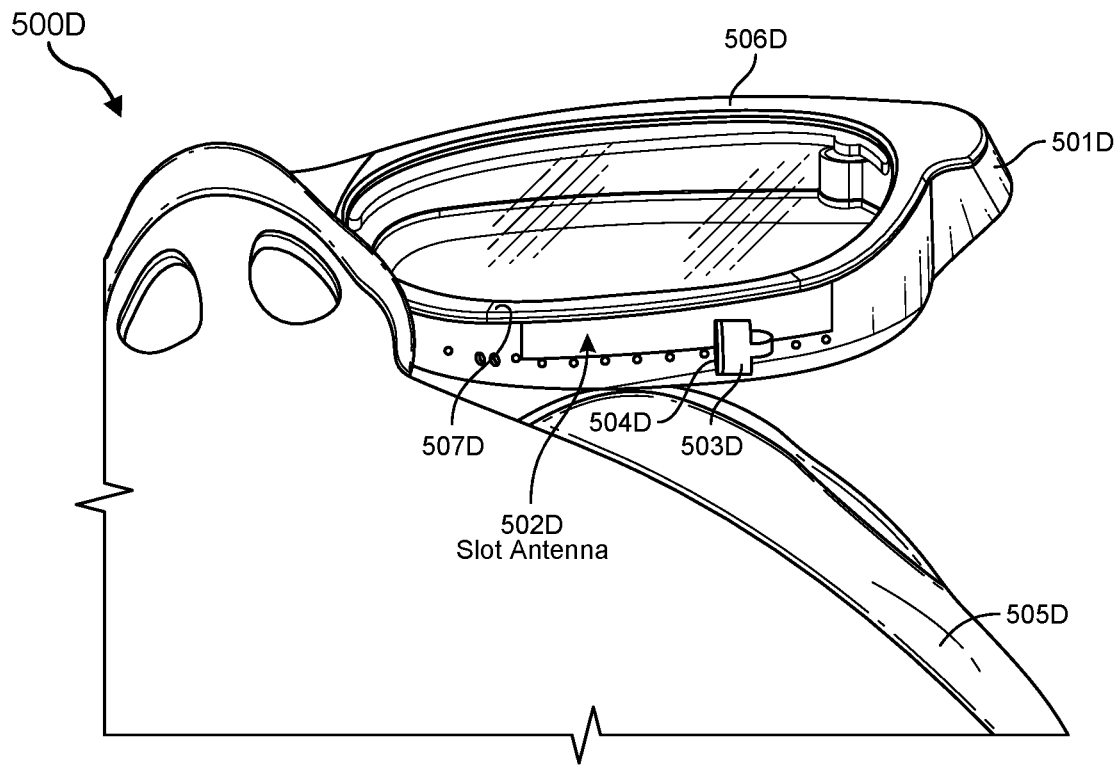

FIGS. 4B-4D illustrate other embodiments of eyewear that may be used as wearable electronic devices, including the sport goggles 400B of FIG. 4B, the sporting eyewear 400C of FIG. 4C, or the artificial reality glasses 400D of FIG. 4D. Each of these devices 400B-400D may include top portions 406B-406D or "brow bar" portions, bottom portions 407B-407D or "bottom rim" portions, frames 401B-401D, left antennas 402B-402D, grounding clips 403B-403D, metal portions 404B-404D, and an associated wearer of the device 405B-405D. In some cases, as will be described further below, the left antenna 402B-402D may be moved along the z-axis closer toward the user's cheek, or may be moved inward along the x-axis toward the nose bridge of the device, or may be moved outward along the x-axis toward the outer edge of the device. In some cases, the antenna may additionally or alternatively be moved upward along the y-axis, such that the antenna is moved upward along the inner curve of the device toward the nose bridge, or upward along the outer curve of the device toward the outer edge of the device. Moving the antenna to different positions may provide less interference from other components, may change the length of the cable connecting the antenna to the radio, may provide additional distance between the left and right antennas leading to greater isolation and higher operational efficiency, and/or may provide other operational changes in how the antennas function, either alone or in cooperation with each other. These concepts will be explained further below with regard to FIGS. 7A-10D.

FIGS. 5A-5D illustrate eyewear device embodiments in which different types of antenna architectures are implemented. The wearable electronic devices 500A-500D of FIGS. 5A-5D may include some or all of the same components shown in FIGS. 4A-4D, including antennas 502A-502D, grounding clips 503A-503D, metal portions 504A-504D to which the antennas are grounded, frames 501A-501D, top portions 506A-506D, and bottom rim portions 507A-507D. Each of the wearable devices 500A-500D may be worn by a user 505A-505D. The antennas on the various devices may differ in different embodiments. For example, the virtual reality headset 500A of FIG. 5A may include a monopole antenna, the sport goggles 500B of FIG. 5B may include a dipole antenna, the sporting eyewear 500C of FIG. 5C may include a loop antenna, and the artificial reality glasses 500D of FIG. 5D may include a slot antenna. These are merely examples, and it will be understood that any wearable device may include any type of antenna architecture. These embodiments demonstrate, however, that different antenna architectures may be implemented in different types of wearable devices. Moreover, it will be understood that any of these wearable devices 500A-500D may include not just a single type of antenna architecture, but multiple different types of antenna architectures within the same device. Thus, the artificial reality glasses 500D of FIG. 5D, for example, may include both a loop antenna and a dipole antenna, for example, or may include a monopole, a dipole, and a slot antenna. Many different variations are possible and are contemplated herein.

Figure 2D:
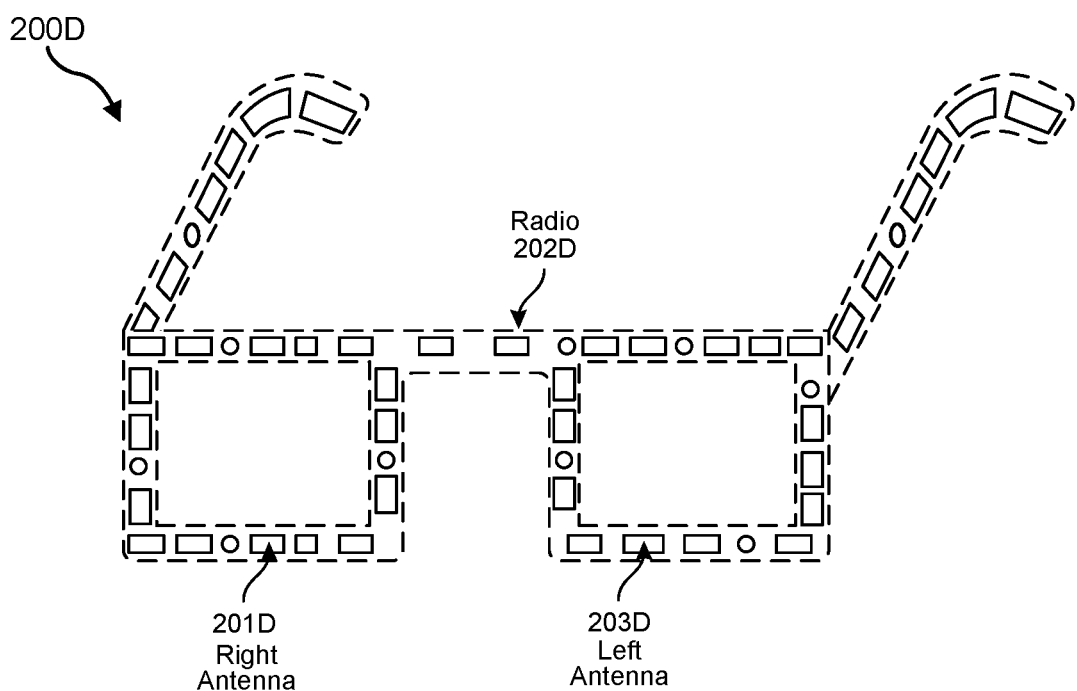
Figure 2E:
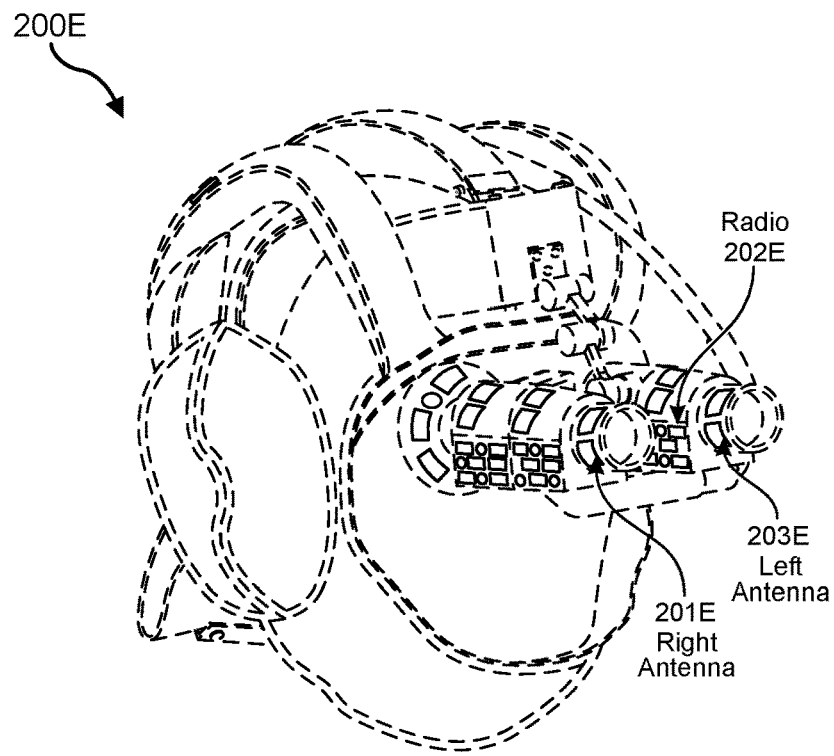
Figure 2F:
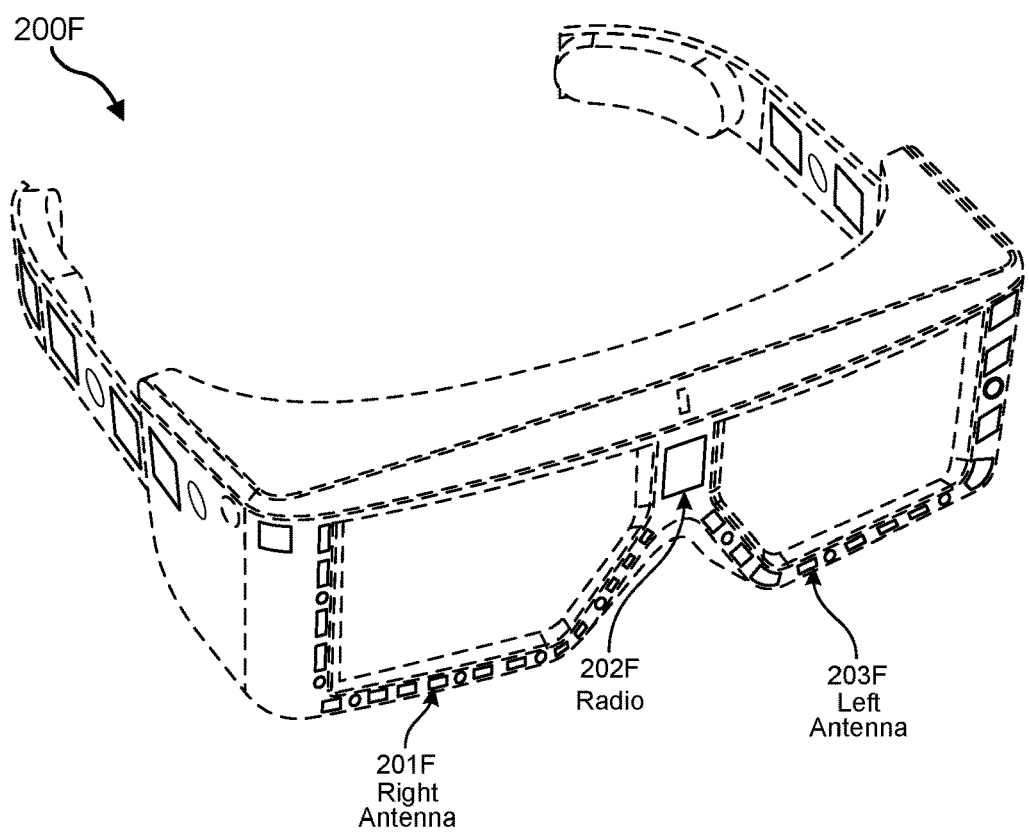
Figure 2G:
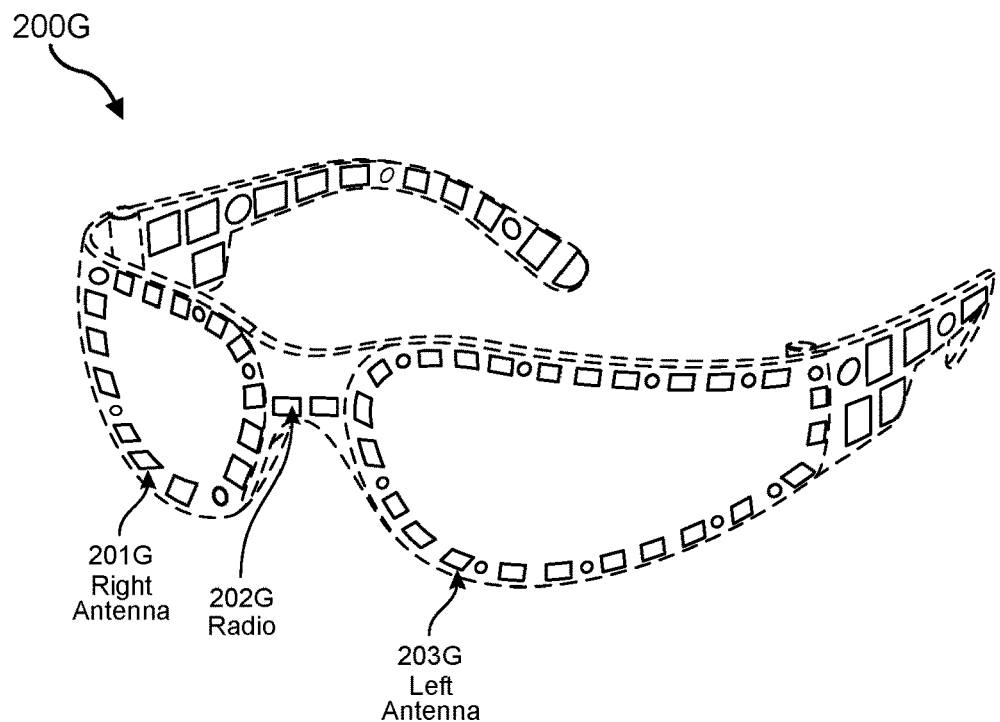
Figure 2H:
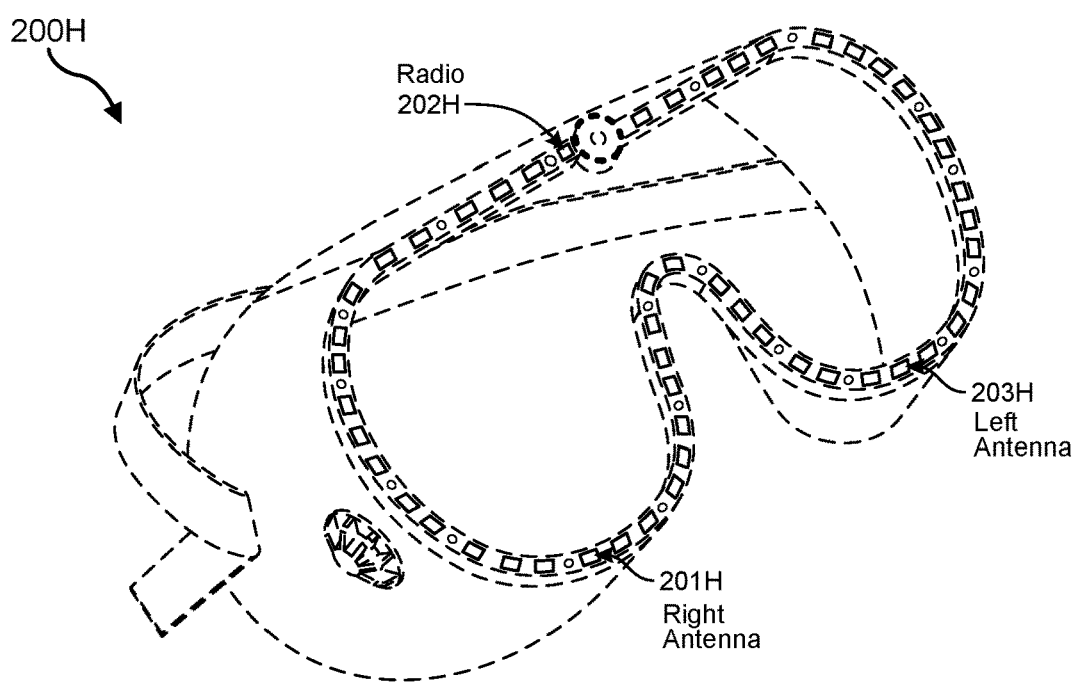
Figure 2I:
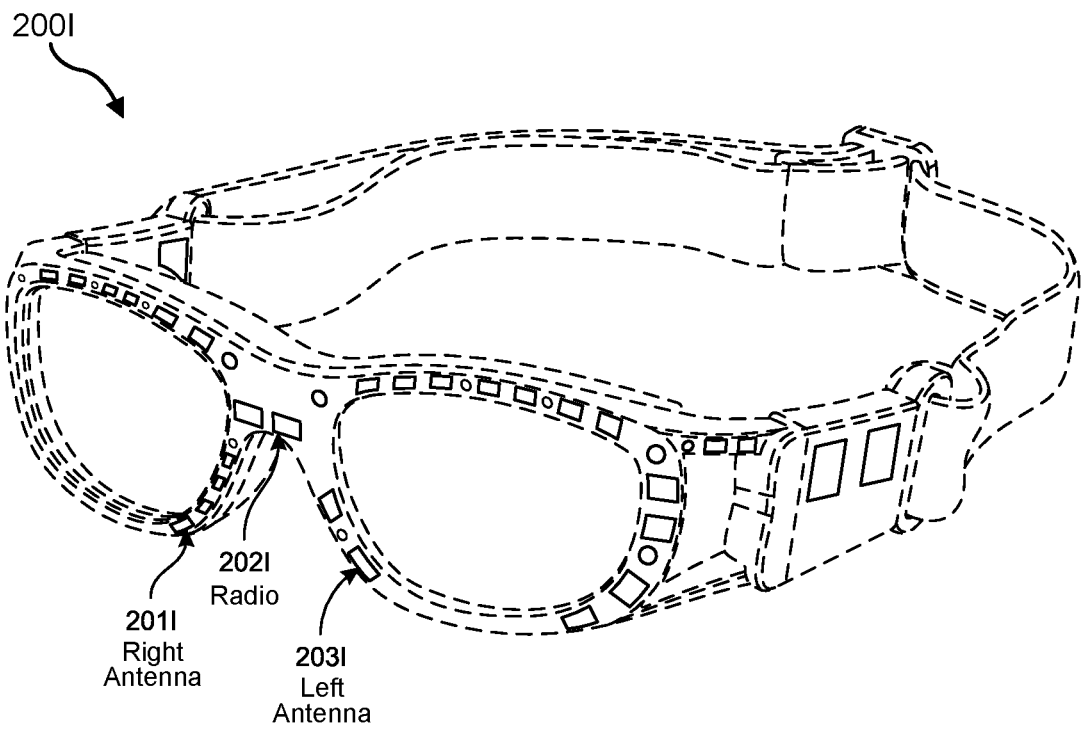
Figure 2J:
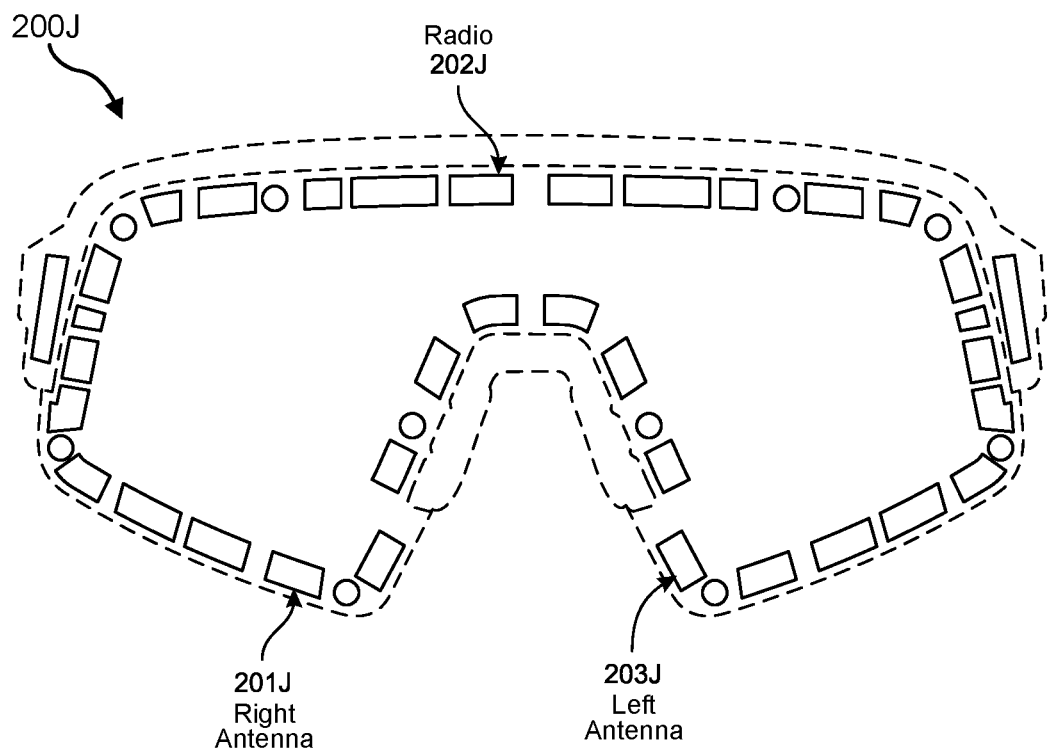
Figure 6A:
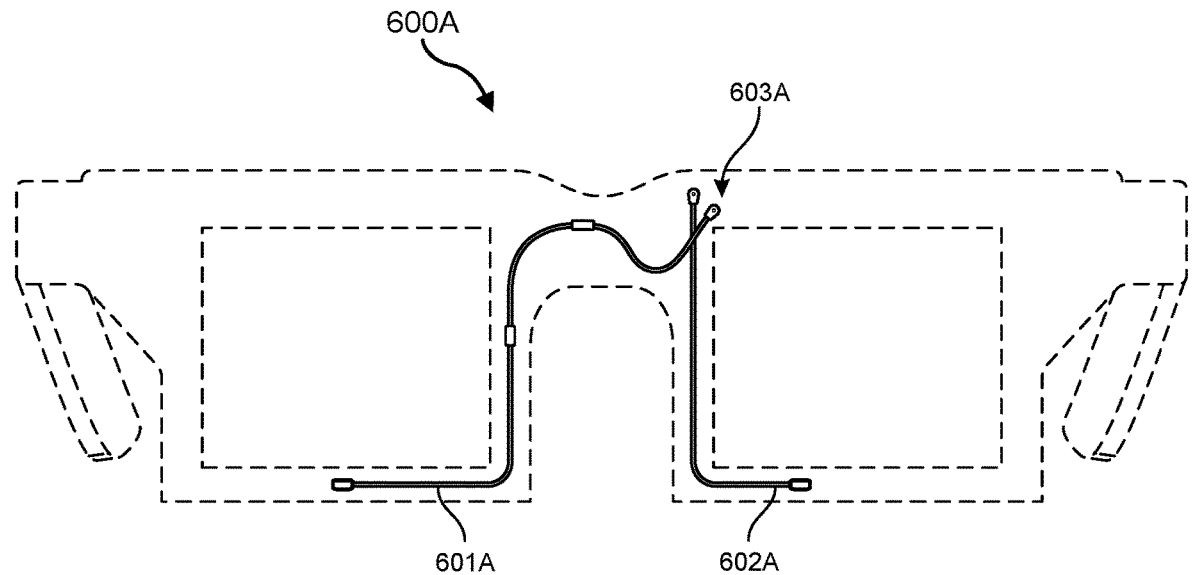
FIGS. 6A-6D illustrate different wire routing embodiments for antennas on a specific wearable electronic device.

In some cases, the wiring or traces used in these various embodiments to electrically connect the antennas to the corresponding radios may be routed in different manners. For example, as shown in FIGS. 6A-6D, a pair of artificial reality glasses 600A-600D may include different wire routing embodiments. For instance, FIG. 6A illustrates an embodiment in which a right wire 601A connecting a right antenna to a radio 603A may travel along an interior portion of the artificial reality glasses toward and ultimately cross the nose bridge portion of the glasses. The left wire 602A connecting a left antenna to the radio 603A may travel along an opposite-side interior portion of the artificial reality glasses 600A toward but not crossing the nose bridge. In this manner, the wires 601A/602A may be similar in length and, as such, may provide similar operational capabilities. In some embodiments, the radio(s) may be placed in the nose bridge portion of the artificial reality glasses (as shown in FIG. 2D, for example). In such cases, the wires 601A/602A may be identical in length or substantially identical in length. This may provide even greater parity in performance between the left and right antennas.

Figure 6B:
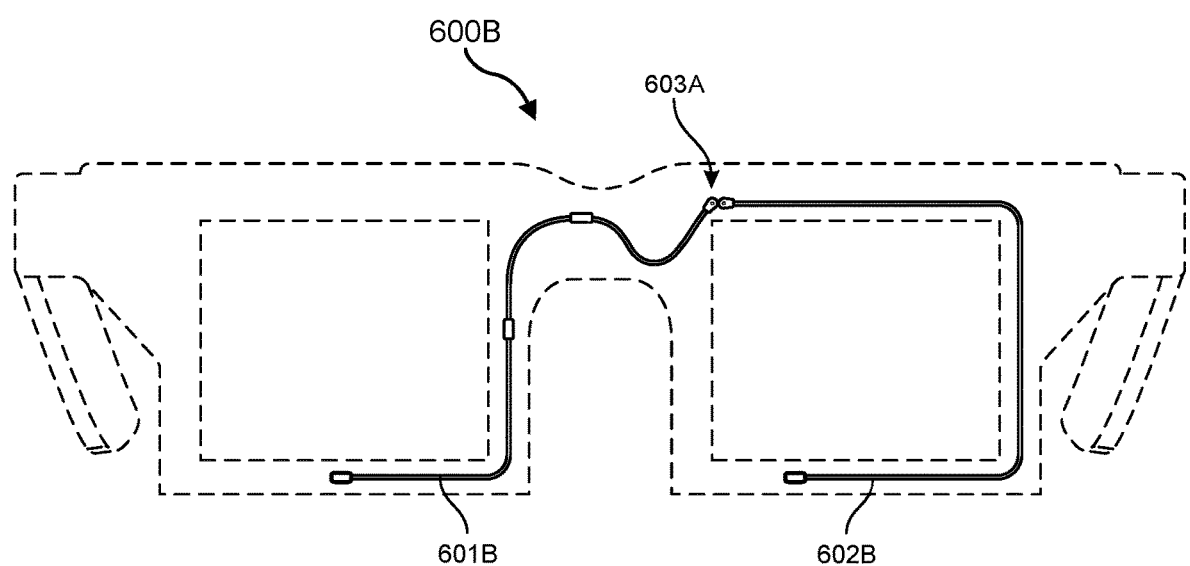
Figure 6C:
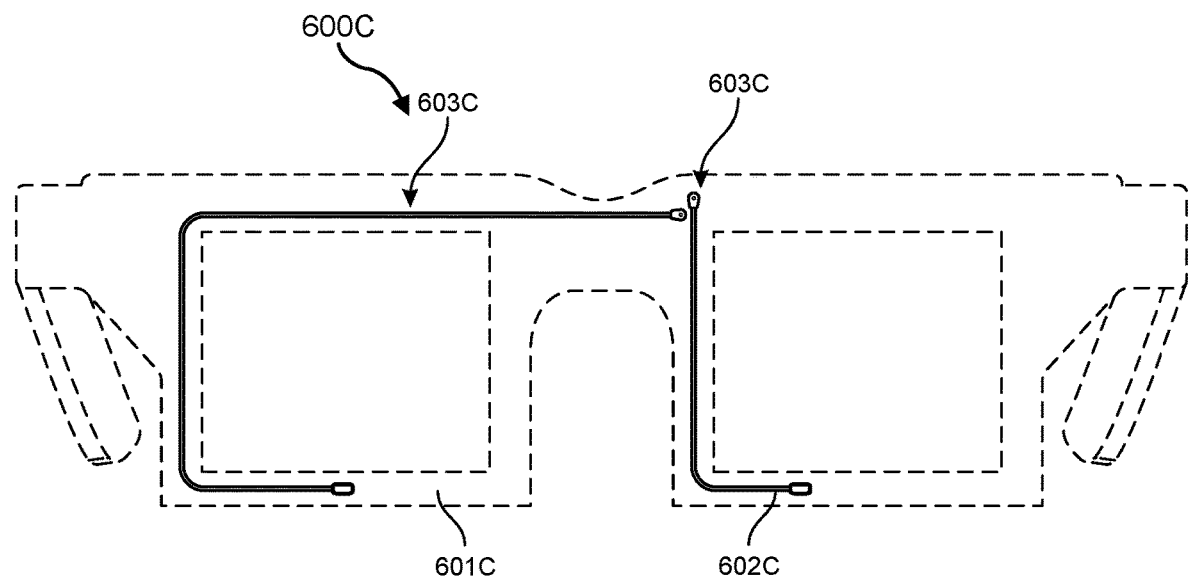
Figure 6D:
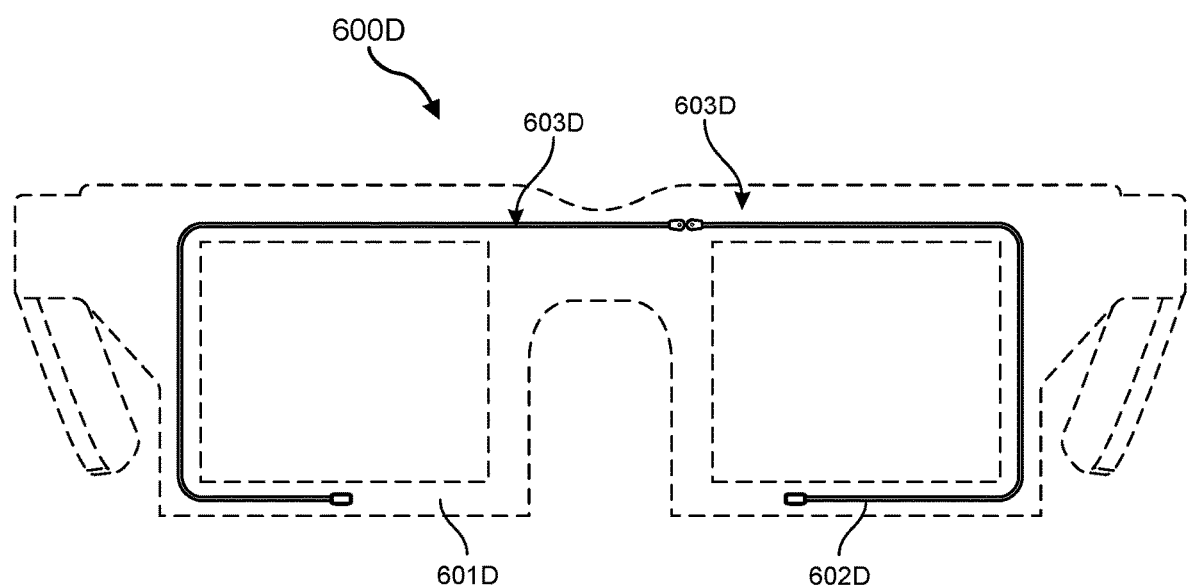
Figure 7A:
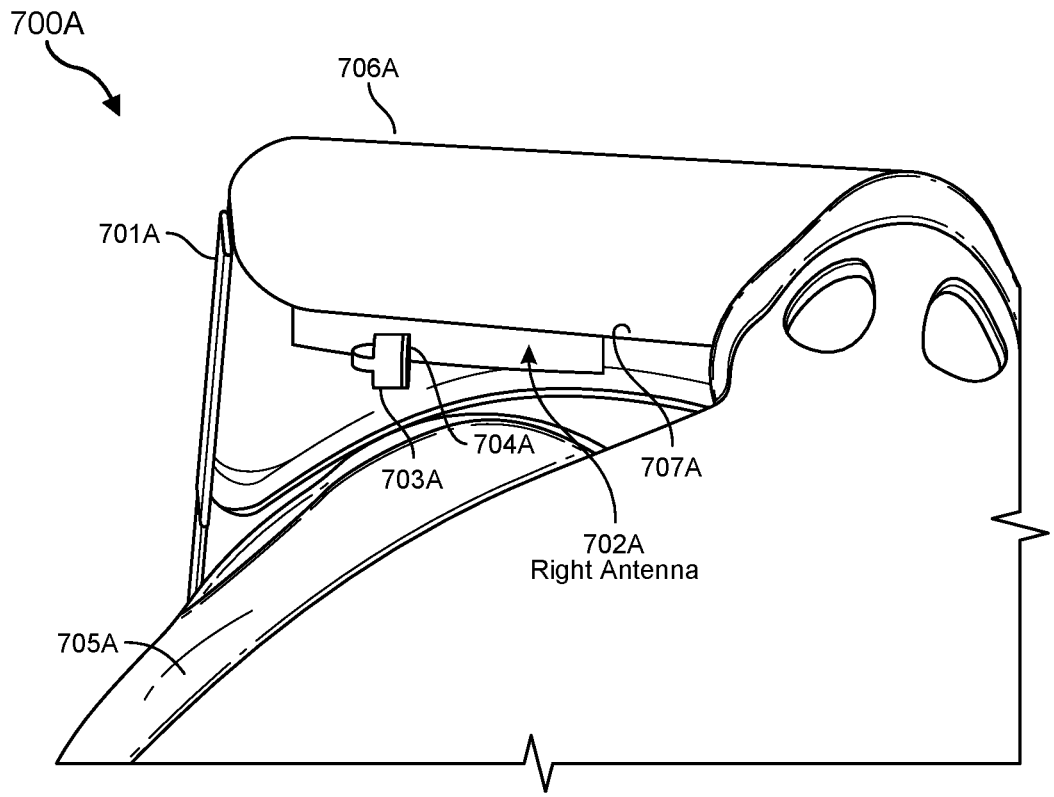
FIGS. 7A-7D illustrate different antenna placement embodiments for antennas on different wearable electronic devices.
Figure 7B:
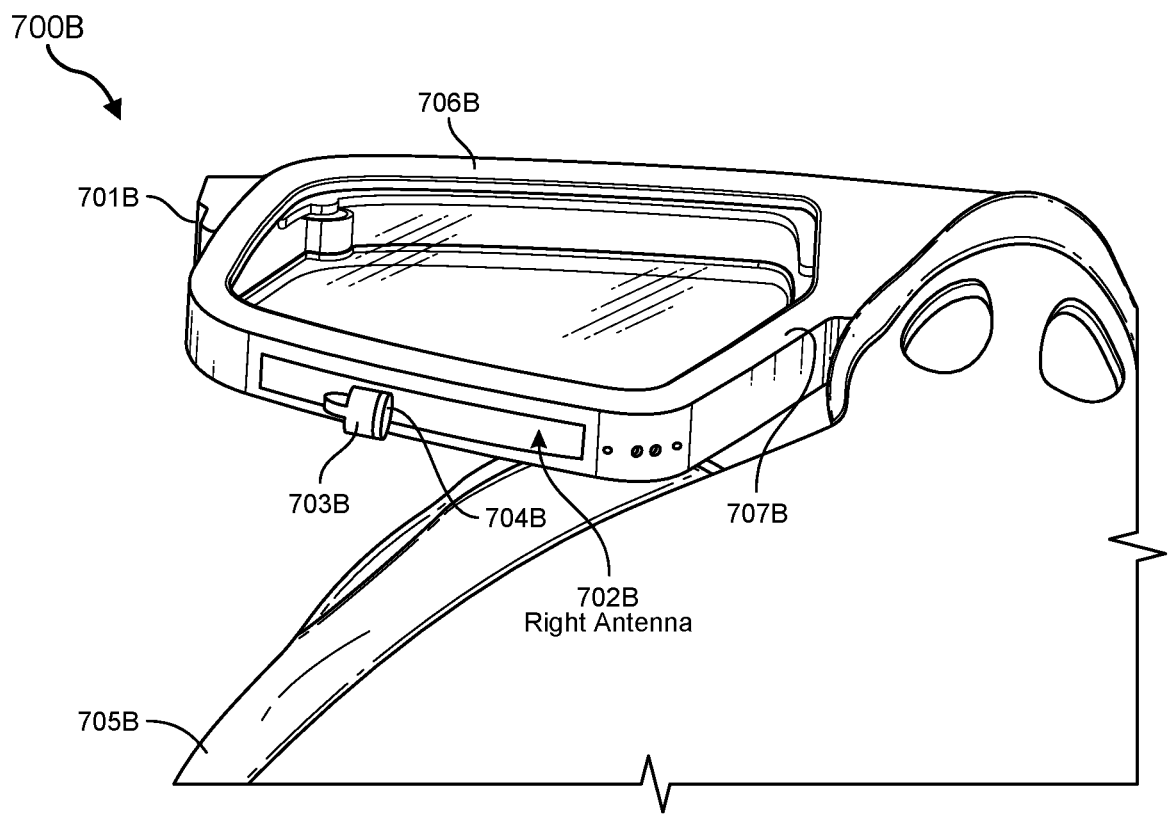
Figure 7C:
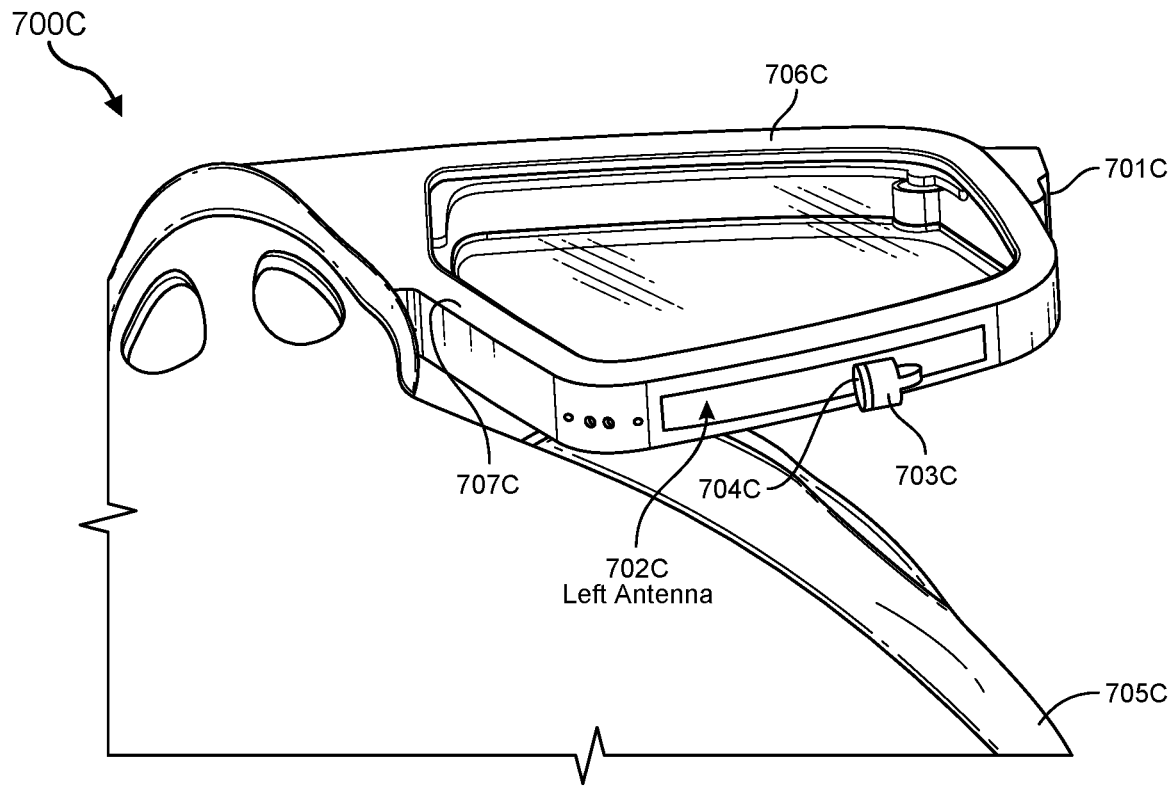
Figure 7D:
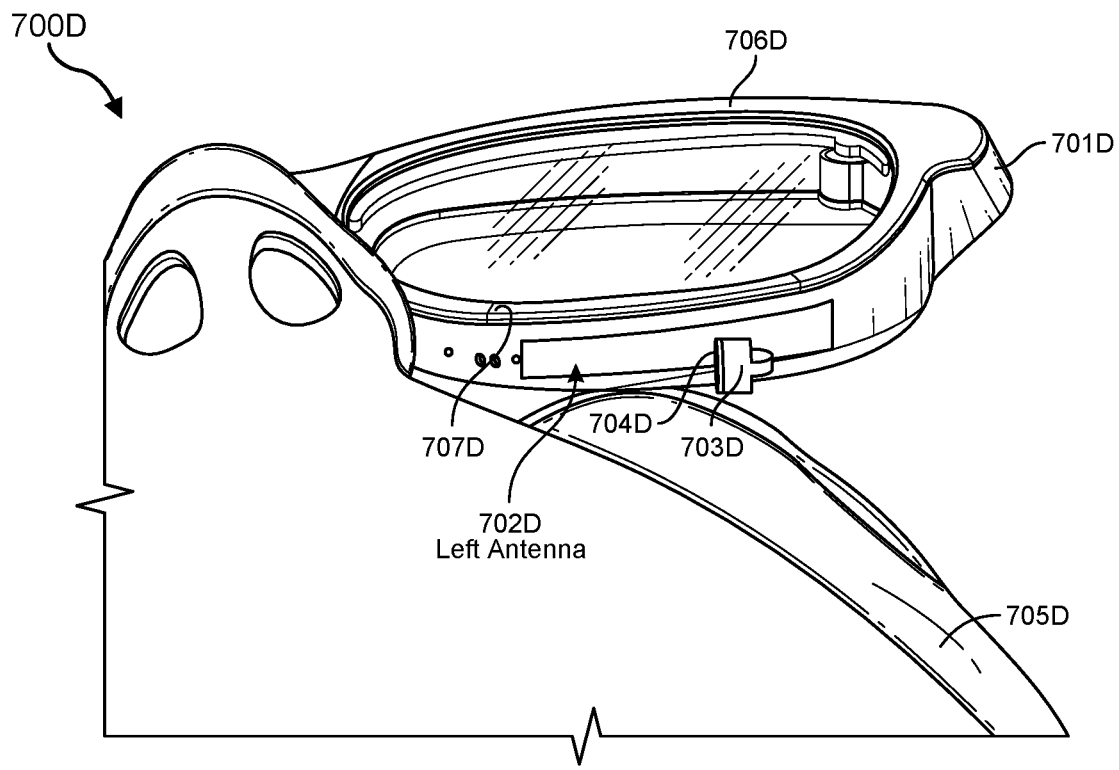
Figure 8A:
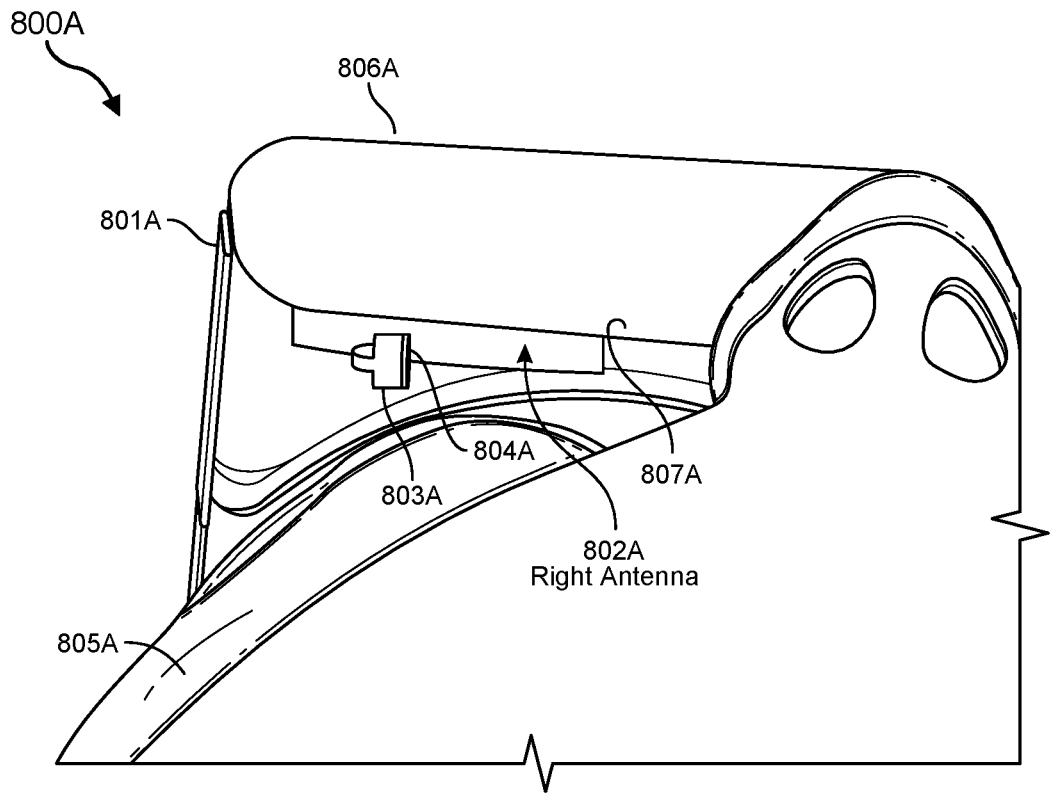
FIGS. 8A-8D illustrate alternative antenna placement embodiments for antennas on different wearable electronic devices.
Figure 8B:
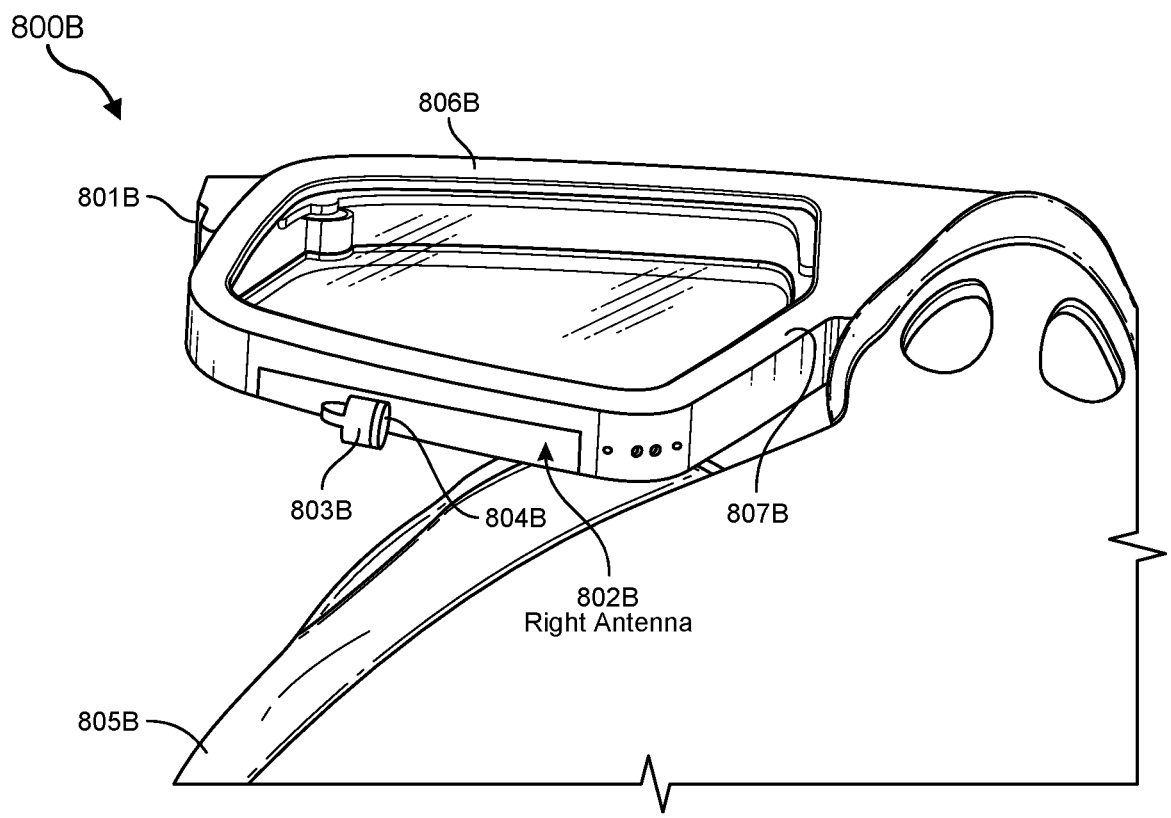
Figure 8C:
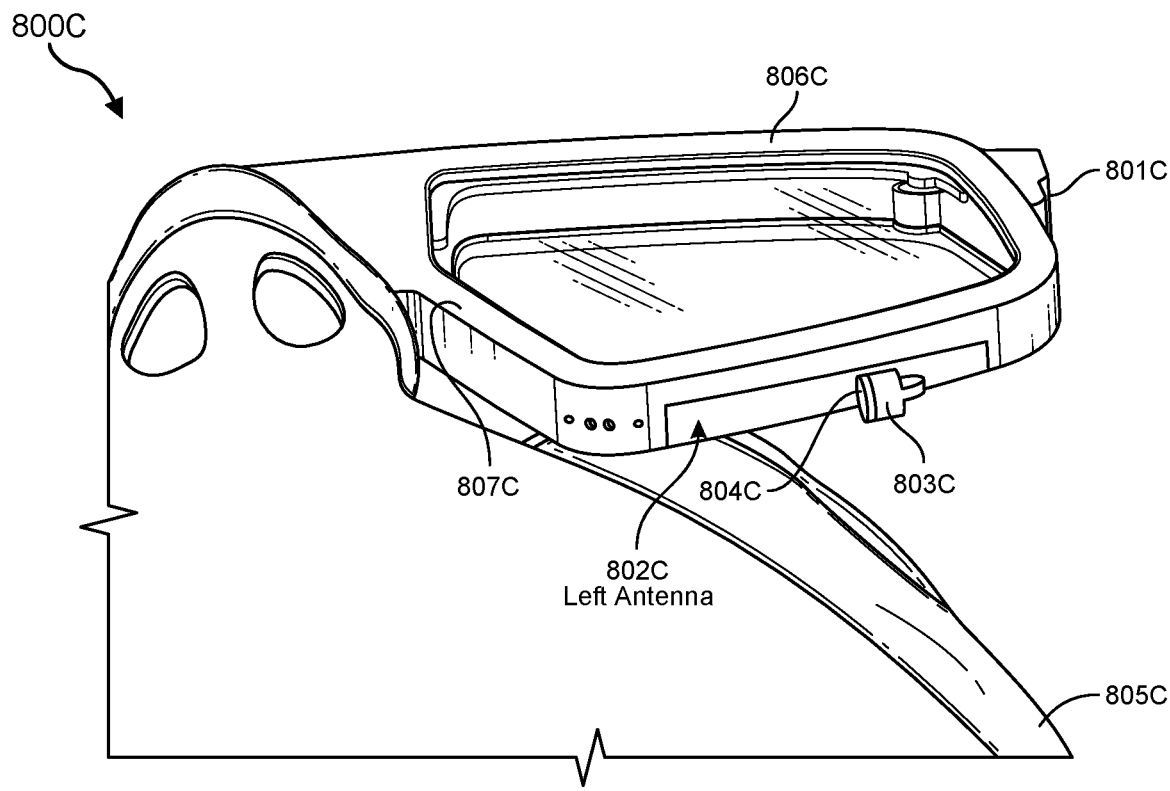
Figure 8D:
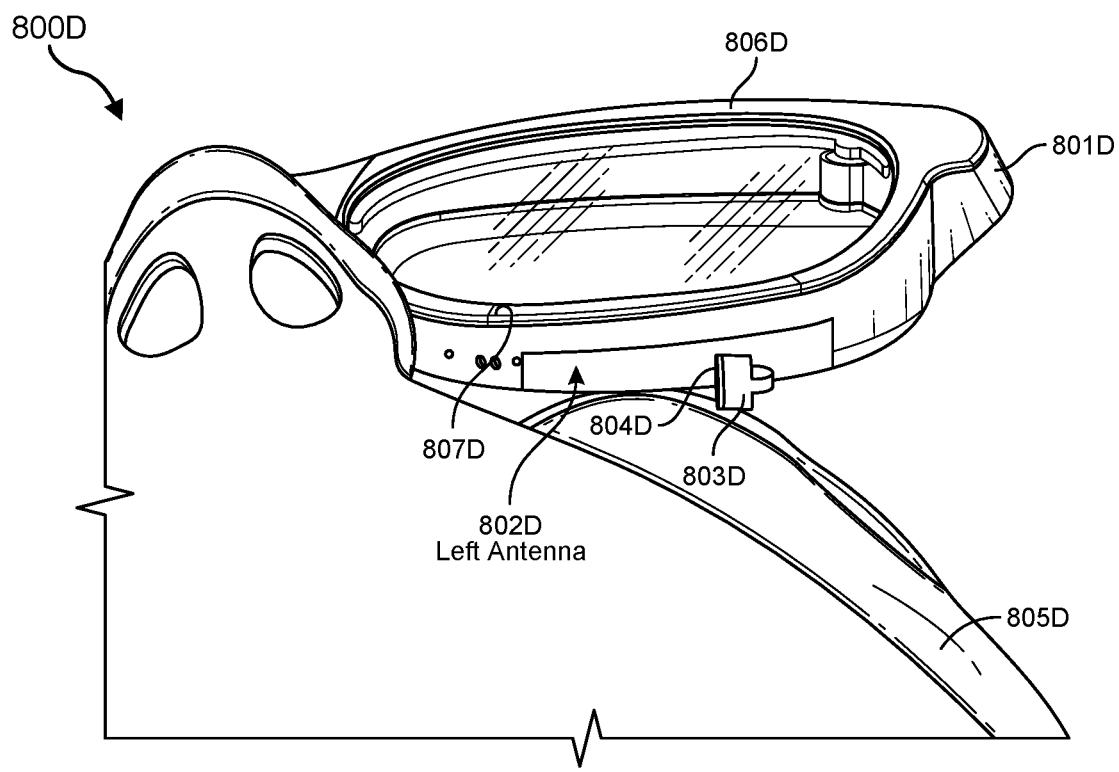
Figure 9A:
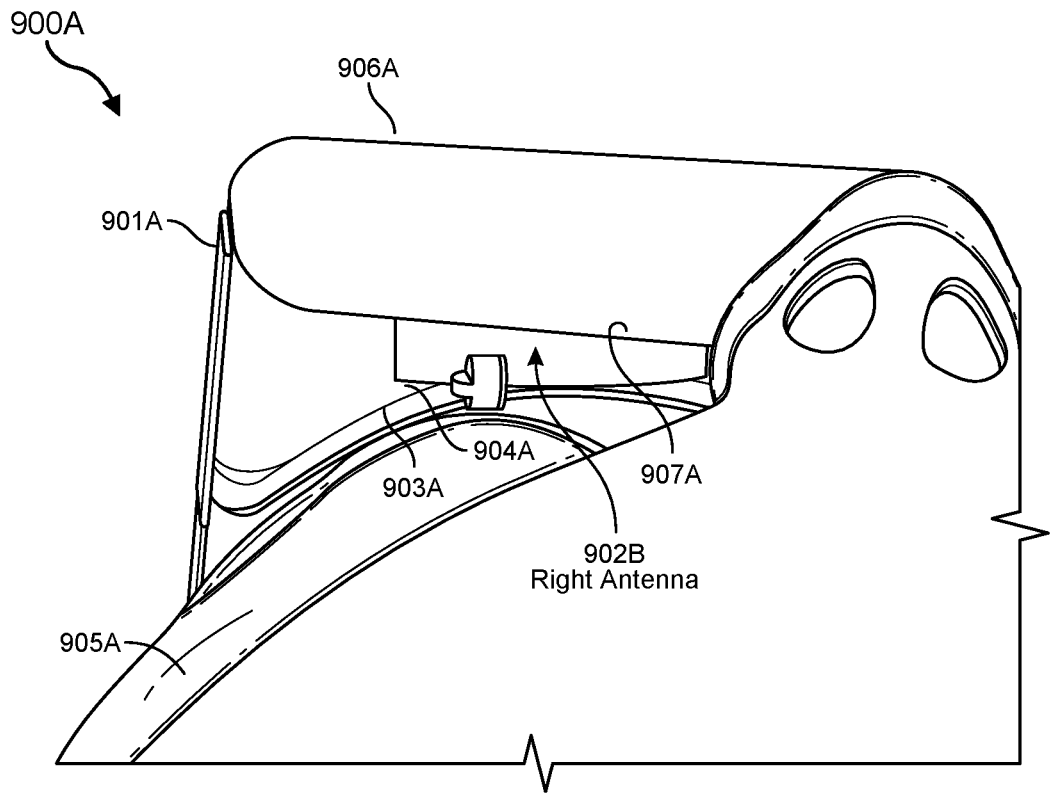
FIGS. 9A-9D illustrate alternative antenna placement embodiments for antennas on different wearable electronic devices.
Figure 9B:
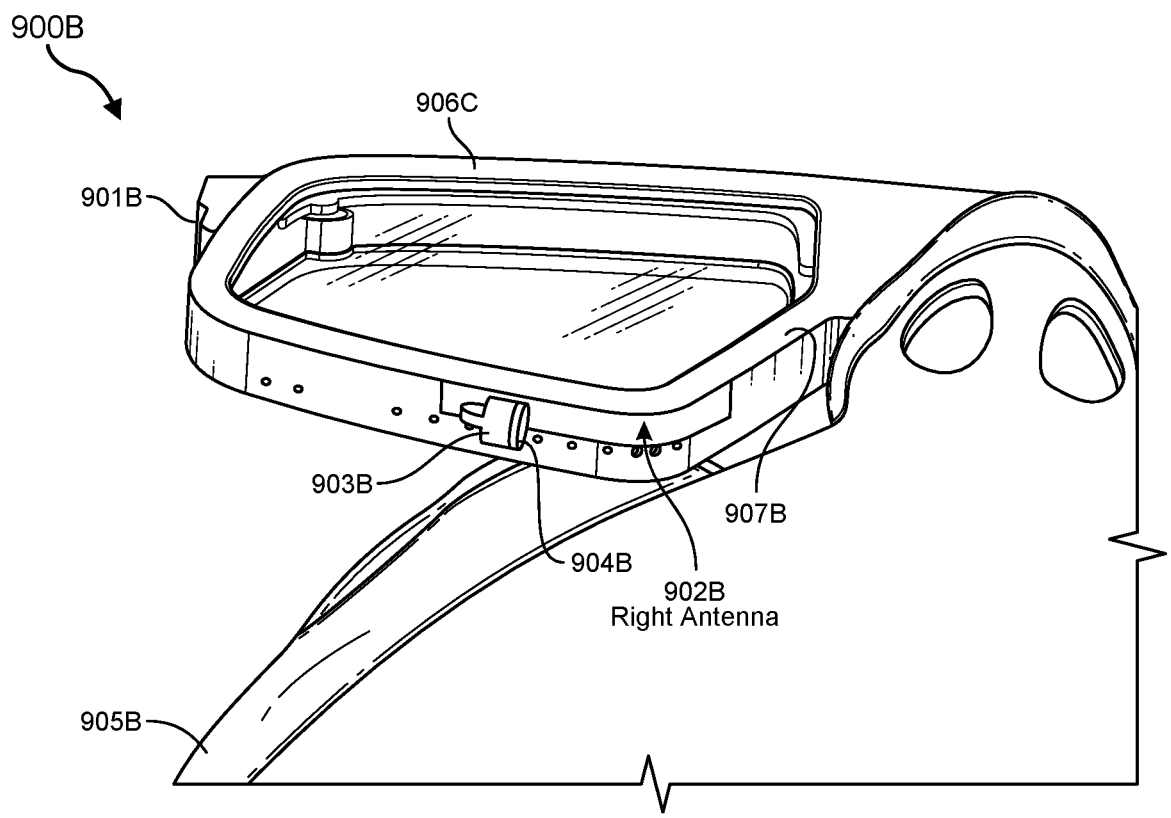
Figure 9C:
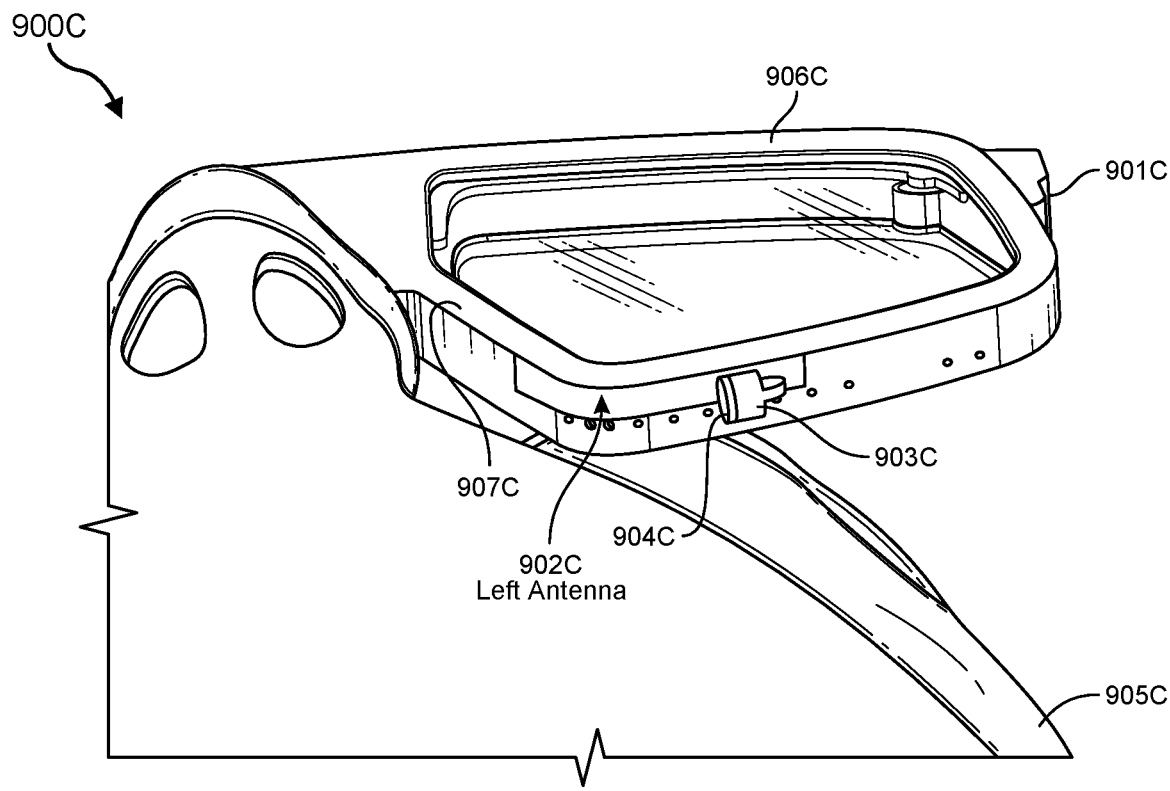
Figure 9D:
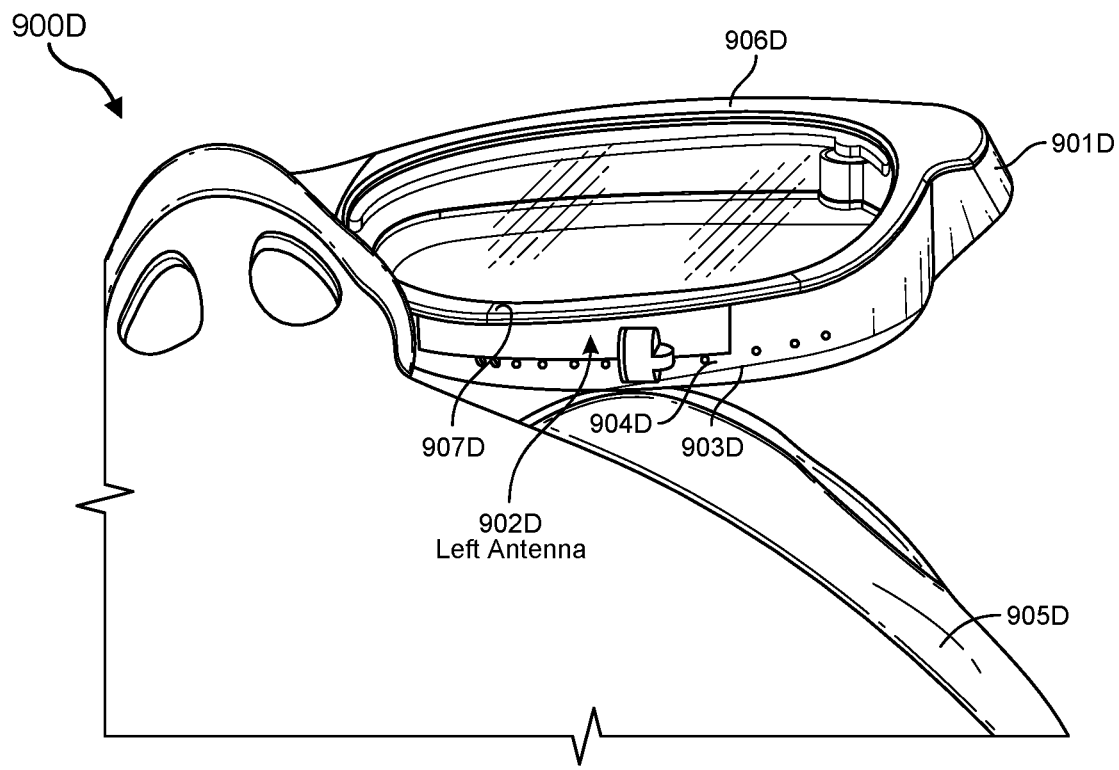
Figure 10A:
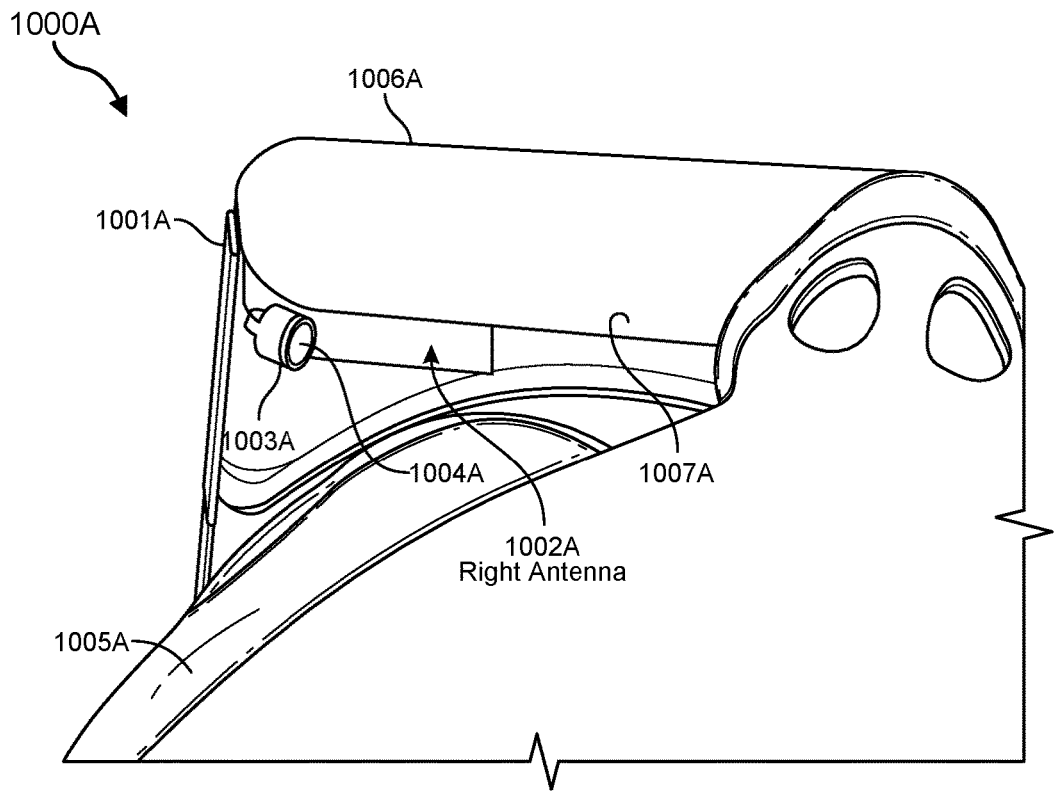
FIGS. 10A-10D illustrate alternative antenna placement embodiments for antennas on different wearable electronic devices.
Figure 10B:
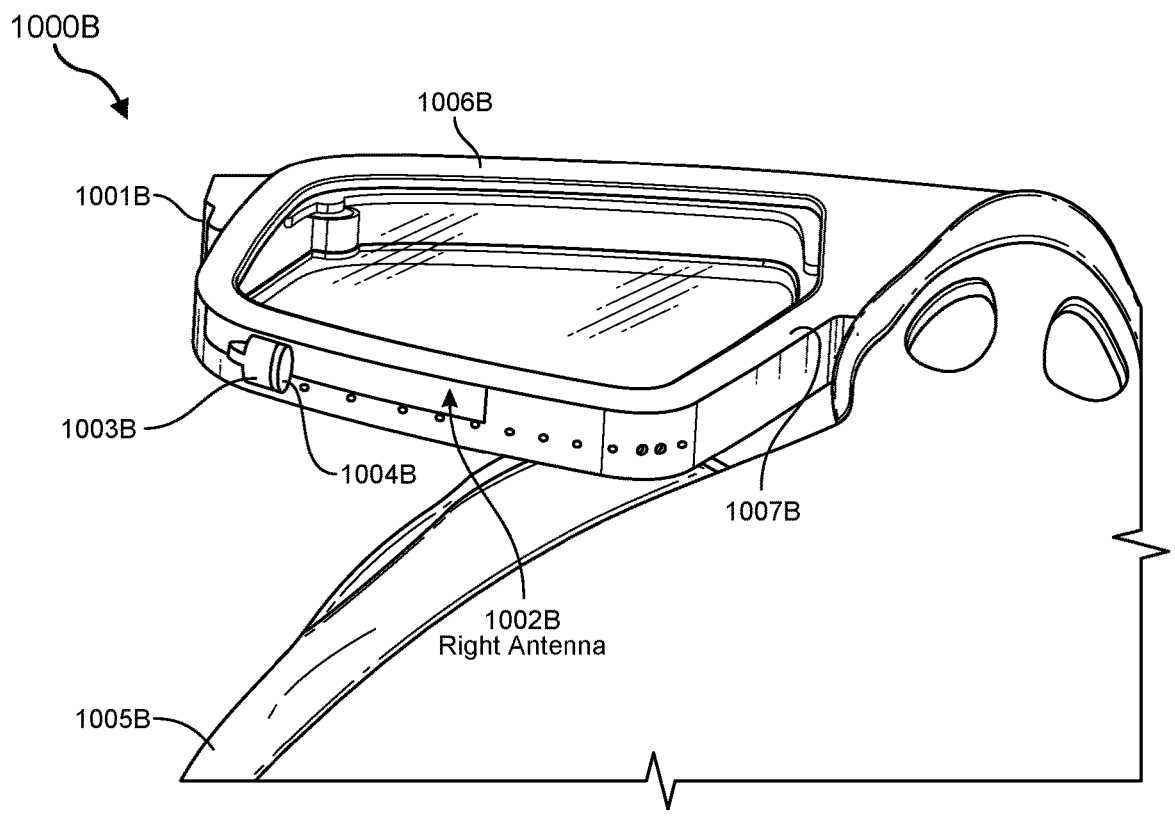
Figure 10C:
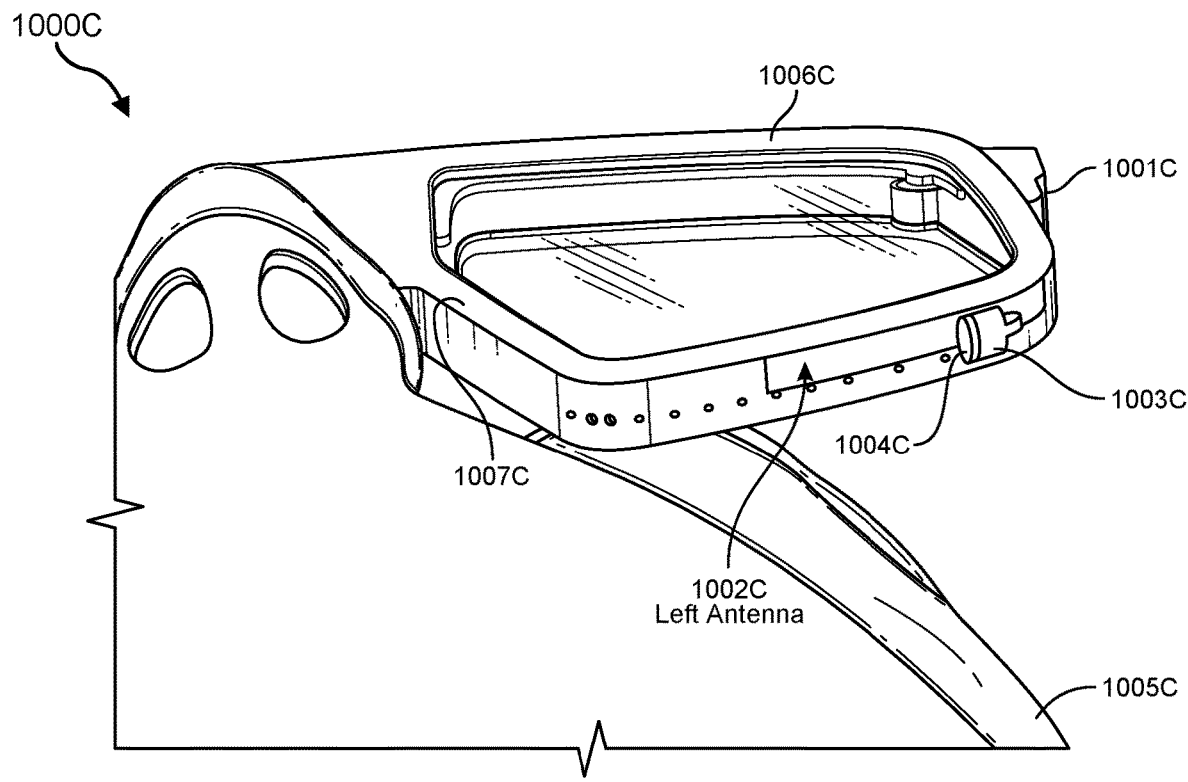
Figure 10D:
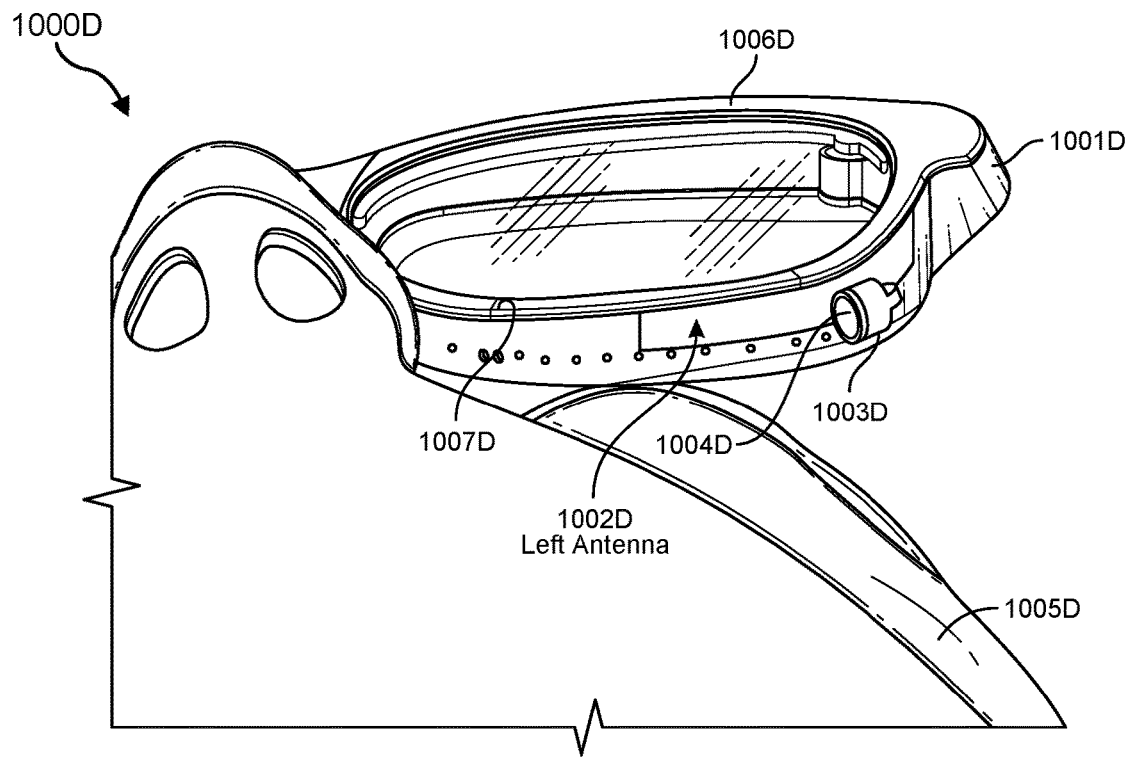

Other routing embodiments are shown in FIGS. 6B-6D. For example, the artificial reality glasses 600B of FIG. 6B may have a left-side wire 601B that, like the wire 601A, travels along the interior portion of the artificial reality glasses 600B and may cross the nose bridge portion of the glasses. The right-side wire 602B, however, may travel from an antenna in the bottom rim portion around the outside of the glasses' rim and then along the brow line to the radio 603B. The opposite may be true for the artificial reality glasses 600C of FIG. 6C in which the left-side wire 601C travels along an outer edge and along the brow line of the glasses to the radio 603C, while the right-side wire 602C may travel along the interior portion of the artificial reality glasses 600C toward the nose bridge and the radio 603C. And, in FIG. 6D, the artificial reality glasses 600D may include a left-side wire 601D that is routed along the outside edge of the rim of the glasses and along the brow portion to the radio 603D, and a right-side wire 602D that is routed along the opposite outside edge of the rim of the glasses and along the brow portion to the radio 603D.

In some cases, routing the wire along the outer edge of the rim of the glasses may avoid electronic or mechanical components that lie on the inner edge of the rim of the glasses. In other cases, routing the wire along the inner edge of the rim of the glasses may avoid electronic or mechanical components that lie on the outer or top edge of the rim of the glasses. Thus, in some cases, the tradeoff between having equal-length wires between antennas and radios may be outweighed by a desire to avoid routing the wire through one or more components or to avoid specific components (e.g., other antennas). In this manner, antennas may be intelligently routed (perhaps differently on each wearable device) to provide the highest level of operational efficiency while avoiding other electronic or mechanical components in the device.

FIGS. 7A-10D illustrate various embodiments in which an antenna (e.g., a WiFi antenna) may be placed in different parts of a bottom rim portion of a wearable electronic device. As noted above, antennas may be placed on either side of a piece of eyewear to provide separation between the antennas. Within a given side of the frame 701A-701D (e.g., the left side shown in FIGS. 7A-10D), the antenna may also be placed in different positions. These positions may affect how efficiently the antenna may operate (e.g., transmitting or receiving wireless signals). For instance, in FIGS. 7A-7D, the left-side antenna 702A-702D may be centered along the z-axis with respect to the user's face. For example, the left antenna 402A of FIG. 4A may be positioned on the outer edge of the frame 401A on the bottom rim portion 407A of the virtual reality headset 400A. In FIGS. 7A-7D, the left-side antenna 702A-702D may be placed in a centered position along the z-axis between the outer edge of the artificial reality glasses 700A-700D and the inner edge of the glasses that is touching the user's cheek (e.g., user 705A-705D). The right-side antenna (not shown in FIG. 7A) may be placed in a similarly centered position, or may be placed on an outward position next to the front face of the artificial reality glasses 700A-700D. In other cases, the right-side antenna may be placed on an inward position next to the inside of the bottom rim portion 707A-707D, immediately next to the user's cheek (although still separated from the user's cheek by the overmold and/or the molded portion, as shown in FIGS. 3A-3D).

Similarly, as shown in the embodiments of FIGS. 8A-8D, the left-side antenna 802A-802D of wearable electronic devices 800A-800D may be placed on an inward position of the frame 801A-801D next to the inside of the bottom rim portion 807A-807D. In such cases, the left-side antenna 802A-802D may be placed closer to the user's face (e.g., user 805A-805D) to avoid contact with potentially other components that are in the bottom rim portion 807A-807D of the wearable electronic devices 800A-800D. Moreover, in some cases, the right-side antenna may be placed on the front of the bottom rim portion of the wearable device (as in FIGS. 4A-4D), and the left-side antenna may be placed on the back of the bottom rim portion of the wearable device. In such cases, the antennas may be more offset and may experience better isolation. Thus, as shown in FIGS. 4A-4D, 7A-7D, and 8A-8D, the antennas may be placed in frontmost, centered, or rearmost positions on the bottom rim portion of the wearable electronic devices. Different antenna placements may be used in the each of the wearable devices described herein (e.g., 100A-100J of FIGS. 1A-1J). These placements may provide different spherical coverage for each antenna, and may provide different levels of efficiency with respect to MIMO and the other operations of the second (or third or subsequent) antenna.

FIGS. 9A-10D illustrate embodiments in which the left-side antenna 902A-902D or 1002A-1002D is moved either toward the inner portion of the wearable devices or toward the outer edge of the bottom rim portion of the frames (901A-901D or 1001A-1001D) of the wearable devices 900A and 1000A, respectively. As can be seen in FIGS. 9A-9D, for example, different wearable devices 900A-900D may place the antennas in different positions. In FIGS. 9A-9D, the antennas 902A-902D may be positioned away from center on the x-axis and toward the inner portion of the wearable devices. The right-side antennas (not shown) may also be moved in this manner, or may remain in a centered position. Having both the left-side antenna and the right-side antenna moved toward the inner portion of the wearable devices may reduce the length of the wires connecting the antennas to the radio(s), but may also place the antennas closer together. As such, at least in some embodiments, limitations may be placed on how far the right- and left-side antennas may be moved toward the inner portion of the wearable device 900A-900D. Indeed, in at least some cases, a minimum threshold level of isolation for each antenna is to be maintained when moving the antennas to different positions relative to each other or relative to other antennas.

In FIGS. 10A-10D, the antennas 1002A-1002D may be positioned to the right of center on the x-axis when viewing the wearable glasses from the front, as shown in FIGS. 10A-10D. The left-side antennas 1002A-1002D may be moved toward the outer portion of the bottom rim of the wearable devices 1000A-1000D. This may put the antennas further apart on the wearable device which may lead to greater isolation for each antenna, but this placement may also result in longer wires connecting the antennas 1002A-1002D to the radio. These longer wires may at least partially reduce the operational efficiency of the antennas, but the increased isolation per antenna may more than make up for any reduction in antenna efficiency due to longer connecting wires. In some wearable devices, routing wires through the middle of the device (e.g., in virtual reality headsets) may not be feasible (e.g., it may block visibility). As such, other routing options may be used (e.g., as shown in FIGS. 6A-6D).

Figure 11:
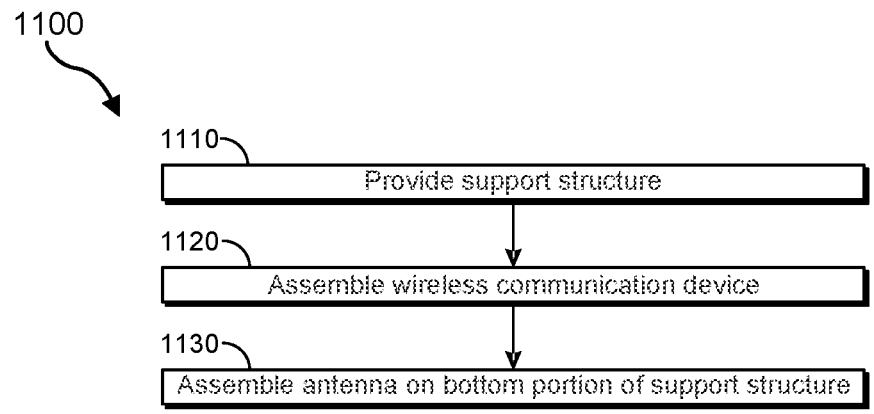
FIG. 11 is a flow diagram of an exemplary method of manufacturing a wearable electronic device having a specified antenna or antenna system.
Figure 12:
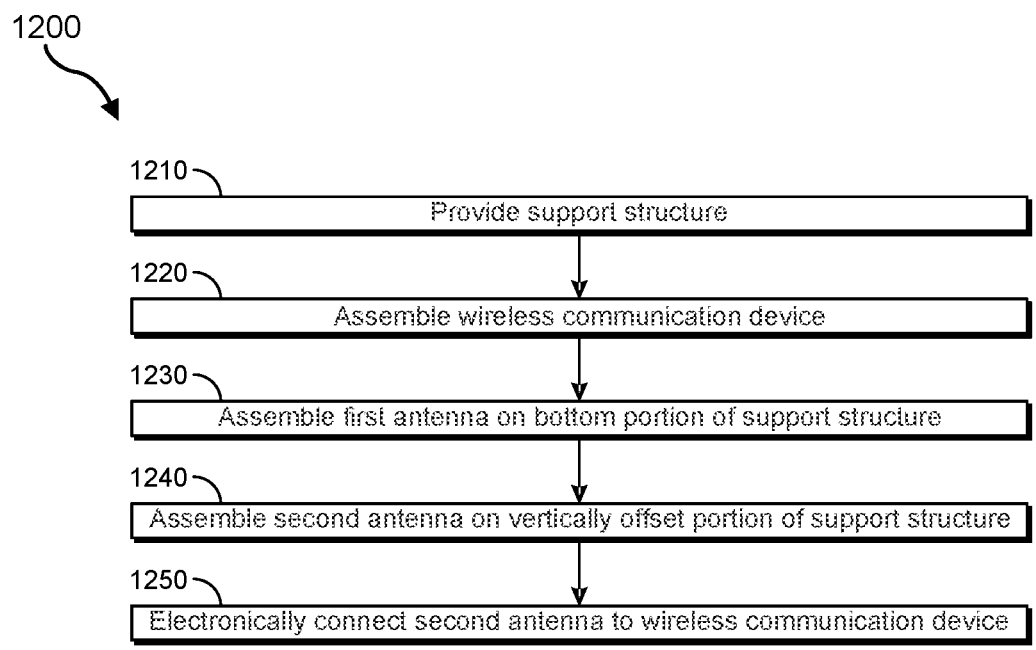
FIG. 12 is a flow diagram of an alternative exemplary method for of manufacturing a wearable electronic device having a specified antenna or antenna system.

FIGS. 11 and 12 illustrate methods for manufacturing a wearable electronic device. FIG. 11, for example, provides an exemplary method of manufacturing 1100 for manufacturing, assembling, or otherwise generating a wearable electronic device. The steps shown in FIG. 11 may be performed by any suitable computer-executable code and/or computing system, including the systems described herein. In one example, each of the steps shown in FIG. 11 may represent an algorithm whose structure includes and/or is represented by multiple sub-steps, examples of which will be provided in greater detail below.

At step 1110, for example, the method 1100 may include providing a support structure having a top portion and a first bottom portion. For example, as shown in FIG. 4A, a wearable electronic device produced using method 1100 may include a support structure or frame 401A along with a top portion 406A and a first bottom portion 407A (e.g., the left-side bottom portion). The method 1100 may also include, at step 1120, assembling at least one wireless communication device (e.g., radio 102A of FIG. 1A) on the top portion 406A of the support structure 401A. Still further, the method 1100 may include, at step 1130, assembling at least one antenna 402A on the first bottom portion 407A of the support structure 401A. This antenna 402A on the first bottom portion 407A of the support structure 401 may be electrically connected to the wireless communication device 102A positioned on the top portion of the support structure.

Method 1200 of FIG. 12 may include an alternative method of manufacturing a wearable electronic device (e.g., 400A of FIG. 4A). This alternative method may include steps 1210, 1220, and 1230 that are similar to or the same as those of method 1100, and may include providing a support structure 401A having a top portion 406A and a first bottom portion 407A (step 1210), assembling at least one wireless communication device 102A on the top portion 406A of the support structure 401A (step 1220), and assembling at least one antenna 402A on the first bottom portion 407A of the support structure 401A (step 1230). The antenna 402A in the first bottom portion 407A of the support structure 401A may be electrically connected to the wireless communication device 102A positioned on the top portion of the support structure. Method 1200 may further include, at step 1240, assembling a second antenna (e.g., 101A) on vertically offset portion of the frame or support structure 401A (e.g., on the bottom portion of an opposite lens of an eyewear device). Method 1200 may also include, at step 1250, electronically connecting the second antenna 101A to the wireless communication device 102A. As such, both antennas 101A and 402A/103A may be connected to a radio 102A or a plurality of radios.

The antennas (e.g., 101A/103A) may be placed in the bottom portion of the eyewear device's rims to avoid interference with other internal components. Moreover, the antennas may be vertically offset from each other to provide increased isolation for each antenna. As shown in FIGS. 7A-10D, the antennas may be placed in different locations along the bottom portion of the rims. By increasing or decreasing the distance between the antennas, the embodiments herein may increase or decrease the amount of isolation provided to each antenna. Moreover, moving the antennas toward the front face of the wearable devices may position the antennas away from the user's head and cheek, leading to less and less interference by the user's head. This may allow the wearable device to achieve better signal quality for the same amount of power, or may allow the wearable device to increase the amount of power used by the antennas for transmission or reception. This may be beneficial in remote areas that have poor reception.

As noted above, the antennas 101A/103A may be connected to a corresponding radio 102A that may be positioned in the nose bridge portion of the wearable electronic device. The antennas 101A/103A may be connected to the radio 102A via cables or wires that are similar or the same in length. This may provide increased operational efficiency, as each antenna may have similar operating characteristics, including similar impedance levels, similar signal reception levels, etc. In some cases, for example, the electrical connection between the antennas and the radio may follow an inner contour of the right lower rim of the artificial reality glasses, and the second electrical connection between the second bottom portion and the radio may follow an inner contour of the left lower rim of the artificial reality glasses (as generally shown in FIG. 6A).

In some cases, based on the type of antenna (e.g., WiFi, cellular, etc.) or the antenna architecture (e.g., loop, monopole, etc.), the placement of the antenna may vary along the bottom rim portion of the wearable device (as shown in FIGS. 7A-10D). Similarly, the placement of radios may vary along the top brow portion of the wearable device. Indeed, the radio(s) may be placed in a centered position within the top portion of the frame, or may be off center (as shown in FIG. 2A). In some cases, multiple different types of radios may be implemented in the top brow portion of the wearable device. These different types of radios may be placed above the user's eyes on the brow bar, within the nose bridge, or on the outer edges of the top portion of the rims.

In some embodiments, the antennas in the bottom rim portions of the wearable electronic devices may be at least partially integrated into the support structure or frame. At least in some cases, the support structure may be made of a conducting metal. As such, any one or more of the antennas may be grounded to the support structure. The support structure may support many different electronic and/or mechanical components. These components may at least partially surround the antennas in the bottom rim portions of the support structure. In some cases, these components may be restricted to those components that will not interfere with the operation of the antennas, or will only marginally affect the functionality of the antennas. Thus, during the design and manufacturing processes, steps may be taken to ensure that the components surrounding or next to the antennas may be components that will not introduce desense or would not otherwise deleteriously affect the operation of the antennas.

Accordingly, systems, methods of manufacturing, and apparatuses are provided herein that improve antenna functionality. Indeed, the embodiments described herein may provided increased isolation by separating the antennas from each other within a wearable device. Moreover, reduced desense and increased operational efficiency may be provided by moving the antenna(s) to different locations on the bottom rim portion of the wearable device including on the front face of the device, away from the user's head. Still further, the antennas may be moved away from other mechanical and electrical components that could interfere with the operational efficiency of the antennas.

EXAMPLE EMBODIMENTS

Example 1: A system may include a support structure having a top portion and a first bottom portion, at least one wireless communication device positioned on the top portion of the support structure, and at least one antenna positioned in the first bottom portion of the support structure, wherein the antenna in the first bottom portion of the support structure is electrically connected to the wireless communication device positioned on the top portion of the support structure.

Example 2: The system of Example 1, further including a second antenna positioned in a second bottom portion of the support structure that is vertically offset from the first bottom portion of the support structure.

Example 3: The system of Examples 1 or 2, wherein the second antenna positioned in the second bottom portion of the support structure is electrically connected to the wireless communication device via a second electrical connection.

Example 4: The system of claim any of Examples 1-3, wherein the system comprises a wearable device including at least one of a head-mounted display or a pair of artificial reality glasses.

Example 5: The system of claim any of Examples 1-4, wherein the first bottom portion comprises a right lower rim of the pair of artificial reality glasses, and wherein the second bottom portion comprises a left lower rim of the pair of artificial reality glasses.

Example 6: The system of claim any of Examples 1-5, wherein the electrical connection between the first bottom portion and the radio follows an inner contour of the right lower rim of the artificial reality glasses, and wherein the second electrical connection between the second bottom portion and the radio follows an inner contour of the left lower rim of the artificial reality glasses.

Example 7: The system of claim any of Examples 1-6, wherein the electrical connection between the first bottom portion and the radio and the second electrical connection between the second bottom portion and the radio are substantially equal in length.

Example 8: The system of claim any of Examples 1-7, wherein the antenna and the second antenna function simultaneously in a multiple input multiple output (MIMO) operation.

Example 9: The system of claim any of Examples 1-8, wherein the wireless communication device is centered within the top portion of the support structure.

Example 10: The system of claim any of Examples 1-9, wherein the antenna in the first bottom portion of the support structure is at least partially integrated into the support structure.

Example 11: The system of claim any of Examples 1-10, wherein an overmold portion covers at least a portion of the antenna in the first bottom portion of the support structure.

Example 12: A wearable device may include a support structure having a top portion and a first bottom portion, at least one wireless communication device positioned on the top portion of the support structure, and at least one antenna positioned in the first bottom portion of the support structure, wherein the antenna in the first bottom portion of the support structure is electrically connected to the wireless communication device positioned on the top portion of the support structure.

Example 13: The wearable device of Example 12, further including a second antenna positioned in a second bottom portion of the support structure that is vertically offset from the first bottom portion of the support structure.

Example 14: The wearable device of Example 12 or Example 13, wherein the second antenna positioned in the second bottom portion of the support structure is electrically connected to the wireless communication device via a second electrical connection.

Example 15: The wearable device of any of Examples 12-14, wherein the system comprises a wearable device including at least one of a head-mounted display or a pair of artificial reality glasses.

Example 16: The wearable device of any of Examples 12-15, wherein the first bottom portion comprises a right lower rim of the pair of artificial reality glasses, and wherein the second bottom portion comprises a left lower rim of the pair of artificial reality glasses.

Example 17: The wearable device of any of Examples 12-16, wherein the first and second antennas are integrated into at least a portion of the support structure.

Example 18: The wearable device of any of Examples 12-17, wherein the support structure is made of a conducting metal, and wherein the antenna is grounded to the support structure.

Example 19: The wearable device of any of Examples 12-18, wherein one or more additional electrical components at least partially surround the antenna in the bottom portion of the support structure.

Example 20: A method of manufacturing comprising: providing a support structure having a top portion and a first bottom portion, assembling at least one wireless communication device on the top portion of the support structure, and assembling at least one antenna on the first bottom portion of the support structure, wherein the antenna in the first bottom portion of the support structure is electrically connected to the wireless communication device positioned on the top portion of the support structure.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
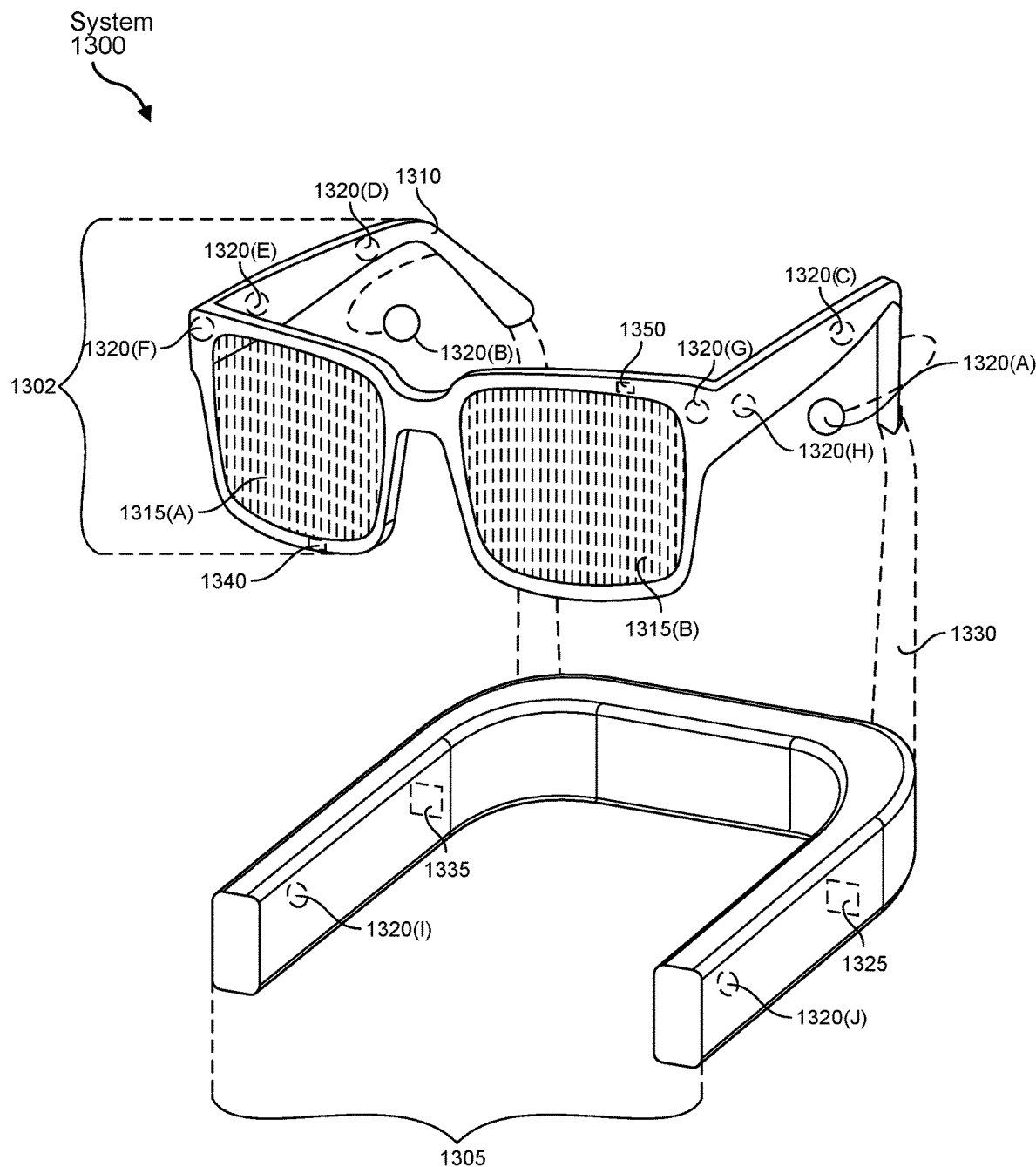
FIG. 13 is an illustration of exemplary augmented-reality glasses that may be used in connection with embodiments of this disclosure.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(1) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
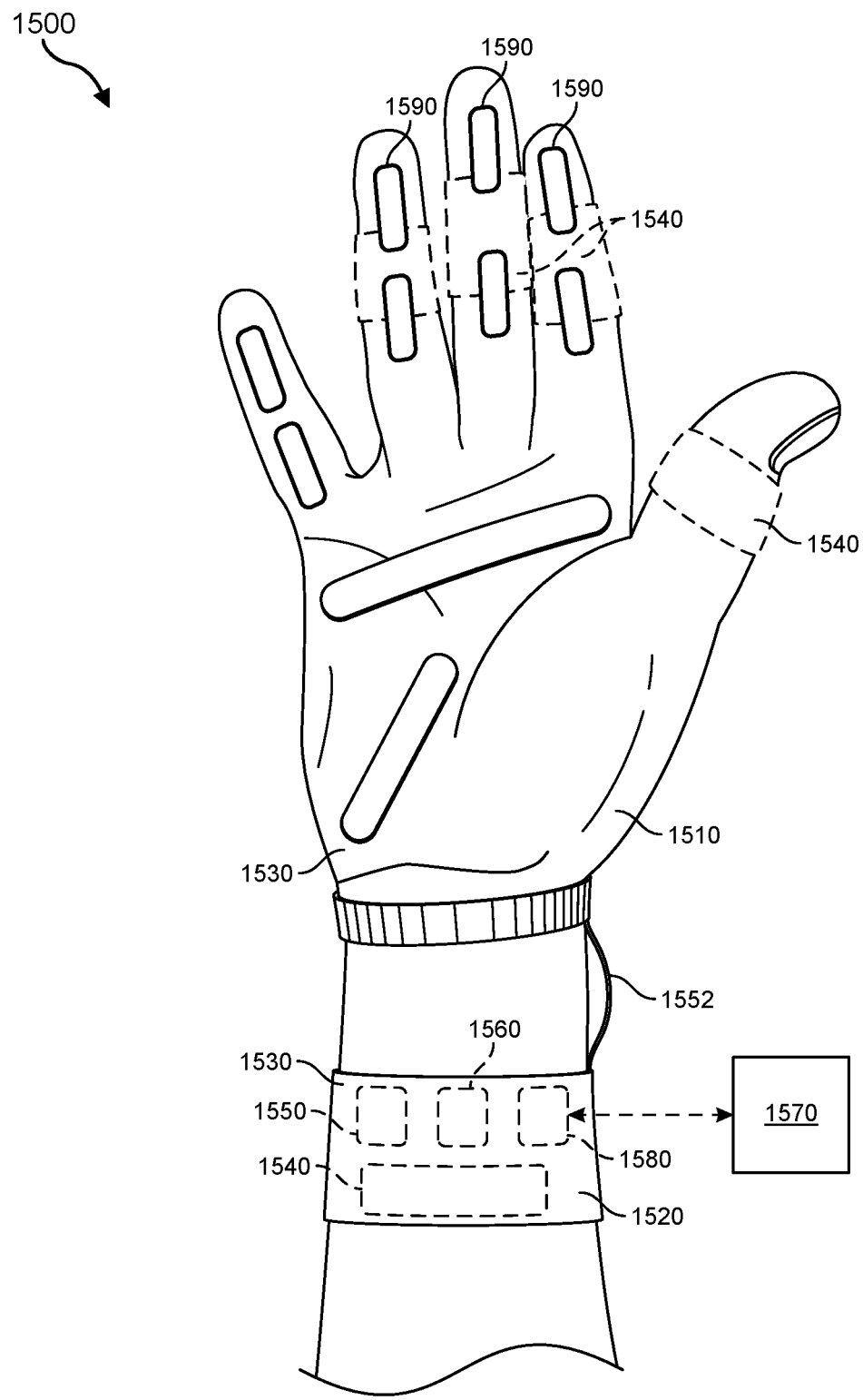
FIG. 15 is an illustration of exemplary haptic devices that may be used in connection with embodiments of this disclosure.

Haptic feedback may be provided by interfaces positioned within a user's environment (e.g., chairs, tables, floors, etc.)

and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). Haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1540 may be positioned at least partially within one or more corresponding pockets formed in textile material 1530 of vibrotactile system 1500. Vibrotactile devices 1540 may be positioned in locations to provide a vibrating sensation (e.g., haptic feedback) to a user of vibrotactile system 1500. For example, vibrotactile devices 1540 may be positioned against the user's finger(s), thumb, or wrist, as shown in FIG. 15. Vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to vibrotactile devices 1540, such as via conductive wiring 1552. In some examples, each of vibrotactile devices 1540 may be independently electrically coupled to power source 1550 for individual activation. In some embodiments, a processor 1560 may be operatively coupled to power source 1550 and configured (e.g., programmed) to control activation of vibrotactile devices 1540.

Vibrotactile system 1500 may be implemented in a variety of ways. In some examples, vibrotactile system 1500 may be a standalone system with integral subsystems and components for operation independent of other devices and systems. As another example, vibrotactile system 1500 may be configured for interaction with another device or system 1570. For example, vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1580 may enable communications between vibrotactile system 1500 and the other device or system 1570 via a wireless (e.g., Wi-Fi, BLUETOOTH, cellular, radio, etc.) link or a wired link. If present, communications interface 1580 may be in communication with processor 1560, such as to provide a signal to processor 1560 to activate or deactivate one or more of the vibrotactile devices 1540.

Vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although power source 1550, processor 1560, and communications interface 1580 are illustrated in FIG. 15 as being positioned in haptic device 1520, the present disclosure is not so limited. For example, one or more of power source 1550, processor 1560, or communications interface 1580 may be positioned within haptic device 1510 or within another wearable textile.

Figure 16:
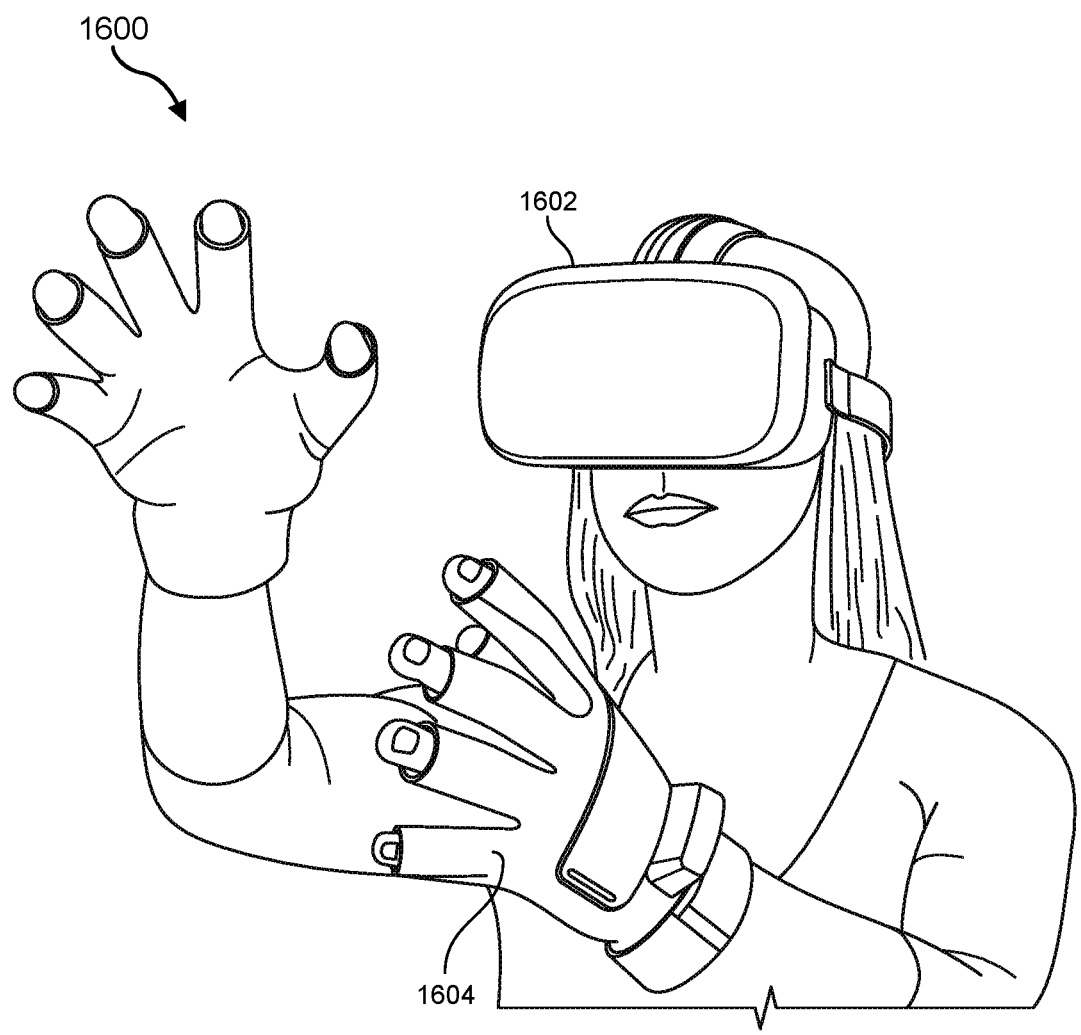
FIG. 16 is an illustration of an exemplary virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
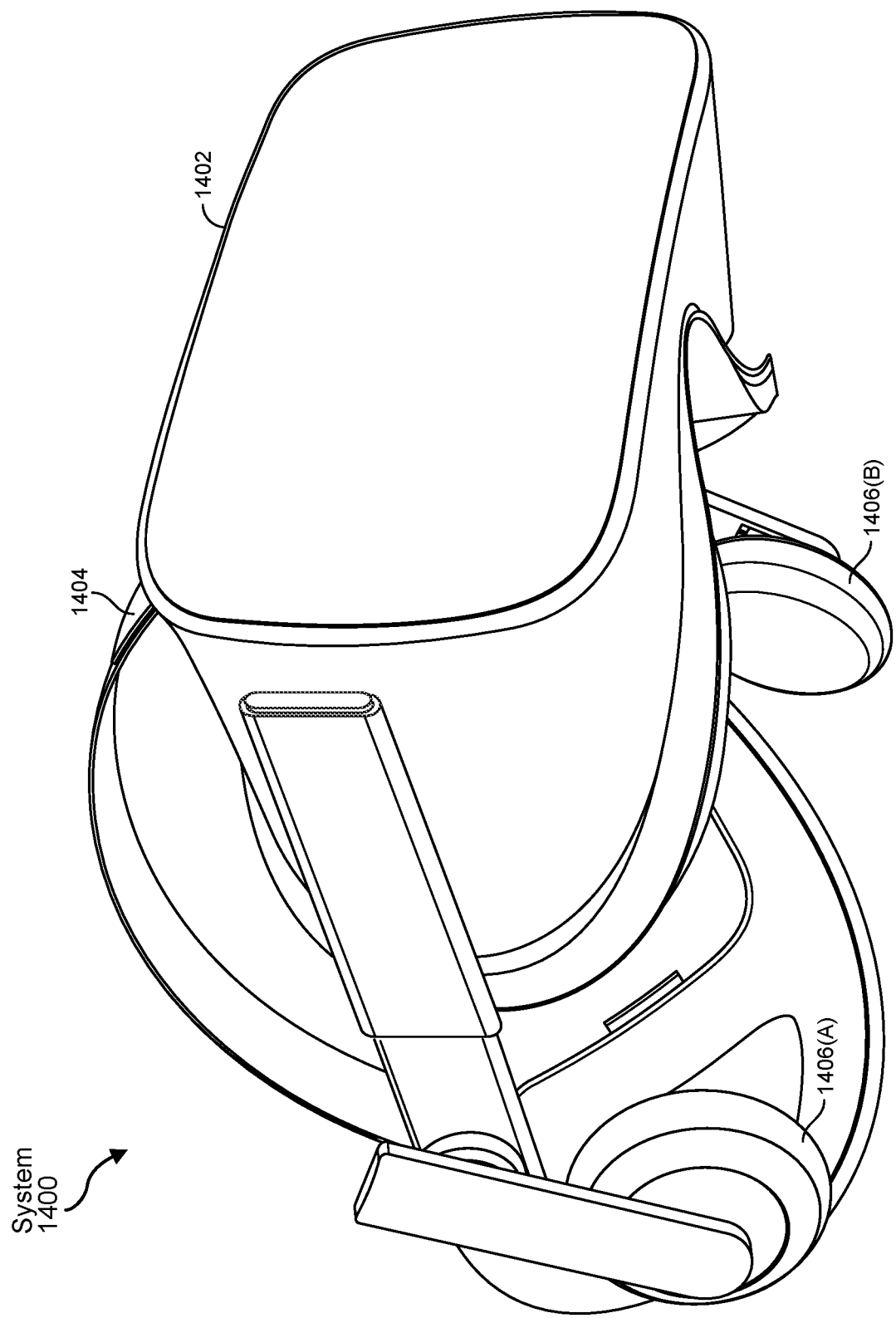
FIG. 14 is an illustration of an exemplary virtual-reality headset that may be used in connection with embodiments of this disclosure.

Head-mounted display 1602 generally represents any type or form of virtual-reality system, such as virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, haptic device 1604 may provide haptic feedback by applying vibration, motion, and/or force to the user. For example, haptic device 1604 may limit or augment a user's movement. To give a specific example, haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1604 to send action requests to a console. Examples of action requests include, without limitation, requests to start an application and/or end the application and/or requests to perform a particular action within the application.

Figure 17:
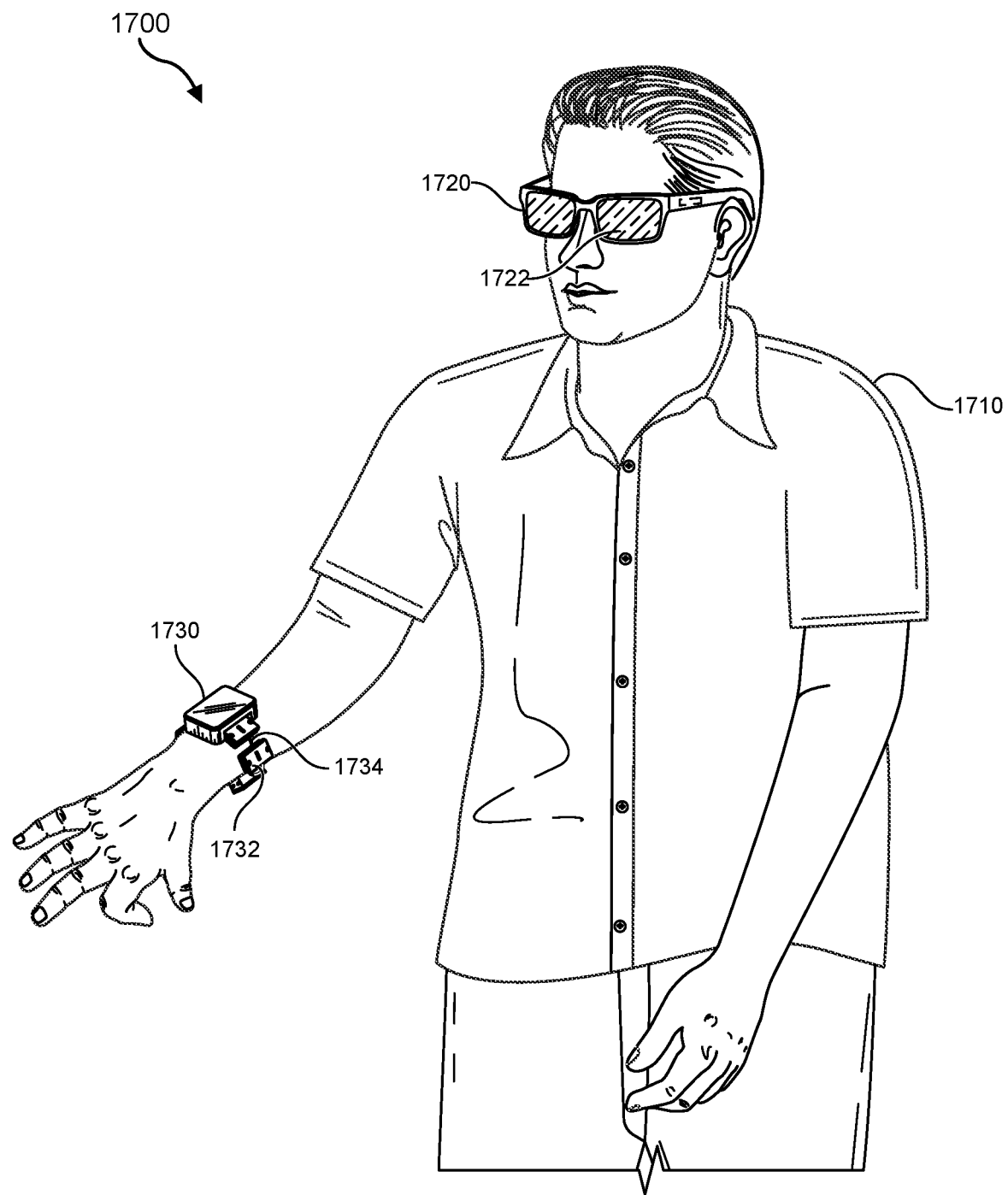
FIG. 17 is an illustration of an exemplary augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, user 1710 may wear a pair of augmented-reality glasses 1720 that may have one or more displays 1722 and that are paired with a haptic device 1730. In this example, haptic device 1730 may be a wristband that includes a plurality of band elements 1732 and a tensioning mechanism 1734 that connects band elements 1732 to one another.

One or more of band elements 1732 may include any type or form of actuator suitable for providing haptic feedback. For example, one or more of band elements 1732 may be configured to provide one or more of various types of cutaneous feedback, including vibration, force, traction, texture, and/or temperature. To provide such feedback, band elements 1732 may include one or more of various types of actuators. In one example, each of band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1510, 1520, 1604, and 1730 may include any suitable number and/or type of haptic transducer, sensor, and/or feedback mechanism. For example, haptic devices 1510, 1520, 1604, and 1730 may include one or more mechanical transducers, piezoelectric transducers, and/or fluidic transducers. Haptic devices 1510, 1520, 1604, and 1730 may also include various combinations of different types and forms of transducers that work together or independently to enhance a user's artificial-reality experience. In one example, each of band elements 1732 of haptic device 1730 may include a vibrotactor (e.g., a vibrotactile actuator) configured to vibrate in unison or independently to provide one or more of various types of haptic sensations to a user.

Figure 18A:
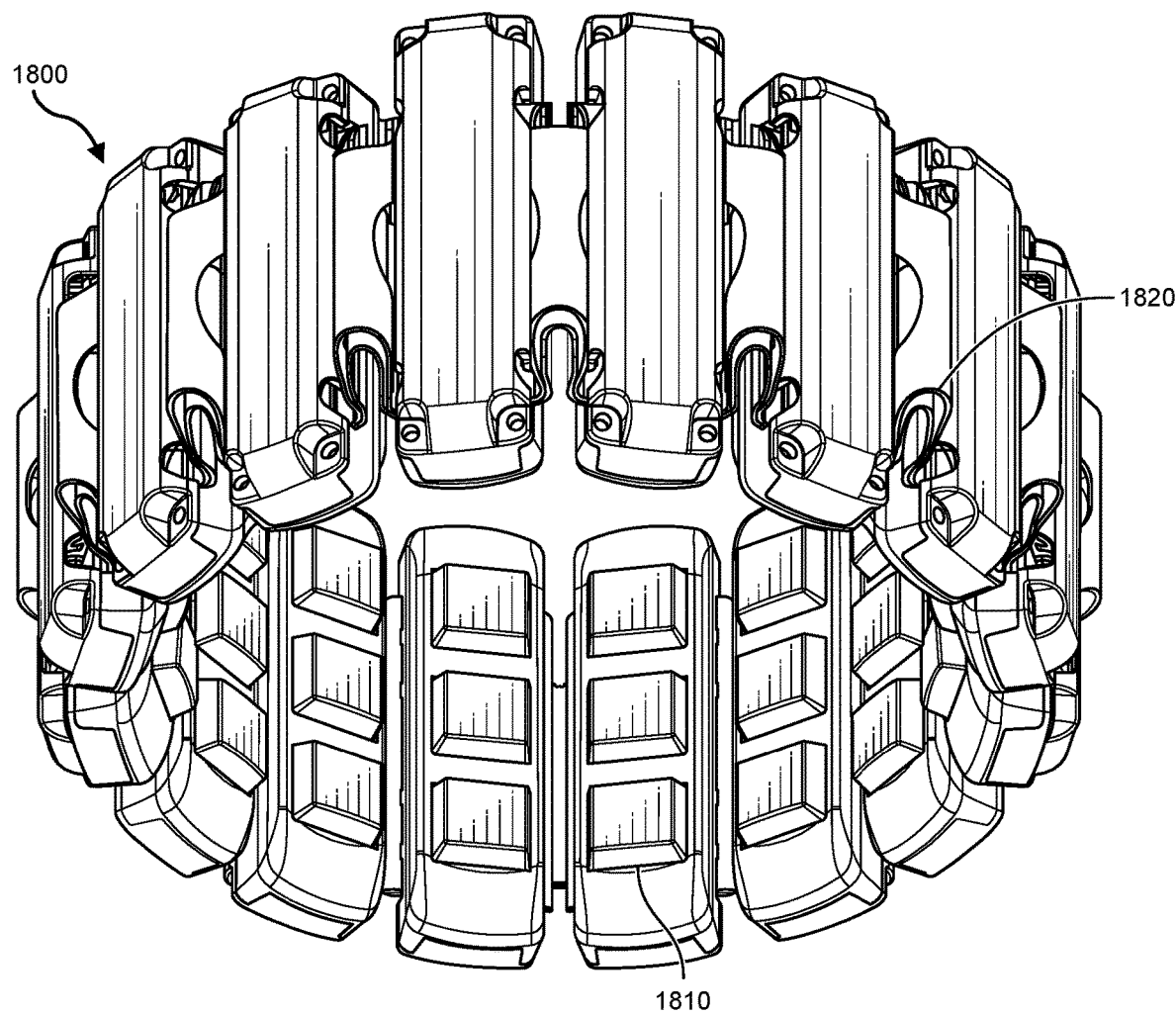
FIGS. 18A and 18B are illustrations of an exemplary human-machine interface configured to be worn around a user's lower arm or wrist.
Figure 18B:
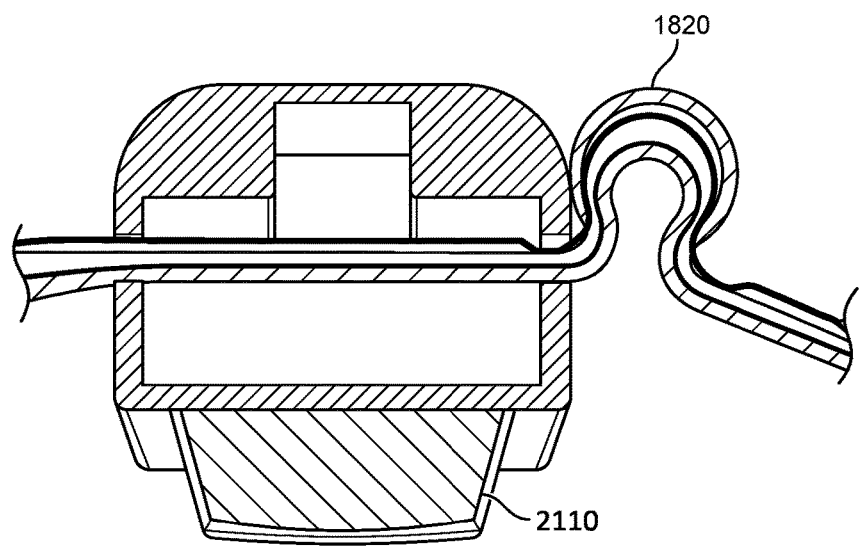

FIG. 18A illustrates an exemplary human-machine interface (also referred to herein as an EMG control interface) configured to be worn around a user's lower arm or wrist as a wearable system 1800. In this example, wearable system 1800 may include sixteen neuromuscular sensors 1810 (e.g., EMG sensors) arranged circumferentially around an elastic band 1820 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 18B illustrates a cross-sectional view through one of the sensors of the wearable device shown in FIG. 18A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1810 is discussed in more detail below with reference to FIGS. 19A and 19B.

FIGS. 19A and 19B illustrate an exemplary schematic diagram with internal components of a wearable system with EMG sensors. As shown, the wearable system may include a wearable portion 1910 (FIG. 19A) and a dongle portion 1920 (FIG. 19B) in communication with the wearable portion 1910 (e.g., via BLUETOOTH or another suitable wireless communication technology). As shown in FIG. 19A, the wearable portion 1910 may include skin contact electrodes 1911, examples of which are described in connection with FIGS. 18A and 18B. The output of the skin contact electrodes 1911 may be provided to analog front end 1930, which may be configured to perform analog processing (e.g., amplification, noise reduction, filtering, etc.) on the recorded signals. The processed analog signals may then be provided to analog-to-digital converter 1932, which may convert the analog signals to digital signals that can be processed by one or more computer processors. An example of a computer processor that may be used in accordance with some embodiments is microcontroller (MCU) 1934, illustrated in FIG. 19A. As shown, MCU 1934 may also include inputs from other sensors (e.g., IMU sensor 1940), and power and battery module 1942. The output of the processing performed by MCU 1934 may be provided to antenna 1950 for transmission to dongle portion 1920 shown in FIG. 19B.

Dongle portion 1920 may include antenna 1952, which may be configured to communicate with antenna 1950 included as part of wearable portion 1910. Communication between antennas 1950 and 1952 may occur using any suitable wireless technology and protocol, non-limiting examples of which include radiofrequency signaling and BLUETOOTH. As shown, the signals received by antenna 1952 of dongle portion 1920 may be provided to a host computer for further processing, display, and/or for effecting control of a particular physical or virtual object or objects.

Although the examples provided with reference to FIGS. 18A-18B and FIGS. 19A-19B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    a support structure having a top portion and a first bottom portion, wherein the support structure is made of a conducting metal;
    at least one wireless communication device positioned on the top portion of the support structure;
    at least one antenna positioned in the first bottom portion of the support structure, wherein the at least one antenna in the first bottom portion of the support structure is electrically connected to the at least one wireless communication device positioned on the top portion of the support structure, and wherein the at least one antenna is grounded to the support structure; and
    an overmold portion configured to cover at least a portion of the at least one antenna in the first bottom portion of the support structure.

2. The system of claim 1, further comprising at least one second antenna positioned in a second bottom portion of the support structure that is vertically offset from the first bottom portion of the support structure.

3. The system of claim 2, wherein the at least one second antenna positioned in the second bottom portion of the support structure is electrically connected to the at least one wireless communication device via a second electrical connection.

4. The system of claim 3, wherein the system comprises a wearable device including at least one of a head-mounted display or a pair of artificial reality glasses.

5. The system of claim 4, wherein the first bottom portion comprises a right lower rim of the pair of artificial reality glasses, and wherein the second bottom portion comprises a left lower rim of the pair of artificial reality glasses.

6. The system of claim 5, wherein the electrical connection between the first bottom portion and the at least one wireless communication device follows an inner contour of the right lower rim of the artificial reality glasses, and wherein the second electrical connection between the second bottom portion and the at least one wireless communication device follows an inner contour of the left lower rim of the artificial reality glasses.

7. The system of claim 6, wherein the electrical connection between the first bottom portion and the at least one wireless communication device and the second electrical connection between the second bottom portion and the at least one wireless communication device are substantially equal in length.

8. The system of claim 2, wherein the at least one antenna and the at least one second antenna function simultaneously in a multiple input multiple output (MIMO) operation.

9. The system of claim 1, wherein the at least one wireless communication device is centered within the top portion of the support structure.

10. The system of claim 1, wherein the at least one antenna in the first bottom portion of the support structure is at least partially integrated into the support structure.

11. The system of claim 1, further comprising one or more additional electrical components positioned in the first bottom portion of the support structure, wherein the one or more additional electronic components abut the at least one antenna.

12. A wearable device comprising:
    a support structure having a top portion and a first bottom portion, wherein the support structure is made of a conducting metal;
    at least one wireless communication device positioned on the top portion of the support structure;
    at least one antenna positioned in the first bottom portion of the support structure, wherein the at least one antenna in the first bottom portion of the support structure is electrically connected to the at least one wireless communication device positioned on the top portion of the support structure, and wherein the at least one antenna is grounded to the support structure; and an overmold portion configured to cover at least a portion of the at least one antenna in the first bottom portion of the support structure.

13. The wearable device of claim 12, further comprising at least one second antenna positioned in a second bottom portion of the support structure that is vertically offset from the first bottom portion of the support structure.

14. The wearable device of claim 13, wherein the at least one second antenna positioned in the second bottom portion of the support structure is electrically connected to the at least one wireless communication device via a second electrical connection.

15. The wearable device of claim 14, wherein the wearable device includes at least one of a head-mounted display or a pair of artificial reality glasses.

16. The wearable device of claim 15, wherein the first bottom portion comprises a right lower rim of the pair of artificial reality glasses, and wherein the second bottom portion comprises a left lower rim of the pair of artificial reality glasses.

17. The wearable device of claim 13, wherein the at least one antenna and the at least one second antenna are each integrated into a respective portion of the support structure.

18. The wearable device of claim 13, wherein the at least one antenna and the at least one second antenna function simultaneously in a multiple input multiple output (MIMO) operation.

19. The wearable device of claim 12, wherein one or more additional electrical components are placed in a position that abuts the at least one antenna in the bottom portion of the support structure.

20. A method of manufacturing comprising:
providing a support structure having a top portion and a first bottom portion, wherein the support structure is made of a conducting metal;
assembling at least one wireless communication device on the top portion of the support structure;
assembling at least one antenna on the first bottom portion of the support structure, wherein the at least one antenna in the first bottom portion of the support structure is electrically connected to the at least one wireless communication device positioned on the top portion of the support structure, and wherein the at least one antenna is grounded to the support structure; and
overmolding a cover portion, wherein the cover portion covers at least a portion of the at least one antenna in the first bottom portion of the support structure.

* * * * *